(12) United States Patent
Yasuoka et al.

(10) Patent No.: US 6,672,277 B2
(45) Date of Patent: Jan. 6, 2004

(54) DIRECT-INJECTION SPARK IGNITION ENGINE

(75) Inventors: Takehiko Yasuoka, Hiroshima (JP); Noriyuki Ohta, Hiroshima (JP); Hiroyuki Yamashita, Hiroshima (JP); Masatoshi Seto, Hiroshima (JP); Masakazu Matsumoto, Hiroshima (JP); Fumihiko Saito, Hiroshima (JP); Keiji Araki, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 71 days.

(21) Appl. No.: 09/995,972

(22) Filed: Nov. 29, 2001

(65) Prior Publication Data

US 2002/0078919 A1 Jun. 27, 2002

Related U.S. Application Data

(63) Continuation of application No. PCT/JP01/02521.

(30) Foreign Application Priority Data

Mar. 29, 2000 (JP) ........................................ 2000-091643
Jan. 25, 2001 (JP) ........................................ 2001-017160

(51) Int. Cl.[7] .............................................. F02B 57/04
(52) U.S. Cl. ........................ 123/295; 123/301; 123/305
(58) Field of Search ................................. 123/295, 301, 123/302, 305, 306, 308, 430

(56) References Cited

U.S. PATENT DOCUMENTS

| | | | |
|---|---|---|---|
| 5,775,288 A | | 7/1998 | Suzuki et al. |
| 5,873,344 A | * | 2/1999 | Kudou et al. ............... 123/295 |
| 6,138,639 A | * | 10/2000 | Hiraya et al. ............... 123/295 |
| 6,199,534 B1 | * | 3/2001 | Tokuyasu et al. ............ 123/301 |
| 6,378,490 B1 | * | 4/2002 | Ottowitz et al. ............ 123/305 |
| 6,418,905 B1 | * | 7/2002 | Baudlot et al. ............. 123/301 |

FOREIGN PATENT DOCUMENTS

| | | |
|---|---|---|
| DE | 198 55 601 | 6/1999 |
| DE | 198 35 563 | 2/2000 |
| DE | 100 00 111 | 7/2000 |
| EP | 0 824 185 | 2/1998 |
| EP | 0 875 670 | 11/1998 |
| EP | 0 928 887 | 7/1999 |
| EP | 1 081 350 | 3/2001 |
| FR | WO 9953179 | * 10/1999 |
| JP | 11-141338 | 5/1999 |

OTHER PUBLICATIONS

Patent Abstracts of Japan vol. 1997, No. 09, Sep. 30, 1997—& JP 09 133061 May 20, 1997 cited in the application abstrat: Figures p. 3, paragraph 14 –paragraph 18.

John B. Heywood, "Internal Combustion Engine Fundamentals" 1988, McGraw–Hill Book Company, Singapore XP002172788 ISBN: 0–07–100499–8; p. 529 –p. 532.

* cited by examiner

Primary Examiner—Mahmoud Gimie
(74) Attorney, Agent, or Firm—Nixon Peabody LLP; Donald R. Studebaker

(57) ABSTRACT

During stratified-charge combustion operation of a direct-injection spark ignition engine, at the cylinder compression stroke, a tumble is generated which flows between a spark plug electrode and a piston crown surface toward an injector. A fuel is injected from the injector in correspondence with the cylinder ignition timing by controlling the penetration of fuel spray from the injector to correspond to the tumble flow rate so that the fuel spray may go against the tumble, become a flammable mixture at the cylinder ignition timing and stay near the spark plug electrode. In the late stage of the compression stroke, diffusion of the flammable mixture is suppressed with squishes. Thus, fuel spray behavior in the combustion chamber is controlled to allow suitable mixture stratification over a wide engine operating condition range. This improves combustion quality and extends a stratified-charge combustion zone thereby providing enhanced fuel economy and power output.

29 Claims, 43 Drawing Sheets

SPRAY DIV. ANGLE $\theta$:
$\theta = \angle BAC$

PENETRATION L:
$$L = \frac{L1+L2}{2}$$

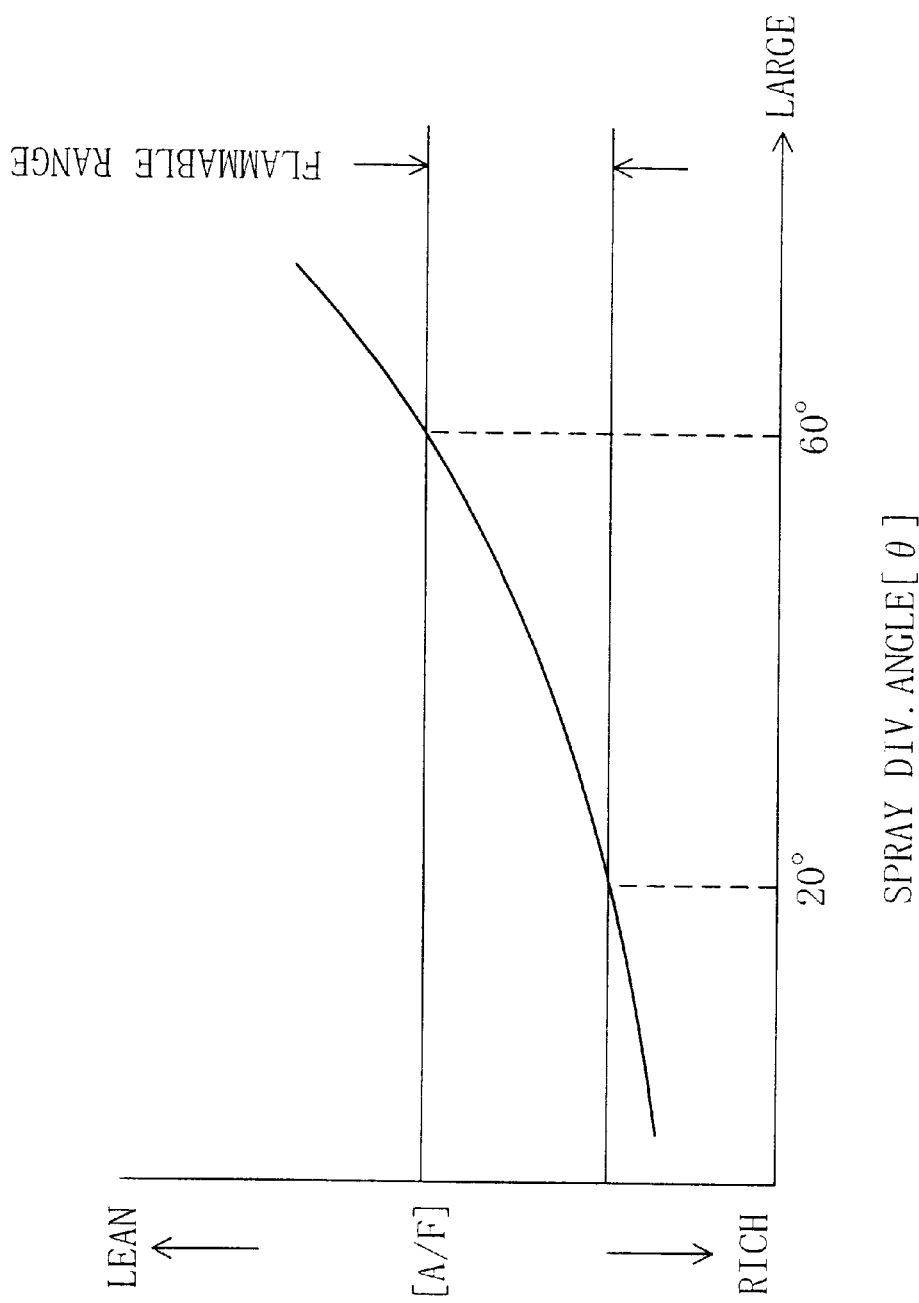

IGN. POINT

DIR. OF FUEL INJECTION

DIR. OF FUEL INJECTION

DIR. OF FUEL INJECTION

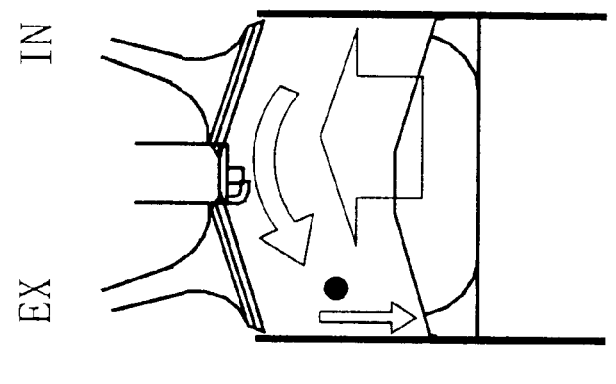
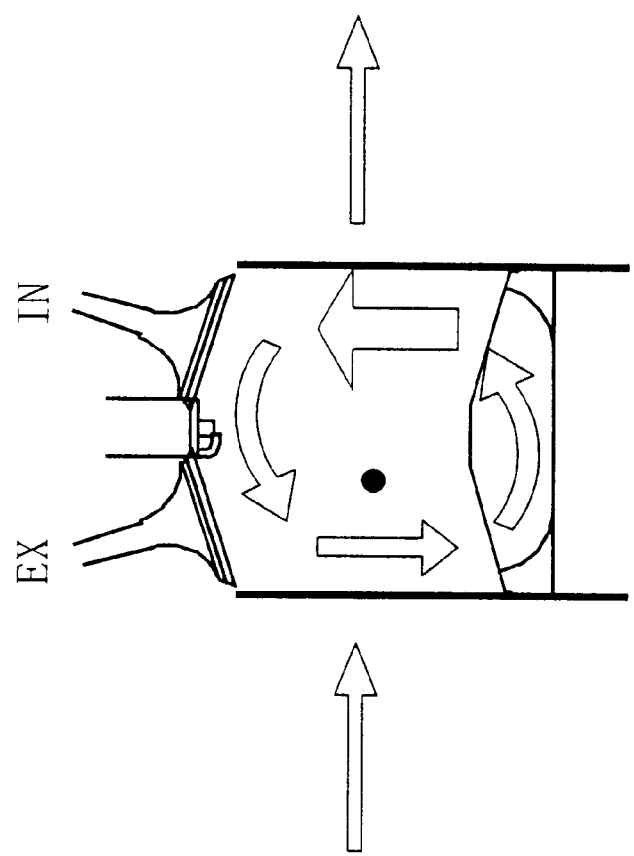
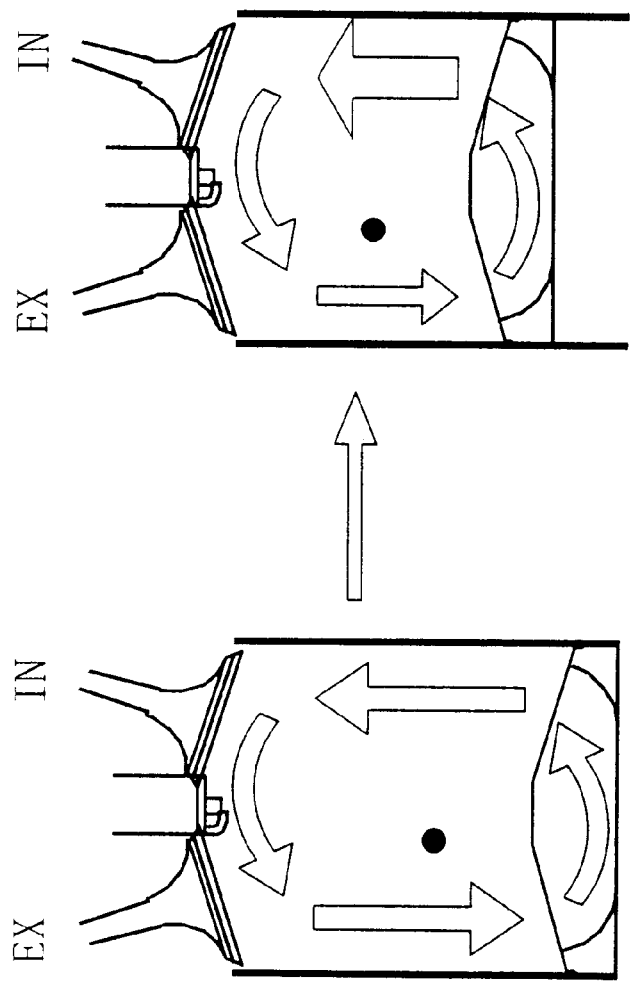

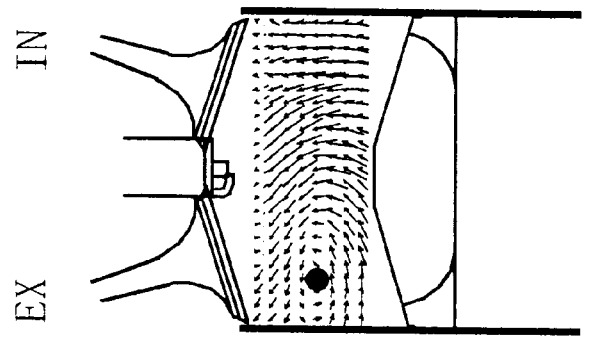
FIG. 42C  MID STAGE OF COMP. STROKE
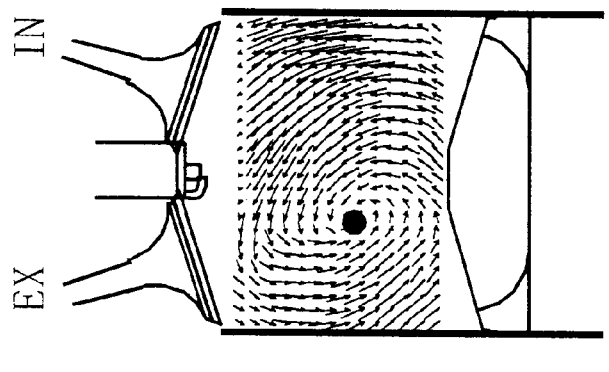
FIG. 42B
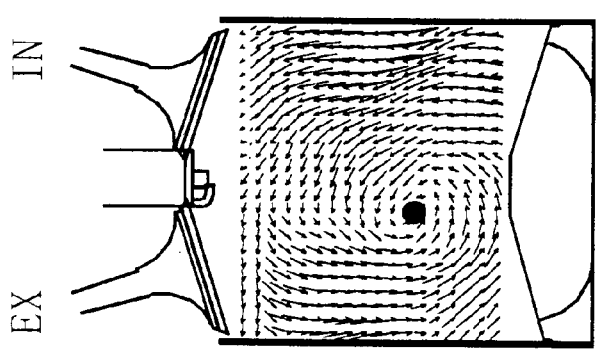
FIG. 42A  EARLY STAGE OF COMP. STROKE

EARLY STAGE OF COMP. STROKE

MID STAGE OF COMP. STROKE

DIRECT-INJECTION SPARK IGNITION ENGINE

This application is a Continuation of International Application No. PCT/JP01/02521, filed Mar. 27, 2001.

BACKGROUND OF THE INVENTION (a) Field of the Invention

This invention relates to a direct-injection spark ignition engine for directly injecting a fuel into a combustion chamber in a cylinder and igniting a mixture thus prepared in a condition of being stratified around an electrode of a spark plug, and more particularly relates to a technique of controlling behavior of fuel spray for promoting suitable stratification of the mixture by effectively using a tumble in the combustion chamber.

(b) Description of the Prior Art

Conventionally, direct-injection spark ignition engines of such type are constructed so that a high-pressure fuel injection nozzle is disposed so as to be presented to a combustion chamber in a cylinder and a cavity of predetermined shape is formed in a piston crown surface, whereby a fuel injected from the fuel injection nozzle is first brought into impingement against an inner wall surface or a bottom surface of the cavity opposed thereto and then confined in the cavity for stratification around a spark plug electrode.

There also exist engines of a type which concentrates a mixture into a cavity or transports it to the vicinity of a spark plug electrode using in-cylinder airflows, such as a swirl flow or a tumble flow, in a combustion chamber. For example, an in-cylinder injection type engine, as disclosed in Japanese Unexamined Patent Publication Gazette No. 11-141338, reverses the direction of fuel injection from that of the tumble, pushes back the mixture which tends to overflow from the cavity to confine it in the cavity by the action of the tumble, and transports the mixture to the vicinity of the spark plug electrode in the cavity while promoting vaporization of fuel droplets or mixture thereof with air.

Alternatively, like an in-cylinder injection type spark ignition engine disclosed in Japanese Unexamined Patent Publication Gazette No. 11-200866, there exist engines of a type which transports a fuel having been spread into a cavity toward a spark plug so as to carry the fuel with a tumble while suppressing adhesion of the fuel to a piston crown surface by forming the cavity substantially in the center of the piston crown surface and into a spherical shape to enhance retentivity of the tumble flow and by widening the spray cone angle of spray from a fuel injection nozzle up to, for example, 70°–90° to damp fuel spray penetration.

However, it is difficult to say that any prior art engines mentioned above suitably stratify the mixture over a wide range of operating conditions different in load and revolving speed. When viewed over a complete range of engine operating conditions, they still have plenty of room to enhance effects such as fuel economy improvement by stratified-charge combustion operation. Specifically, in the engine which requires to confine the mixture in the cavity like the former prior art (Japanese Unexamined Patent Publication No. 11-141338), the range of engine operating conditions within which the mixture can be suitably stratified is strictly constrained by the cavity size and shape, and in fact the range of operating conditions within which the engine is capable of stratified operation is limited to a narrow region on the low-load and low-speed end of its control map. Therefore, the engine can provide only a small effect of fuel economy improvement.

Furthermore, in such a direct-injection engine, since the inner wall surface of the cavity against which fuel spray injected from the fuel injection nozzle impinges is generally located in the vicinity of the center line of the cylinder, it cannot be avoided that the inner wall surface inhibits the growth of a flame core in the initial combustion stage and decreases flame propagation performance, which in fact deteriorates combustion quality. In addition, in this engine, since the fuel spray is caused to impinge against the inner wall surface or the bottom surface of the cavity, the amount of adhesion of the fuel to the wall surface and the like is increased. This invites inconveniences of decrease in fuel economy and increase in unburnt hydrocarbon (HC).

For example, FIG. 35 comparatively shows results of a test conducted as follows: a plurality of pistons different in their cavity shapes were prepared and the rate of fuel economy improvement and the rate of power output improvement of each engine by direct injection were experimentally obtained. According to the figure, there is a so-called "trade-off relationship" between fuel economy improvement and power output improvement. In the engine (Point A of the figure) in which the cavity in the shape of a deep dish is provided like the former prior art, the effect of fuel economy improvement at low load and low speeds is enhanced because the fuel spray can be confined suitably for stratification, whereas the effect of power output improvement is deteriorated because of degradation in the combustion quality particularly at higher engine speeds.

In a so-called "flat piston" (Point C) in which the crown surface thereof is simply formed in a concave shape, the effect of power output improvement at higher engine speeds is enhanced, whereas the effect of fuel economy improvement is inevitably deteriorated because of the difficulty in suitably stratifying the mixture at low load. As an intermediate between the above two types, there is an engine (Point B) in which the inner wall surface of the cavity opposed to the fuel injection nozzle is largely inclined. However, it cannot be expected that the engine of this type largely improves both fuel economy and power output.

Next, consider the latter prior art (Japanese Unexamined Patent Publication No. 11-200866). It seems that the latter prior art also produces the same inconveniences as caused in the former prior art when its cavity size is small. On the other hand, if its cavity size is large, then suitable stratification of the mixture becomes difficult like the above-mentioned flat piston. Specifically, the engine of this type intends to transport the fuel having been dispersed into the cavity to the spark plug so as to carry it with a tumble. However, when the cavity size is increased, it becomes difficult to concentrate the fuel thus dispersed. And even if the fuel can be concentrated, the fuel goes along with the tumble and passes by the vicinity of the spark plug electrode. Therefore, the period during which the mixture can be ignited by the spark plug is extremely short. Accordingly, it cannot be said that the engine implements suitable mixture stratification.

SUMMARY OF THE INVENTION

The present invention has been made in view of the foregoing points and a major object thereof is to improve fuel economy and power output through improvement of combustion quality and extension of a stratified-charge combustion zone by controlling fuel spray behavior in a combustion chamber to allow suitable mixture stratification over a wide range of operating conditions of a direct-injection spark ignition engine when the engine conducts stratified-charge combustion operation.

To attain the above object, in solutions of the present invention, a tumble is generated to flow from the vicinity of a spark plug electrode toward a fuel injection nozzle at the compression stroke of a cylinder during stratified-charge combustion operation of an engine, and a fuel is injected at a suitable penetration so as to go against the tumble so that a flammable mixture can be retained in the vicinity of the spark plug at an exact ignition timing for the cylinder.

More specifically, the invention of claim 1 is directed to a direct-injection spark ignition engine in which a spark plug is disposed in a cylinder at a ceiling of a combustion chamber opposed to a crown surface of a piston, a fuel injection nozzle is disposed in the combustion chamber to inject a fuel from a peripheral portion of the combustion chamber, and the fuel injected from the fuel injection nozzle is stratified around an electrode of the spark plug during stratified-charge combustion operation. The engine has a configuration which comprises: tumble generating means capable of generating a tumble which flows between the electrode of the spark plug and the crown surface of the piston toward the fuel injection nozzle during a compression stroke of the cylinder; and fuel injection control means for causing the fuel injection nozzle to inject the fuel in correspondence with an ignition timing for the cylinder so that fuel spray from the fuel injection nozzle goes against the tumble and stays in the vicinity of the electrode of the spark plug in the form of a flammable mixture at the time of ignition of the spark plug.

With the above configuration, during the stratified-charge combustion operation of the engine, a tumble generated by the tumble generating means flows toward the fuel injection nozzle at the compression stroke of the cylinder and in this state the fuel injection control means conducts operation control of the fuel injection nozzle in correspondence with an ignition timing for the cylinder. The fuel is thus injected from the fuel injection nozzle to impinge against the tumble. This fuel spray impinges against the tumble to promote atomization and dispersion of the fuel or mixture thereof with the ambient air, and gradually decreases its traveling speed by going against the tumble to stay in the vicinity of the electrode of the spark plug in the form of a flammable mixture of suitable concentration. In this manner, fuel spray behavior is controlled by the tumble so that the mixture can be suitably stratified around the spark plug electrode.

According to such mixture stratification, it is not necessary to cause the fuel spray to impinge against the piston crown surface. Therefore, the amount of adhesion of the fuel to the piston can be largely reduced. Furthermore, since such a cavity as used in the prior art (Japanese Unexamined Patent Publication No. 11-141338) is not necessarily required, this makes it possible to eliminate combustion inhibition of the inner wall surface of the cavity. Accordingly, combustion quality can be improved resulting in enhanced fuel economy and power output performance.

Furthermore, since the present invention has no constraint from the cavity size and shape as the prior art has, it can provide well stratified-charge combustion at higher engine speeds. This enables large fuel economy improvement when viewed over a complete range of engine operating conditions. In addition, since the mixture of suitable concentration can be retained in the vicinity of the spark plug electrode at the ignition timing for the cylinder as mentioned above, the period during which the mixture can be ignited with stability can be extremely elongated. This provides greater flexibility in controlling the ignition timing for the cylinder thereby allowing improvement of fuel economy and power output.

In the invention of claim 2, the electrode of the spark plug is disposed at the midpoint between a first partial flow of the tumble flowing along the crown surface of the piston and a second partial flow of the tumble flowing along the ceiling of the combustion chamber at a certain point after the start timing of fuel injection during the compression stroke of the cylinder and before the ignition timing for the cylinder. With this arrangement, the spark plug electrode is located in the vicinity of the center of the tumble vortex and therefore put into a condition that is hard to affect both the first and second partial tumble flows, i.e., a condition that is easy to retain the mixture. Further, since the spark plug electrode is located away from both the ceiling of the combustion chamber and the crown surface of the piston, this provides well flame propagation performance.

In the invention of claim 3, the electrode of the spark plug is disposed closer to the crown surface of the piston than to the nozzle hole of the fuel injection nozzle when viewed in a direction orthogonal to the center line of the cylinder. With this arrangement, the position of the spark plug electrode is specified and the same operations and effects as obtained in the invention of claim 2 can be obtained.

In the invention of claim 4, the electrode of the spark plug protrudes from the ceiling of the combustion chamber in a direction parallel to the center line of the cylinder, and the distance e between the ceiling of the combustion chamber and the electrode of the spark plug is set at a value satisfying the relationship of $e \geq 0.4d$ where d is the distance on the center line of the cylinder between the ceiling of the combustion chamber and the crown surface of the piston when the cylinder is at the top dead center during the compression stroke thereof. With this arrangement, the position of the spark plug electrode is specified and the same operations and effects as obtained in the invention of claim 2 can be obtained.

In the invention of claim 5, for the engine of claim 4, the distance e between the ceiling of the combustion chamber and the electrode of the spark plug is set at a value satisfying the relationship of $e \geq 0.2d$ where d is the distance on the center line of the cylinder between the ceiling of the combustion chamber and the crown surface of the piston when the cylinder is at a 55° crank angle (CA) before the top dead center during the compression stroke thereof. With this arrangement, the position of the spark plug electrode is specified and the same operations and effects as obtained in the invention of claim 2 can be obtained.

In the invention of claim 6, the electrode of the spark plug in the invention of claim 4 is disposed closer to the ceiling of the combustion chamber than to the crown surface of the piston, when viewed along the center line of a geometrical area of fuel spray from the fuel injection nozzle during the compression stroke of the cylinder, with respect to the center line of fuel spray. In this case, the geometrical area of fuel spray means an area of fuel spray droplets when it is assumed that there is no in-cylinder airflow in the combustion chamber. In this invention, since the electrode of the spark plug is disposed closer to the ceiling of the combustion chamber with respect to the center line of the geometrical area of fuel spray, this suppresses adhesion of large fuel droplets included in initial fuel spray to the electrode thereby obviating the occurrence of smolder in the spark plug.

In the invention of claim 7, the spray cone angle of fuel spray from the fuel injection nozzle during the compression stroke of the cylinder is at a value within the range of approximately 20° to 60°.

If the spray cone angle of fuel spray from the fuel injection nozzle is larger, the fuel spray is more diffused by impingement against the tumble so that the mixture tends to become leaner. On the other hand, if the spray cone angle of spray is too small, carburetion of fuel droplets and mixture thereof with air cannot sufficiently be made, so that the mixture may be excessively rich. To cope with these circumstances, in this invention, the spray cone angle of fuel spray during the compression stroke of the cylinder is set at a value within the range of approximately 20° to 60°. As a result, the mixture residing in the vicinity of the spark plug electrode becomes suitable in concentration thereby ensuring excellent ignition stability.

In the invention of claim 8, the fuel injection nozzle is disposed so that the fuel spray impinges substantially oppositely against the tumble flowing along the crown surface of the piston during the compression stroke of the cylinder.

With this arrangement, since the fuel spray from the fuel injection nozzle impinges substantially oppositely against the tumble, the tumble precisely regulates the traveling speed of the fuel spray thereby retaining the flammable mixture in the vicinity of the spark plug electrode with certainty. Further, since the relative speed of the tumble to the fuel spray is increased, this promotes fuel carburetion.

In the invention of claim 9, the crown surface of the piston is formed with a cavity longer in a direction in which the center line of fuel spray extends when viewed along the center line of the cylinder, and the cavity has such a form that maximizes the distance thereof along the center line of the cylinder from the ceiling of the combustion chamber at the position corresponding to the center line of the cylinder.

With this arrangement, the tumble flows toward the fuel spray along the cavity of the piston crown surface. Accordingly, the tumble can impinge against the fuel spray with stability. Further, since the volume of the combustion chamber can be ensured in the vicinity of the spark plug electrode, the mixture can be easily retained there.

In the invention of claim 10, the deepest portion of the cavity in the invention of claim 9 is positioned in correspondence with the center line of the cylinder. With this arrangement, the tumble can smoothly flow along the cavity and can be retained without collapsing up to the late stage of the compression stroke of the cylinder.

In the invention of claim 11, the deepest portion of the cavity in the invention of claim 9 is positioned closer to an intake side than the position corresponding to the center line of the cylinder. In general, when the tumble in the combustion chamber is weak, there occurs a phenomenon that its partial flow at an exhaust side of the combustion chamber toward the piston crown surface is damped under the influence of upward motion of the piston so that the center of the tumble vortex gradually moves closer to the exhaust side. This results in inconveniences of difficulty in stable impingement of the tumble against the fuel spray and early collapse of the tumble.

On the contrary, in this invention, the cavity of the piston crown surface is formed so that the deepest portion thereof is positioned closer to the intake side than a position corresponding to the center line of the cylinder. Accordingly, the intake side volume of the combustion chamber becomes larger than the exhaust side one thereof so that vortex retentivity at the intake side of the combustion chamber can be enhanced. This suppresses movement of the vortex center to the exhaust side thereby obviating the above inconveniences.

In the invention of claim 12, the crown surface of the piston is formed with a cavity that accommodates the electrode of the spark plug when viewed along the center line of the cylinder, and is also formed with squish area sections each for generating a squish flowing toward the inside of the cavity in cooperation with the opposed ceiling of the combustion chamber, the squish area sections being formed in an outer portion of the piston crown surface, located outside of the cavity, at at least both lateral locations thereof from the electrode of the spark plug with respect to the center line of the fuel spray when viewed along the center line of the cylinder.

With this arrangement, after the middle stage of the compression stroke of the cylinder, a squish area is formed between the squish area sections located on at least both lateral sides of the spark plug electrode in the outer portion of the piston crown surface and the opposed ceiling of the combustion chamber. Squishes are generated to flow toward the inside of the cavity from the squish area. The squishes suppress lateral diffusion of the flammable mixture residing in the vicinity of the spark plug electrode. This makes it possible to form a compact layer of flammable mixture thereby enhancing ignition stability and combustion quality and improving fuel economy.

In the invention of claim 13, for the engine in the invention of claim 12, the opening width of the cavity in the lateral direction when viewed along the center line of the cylinder is maximized in the vicinity of the electrode of the spark plug. With this arrangement, both side walls of the cavity are spaced apart from the spark plug electrode as far as possible. This avoids the side walls from interfering with the growth of the flame core generated in the vicinity of the electrode and deteriorating the flame propagation performance.

In the invention of claim 14, for the engine of claim 13, the opening width of the cavity in the lateral direction in the vicinity of the electrode of the spark plug when viewed along the center line of the cylinder is set to include a geometrical area of fuel spray from the fuel injection nozzle during the compression stroke of the cylinder. With this arrangement, the opening width of the cavity in the lateral direction is ensured sufficiently largely thereby obtaining operations and effects of the invention of claim 13 with certainty.

In the invention of claim 15, the ceiling of the combustion chamber in the invention of claim 13 is formed with a pair of intake ports, and the opening width of the cavity in the lateral direction in the vicinity of the electrode of the spark plug when viewed along the center line of the cylinder is equal to or more than the center distance between the pair of intake ports. With this arrangement, the opening width of the cavity in the lateral direction is ensured sufficiently largely thereby obtaining operations and effects of the invention of claim 13 with certainty.

In the invention of claim 16, the squish area sections in the invention of claim 12 are provided in the outer portion of the crown surface of the piston to continue from both the lateral locations thereof, which interpose the electrode of the spark plug therebetween, toward the exhaust side.

With this arrangement, a squish area can be formed in the outer portion of the piston crown surface over a wider region including both lateral sides of the spark plug electrode. Accordingly, squishes flowing from the squish area toward the inside of the cavity can enwrap the flow of the mixture and the tumble as a whole. As a result, a compact layer of flammable mixture can be formed in the vicinity of the spark plug electrode, thereby further enhancing the operations and effects of the invention of claim 12.

In the invention of claim 17, the crown surface of the piston is formed with a squish area section for generating squishes in cooperation with the ceiling of the combustion chamber so that a layer of the flammable mixture residing in the vicinity of the electrode of the spark plug takes on a diametrically diminished form on the side closer to the ceiling of the combustion chamber when viewed along the center line of the fuel spray.

With this arrangement, after the middle stage of the compression stroke of the cylinder, a squish area is formed between the squish area section in the piston crown surface and the opposed ceiling of the combustion chamber, and squishes are generated to flow toward the inside of the cavity therefrom. The squishes cause the layer of the flammable mixture residing in the vicinity of the spark plug electrode to take on a diametrically diminished form on the side closer to the ceiling of the combustion chamber when viewed along the center line of the fuel spray. Consequently, the mixture can be concentrated in the vicinity of the spark plug electrode through the squishes thereby forming a compact layer of flammable mixture. This improves ignition stability and combustion quality like the invention of claim 12.

In the invention of claim 18, the crown surface of the piston in the invention of claim 17 is formed with a cavity so as to accommodate the electrode of the spark plug and the layer of flammable mixture residing in the vicinity of the electrode of the spark plug when viewed along the center line of the cylinder, and the squishes act to suppress diffusion of the layer of flammable mixture so that the profile of the layer of flammable mixture is spaced apart from the side walls of the cavity and has a larger distance from each of the side walls as it approaches the ceiling of the combustion chamber.

With this configuration, the above operations and effects as obtained in the invention of claim 17 can be obtained. In addition, since the profile of the layer of flammable mixture residing in the vicinity of the electrode of the spark plug is spaced apart from the side walls of the cavity, this prevents adhesion of the fuel to the side walls and suppresses deterioration of fuel economy and increase of unburnt hydrocarbon in the exhaust gas due to adhesion of fuel.

In the invention of claim 19, the fuel injection control means controls penetration of fuel spray through the fuel injection nozzle in accordance with the flow rate of the tumble opposed to the fuel spray. With this configuration, even if the flow rate of the tumble in the combustion chamber of the cylinder changes, the penetration of the fuel spray can be controlled in accordance with the change in the tumble flow rate so that the flammable mixture can be retained in the vicinity of the spark plug electrode. Accordingly, well stratified-charge combustion can be implemented with stability even if the engine operating conditions change.

In the invention of claim 20, the fuel injection control means in the invention of claim 19 controls the penetration of fuel spray from the fuel injection nozzle in accordance with the revolving speed of a crank shaft. In general, the flow rate of the tumble in the combustion chamber of the cylinder changes with the revolving speed of the crank shaft of the engine (hereinafter, also referred to the engine revolving speed). Therefore, if the penetration of the fuel spray is controlled in accordance with the revolving speed of the crank shaft, it can be controlled in accordance with the flow rate of the tumble.

In the invention of claim 21, for the engine in the invention of claim 19, injection pressure regulating means is provided for regulating the fuel injection pressure of the fuel injection nozzle, and the fuel injection control means is arranged to cause the injection pressure regulating means to increase the fuel injection pressure in increasing the penetration of the fuel spray and to decrease the fuel injection pressure in decreasing the penetration of the fuel spray.

With this configuration, the penetration of the fuel spray can be surely controlled by changing the injection pressure of fuel from the fuel injection nozzle through the injection pressure regulating means. Further, since regulation of the fuel injection pressure is excellent in controllability and responsibility, it also has a high responsibility to change in the engine operating conditions.

In the invention of claim 22, the fuel injection control means in the invention of claim 21 is arranged to correctively control the operation of the injection pressure regulating means in accordance with the temperature conditions of the combustion chamber so that the fuel injection pressure becomes larger as the temperature of the combustion chamber is increased even if the fuel injection quantity and the revolving speed of the crank shaft are substantially constant.

The penetration of the fuel spray through the fuel injection nozzle changes depending upon the temperature conditions of the combustion chamber. The temperature conditions of the combustion chamber change if the fuel injection quantity (engine load) or the revolving speed of the crank shaft (engine revolving speed) varies, and it also changes depending upon the warming-up conditions of the engine or the existence/absence of recirculation of exhaust gas. As an example, after the warming up of the engine, the temperature of the intake air sucked in the combustion chamber becomes higher as compared with that before the completion of the warming up, and the combustion temperature is also increased after the warming up so that the temperature of the combustion chamber becomes higher. Furthermore, the exhaust temperature becomes higher with the increase in the combustion temperature. At the recirculation of the exhaust gas, the intake temperature is also increased under the influence of the high-temperature exhaust gas. As a result, fuel carburetion is promoted so that the penetration of fuel spray shows a tendency to decrease.

To cope with the above problem, in this invention, the fuel injection pressure is corrected in accordance with the temperature conditions of the combustion chamber even if the revolving speed and load conditions of the engine are constant. Accordingly, variation in penetration of fuel spray can be prevented and fuel spray behavior can be controlled with stability.

In the invention of claim 23, the fuel injection nozzle in the invention of claim 19 is provided with a variable spray angle mechanism for adjusting the spray cone angle of fuel spray, and the fuel injection control means is arranged to cause the variable spray angle mechanism to decrease the spray cone angle of fuel spray in increasing the penetration of fuel spray and to increase the spray cone angle of fuel spray in decreasing the penetration of fuel spray. In this manner, the penetration of fuel spray can be surely controlled by changing the spray cone angle of fuel spray of the fuel injection nozzle through the variable spray angle mechanism.

In the invention of claim 24, the fuel injection control means in the invention of claim 19 is arranged to increase the penetration of fuel spray through the fuel injection nozzle to correspond to rise in the revolving speed of the crank shaft until the revolving speed of the crank shaft reaches a predetermined value and suppress increase of the penetration when the revolving speed of the crank shaft reaches or exceeds the predetermined value. In addition, the engine is further provided with: variable tumble means for making the flow rate of the tumble variable; and tumble control means for operating the variable tumble means to suppress increase in the flow rate of the tumble which corresponds to increase in the revolving speed of the crank shaft when the revolving speed of the crank shaft reaches or exceeds the predetermined value.

When the revolving speed of the crank shaft of the engine is increased so that the flow rate of the tumble reaches or exceeds the predetermined value, if the fuel penetration is increased correspondingly, impingement between the fuel spray and the tumble become too much hard. This results in an inconvenience that the mixture is diffused to the surroundings so that the degree of stratification is decreased. To cope with this problem, in this invention, such a revolving speed as the impingement becomes much hard is experimentally obtained and predetermined, and when the revolving speed of the engine reaches or exceeds the predetermined value, increase in the flow rate of the tumble and increase in the penetration of fuel spray are suppressed. In this manner, over-diffusion of the mixture as mentioned above can be prevented.

In the invention of claim 25, the variable tumble means in the invention of claim 24 comprises an intake airflow control valve for changing the flowing conditions of the intake air flowing into the combustion chamber. With this configuration, the flow rate of the tumble in the combustion chamber can be surely controlled by changing the flowing conditions of the intake air flowing into the combustion chamber through the intake airflow control valve.

In the invention of claim 26, the variable tumble means in the invention of claim 24 is a variable valve timing mechanism for changing the valve timing of at least one of intake and exhaust valves. With this configuration, the flow rate of the tumble in the combustion chamber can be surely controlled by changing the valve timing of at least one of the intake valve and the exhaust valve through the variable valve timing mechanism.

In the invention of claim 27, the tumble control means in the invention of claim 24 correctively controls the operation of the variable tumble means in accordance with the temperature conditions of the combustion chamber so that the flow rate of the tumble is lower as the temperature of the combustion chamber is higher even if the fuel injection quantity and the revolving speed of the crank shaft are substantially constant.

The penetration of the fuel spray through the fuel injection nozzle changes depending upon the temperature conditions of the combustion chamber. The temperature conditions of the combustion chamber change if the fuel injection quantity (engine load) or the revolving speed of the crank shaft (engine revolving speed) varies, and it also changes depending upon the warming-up conditions of the engine or the existence/absence of recirculation of exhaust gas. As an example, after the warming up of the engine, the temperature of the intake air sucked in the combustion chamber becomes higher as compared with that before the completion of the warming up, and the combustion temperature is also increased after the warming up so that the temperature of the combustion chamber becomes higher. Furthermore, the exhaust temperature becomes higher with the increase in the combustion temperature. At the recirculation of the exhaust gas, the intake temperature is also increased under the influence of the high-temperature exhaust gas. As a result, fuel carburetion is promoted so that the penetration of fuel spray shows a tendency to decrease.

To cope with the above problem, in this invention, the flow rate of the tumble which is balanced against the penetration of the fuel spray is corrected in accordance with the temperature conditions of the combustion chamber even if the revolving speed and load conditions of the engine are constant. Accordingly, even if the penetration of fuel spray varies as mentioned above, the attendant adverse effects can be eliminated and fuel spray behavior can be controlled with stability.

Next, the invention of claim 28 is directed to a direct-injection spark ignition engine in which a spark plug is disposed in a cylinder at a ceiling of a combustion chamber opposed to a crown surface of a piston, a fuel injection nozzle is disposed in the combustion chamber to inject a fuel from a peripheral portion of the combustion chamber, and the fuel injected from the fuel injection nozzle is stratified around an electrode of the spark plug during stratified-charge combustion operation. In this engine, the spark plug is disposed so that the electrode thereof protrudes from the ceiling of the combustion chamber in a direction parallel to the center line of the cylinder and the distance e between the ceiling of the combustion chamber and the electrode thereof has a value satisfying the relationship of $e \geq 0.4d$ where d is the distance on the center line of the cylinder between the ceiling of the combustion chamber and the crown surface of the piston when the cylinder is at the top dead center during the compression stroke thereof. Further, the fuel injection nozzle is disposed so that the spray cone angle of fuel spray therefrom has a value within the range of approximately 20° to 60° and the center line of fuel spray therefrom has a tilt angle within the range of approximately 25° to 40° with respect to an assumed plane orthogonal to the center line of the cylinder. Furthermore, the engine has a configuration which comprises: tumble generating means capable of generating a tumble which flows between the electrode of the spark plug and the crown surface of the piston toward the fuel injection nozzle during a compression stroke of the cylinder; and fuel injection control means for controlling penetration of fuel spray through the fuel injection nozzle in accordance with the flow rate of the tumble and causing the fuel injection nozzle to inject fuel against the tumble.

With the above configuration, like the invention of claim 1, during the stratified-charge combustion operation of the engine, the fuel injection control means causes the fuel injection nozzle to inject fuel spray against a tumble flowing from the center toward the periphery of the combustion chamber during the compression stroke of the cylinder and controls penetration of the fuel spray in accordance with the tumble intensity. In this manner, fuel spray behavior is controlled by the tumble so that the mixture can be suitably stratified around the electrode of the spark plug. Accordingly, the stratified-charge combustion zone of the engine can be enlarged resulting in largely improved fuel economy. In addition, since the mixture can be retained around the spark plug electrode, this provides greater flexibility in controlling the ignition timing for the cylinder thereby allowing improvement of fuel economy and power output.

In this case, since the center line of fuel spray from the fuel injection nozzle has a tilt angle within the range of approximately 25° to 40° with respect to an assumed plane orthogonal to the center line of the cylinder and the spray cone angle of fuel spray therefrom has a value within the range of approximately 20° to 60°, the fuel spray effectively impinges against the tumble to be approximately opposite it without substantially adhering to the piston crown surface. Accordingly, the tumble sufficiently promotes fuel carburetion and precisely controls fuel spray behavior so that the concentration of the mixture residing in the vicinity of the spark plug electrode can be made extremely suitable.

Further, since the electrode of the spark plug protrudes from the ceiling of the combustion chamber and is located in the vicinity of the center of the tumble vortex, the retention period of the mixture around the electrode can be elongated, which further increases the above-mentioned flexibility in controlling the ignition timing and improves propagation performance of flame front from a flame core generated in the vicinity of the electrode. This also provides further improvement of fuel economy and power output.

In the invention of claim 29, the engine in the invention of claim 28 further comprises: variable tumble means for making the flow rate of the tumble variable; and tumble control means for operating the variable tumble means so that a tumble ratio during the compression stroke of the cylinder falls within the range of approximately 1.1 to 2.3.

When the penetration of fuel spray is controlled in accordance with the flow rate of the tumble by the fuel injection control means in the invention of claim 28, if they are too much great even though balanced one against another, the fuel spray is diffused to the surroundings by their hard impingement so that suitable stratification of the mixture cannot be provided. To cope with this problem, in this invention, the operation of the variable tumble means is controlled by the tumble control means so that the tumble ratio in the combustion chamber is held within the range of approximately 1.1 to 2.3. In this manner, over-diffusion of the fuel spray as mentioned above can be prevented like the invention of claim 21.

In the invention of claim 30, the engine in the invention of claim 28 further comprises injection pressure regulating means for regulating the fuel injection pressure of the fuel injection nozzle, and the fuel injection control means controls the operation of the injection pressure regulating means so that the fuel injection pressure falls within the range of approximately 3 MPa to 13 MPa.

When the penetration of fuel spray is controlled in accordance with the flow rate of the tumble by the fuel injection control means in the invention of claim 28, if they are too much great even though balanced one against another, the fuel spray is diffused to the surroundings by their hard impingement so that suitable stratification of the mixture cannot be provided. To cope with this problem, in this invention, the injection pressure of fuel from the fuel injection nozzle is regulated by the injection pressure regulating means to fall within the range of approximately 3 MPa to 13 MPa. In this manner, over-diffusion of the fuel spray as mentioned above can be prevented while atomization property and other properties of fuel are well maintained within the range where the flow rate of the tumble is not excessively high.

As described so far, according to the direct-injection spark ignition engine of the invention of claim 1, during its stratified-charge combustion operation, fuel spray behavior is controlled by a tumble without confining fuel having been injected by the fuel injection nozzle at the compression stroke of the cylinder to the cavity or the like of the piston. As a result, the mixture around the spark plug can be suitably stratified regardless of the engine operating conditions. This improves combustion quality thereby providing enhanced fuel economy and power output performance, and extends the stratified-charge combustion zone thereby enabling large improvement of fuel economy when viewed over a complete range of engine operating conditions. In addition, since the mixture can be retained in the vicinity of the spark plug electrode, flexibility in controlling the ignition timing is enhanced. This also enables improvement of fuel economy and power output performance.

According to the invention as set forth in each of claims 2 to 5, since the position of the spark plug electrode is optimized, this enhances ignition stability and other properties of the mixture thereby sufficiently exhibiting the effects of the invention of claim 1.

According to the invention of claim 6, since the electrode of the spark plug is positioned apart from the center line of the geometrical area of fuel spray mainly from the fuel injection nozzle, this suppresses adhesion of large fuel droplets to the electrode thereby obviating the occurrence of smolder of the spark plug.

According to the invention of claim 7, since the spray cone angle of fuel spray through the fuel injection nozzle is optimized, the mixture in the vicinity of the spark plug electrode can be optimized in its concentration conditions thereby sufficiently exhibiting the effects of the invention of claim 1.

According to the invention of claim 8, since the direction of fuel spray from the fuel injection nozzle is optimized, fuel spray behavior can be effectively controlled by the tumble while carburetion of the fuel spray is promoted. This sufficiently exhibits the effects of the invention of claim 1.

According to the invention of claim 9, since the crown surface of the piston is formed with a cavity of suitable form, the tumble can impinge against the fuel spray with stability and the mixture can be easily retained in the vicinity of the spark plug electrode. This sufficiently exhibits the effects of the invention of claim 1.

According to the invention of claim 10, the sectional form of the cavity becomes suitable and therefore the retentivity of the tumble can be enhanced.

According to the invention of claim 11, the effect of upward motion of the piston can be reduced even if the tumble in the combustion chamber is relatively weak. This enhances retentivity of the tumble.

According to the invention of claim 12, squishes flowing toward the spark plug electrode from both lateral sides with respect to the center line of fuel spray suppress diffusion of the flammable mixture residing in the vicinity of the spark plug electrode, thereby enhancing ignition stability and combustion quality.

According to the invention as set forth in each of claims 13 to 15, since inner walls of the cavity are spaced apart from the spark plug electrode as far as possible, this avoids the inner walls from interfering with the growth of the flame core and deteriorating flame propagation performance.

According to the invention of claim 16, squishes, which flow from the squish area toward the inside of the cavity to enwrap the mixture flow and the like, allow for the formation of a compact layer of flammable mixture in the vicinity of the spark plug electrode, thereby further enhancing the effects of the invention of claim 12.

According to the invention of claim 17, squishes allow for the formation of a compact layer of flammable mixture taking on a diametrically diminished form on the side closer to the ceiling of the combustion chamber in the vicinity of the spark plug electrode. This improves ignition stability and combustion quality like the invention of claim 12.

According to the invention of claim 18, the effects as obtained in the invention of claim 17 can be obtained. In addition, it can be prevented that fuel adheres to the side walls of the cavity provided in the piston crown surface. This suppresses deterioration of fuel economy and increase of unburnt hydrocarbon in the exhaust gas.

According to the invention of claim 19, since the penetration of fuel spray through the fuel injection nozzle is controlled in accordance with the flow rate of the tumble opposed to the fuel spray, the mixture can be suitably stratified by controlling fuel spray behavior through the tumble even if the engine operating conditions change.

According to the invention of claim 20, since the penetration of fuel spray through the fuel injection nozzle is controlled in accordance with the revolving speed of a crank shaft, the penetration of the fuel spray can be controlled in accordance with the flow rate of the tumble.

According to the invention of claim 21, the penetration of the fuel spray can be surely controlled by changing the injection pressure of fuel from the fuel injection nozzle through the injection pressure regulating means.

According to the invention of claim 22, even if the temperature conditions of the combustion chamber change, fuel spray behavior can be controlled with stability by correcting the fuel injection pressure in accordance with the temperature conditions of the combustion chamber.

According to the invention of claim 23, the penetration of fuel spray can be surely controlled by changing the spray cone angle of fuel spray from the fuel injection nozzle through the variable spray angle mechanism.

According to the invention of claim 24, over-diffusion of the mixture can be prevented by suppressing both increase in the flow rate of the tumble and increase in the penetration of fuel spray before impingement between the fuel spray and the tumble become too much hard.

According to the invention of claim 25, the flow rate of the tumble in the combustion chamber can be surely controlled by changing the flowing conditions of the intake air flowing into the combustion chamber through the intake airflow control valve.

According to the invention of claim 26, the flow rate of the tumble in the combustion chamber can be surely controlled by changing the valve timing of at least one of the intake valve and the exhaust valve through the variable valve timing mechanism.

According to the invention of claim 27, even if the temperature conditions of the combustion chamber change, the attendant variation in the penetration of fuel spray can be cancelled out by correcting the flow rate of the tumble, which is balanced against the penetration of the fuel spray, in accordance with the temperature conditions of the combustion chamber. Accordingly, behavior of fuel spray can be controlled with stability.

According to the direct-injection spark ignition engine of the invention of claim 28, like the invention of claim 1, well stratified-charge combustion can be provided thereby improving fuel economy and power output, the stratified-charge combustion zone can be enlarged thereby enabling large improvement of fuel economy, and flexibility in controlling the ignition timing can be enhanced thereby further improving fuel economy and power output performance. Furthermore, since the direction and spray cone angle of fuel spray from the fuel injection nozzle and the position of the spark plug electrode are optimized, this prevents adhesion of fuel to the piston crown surface and provides further improvement in combustion quality thereby improving fuel economy and power output performance as much as possible.

According to the invention of claim 29, since the tumble ratio in the combustion chamber of the engine cylinder is set within the range of approximately 1.1 to 2.3, over-diffusion of the fuel spray can be prevented thereby improving ignition stability.

According to the invention of claim 30, since the fuel injection pressure of the fuel injection nozzle is set within the range of approximately 3 MPa to 13 MPa, this prevents over-diffusion of the fuel spray for the improvement in ignition stability while maintaining well atomization property and other properties of fuel.

BRIEF DESCRIPTION OF THE DRAWINGS

FIG. 7A is a top view showing the structure of the piston, FIG. 7B is a cross-sectional view cut along the line b—b, and FIG. 7C is a cross-sectional view cut along the line c—c.

FIG. 10A is a diagram illustrating the spray cone angle of fuel spray, and FIG. 10B is a diagram illustrating the penetration of fuel spray.

FIG. 15 is a graph showing the relation between the change in the local air fuel ratio around the spark plug electrode and the change in the spray cone angle of fuel spray.

FIG. 24A is a view showing a state of a mixture where the tumble moderately impinges against the fuel spray, and FIG. 24B is a view showing a state of a mixture where impingement is too much hard.

FIG. 29A is a graph showing the change in temperature conditions of the combustion chamber in relation to the change in the intake temperature and the change in the penetration of fuel spray, and FIG. 29B is a graph showing the change in temperature conditions of the combustion chamber in relation to the change in the fuel injection pressure and the attendant change in the penetration of fuel spray.

FIGS. 41A–C show diagrams schematically illustrating how the center of a tumble vortex moves with upward movement of the piston during a period from the early stage to middle stage of the compression stroke of the cylinder.

FIGS. 42A–C show diagrams of results of a CFD analysis on the change in flow distribution during the period from the early stage to middle stage of the compression stroke of the cylinder.

DESCRIPTION OF THE PREFERRED EMBODIMENTS

Hereinafter, embodiments of the present invention will be described with reference to the drawings.

Embodiment 1

Figure 2:
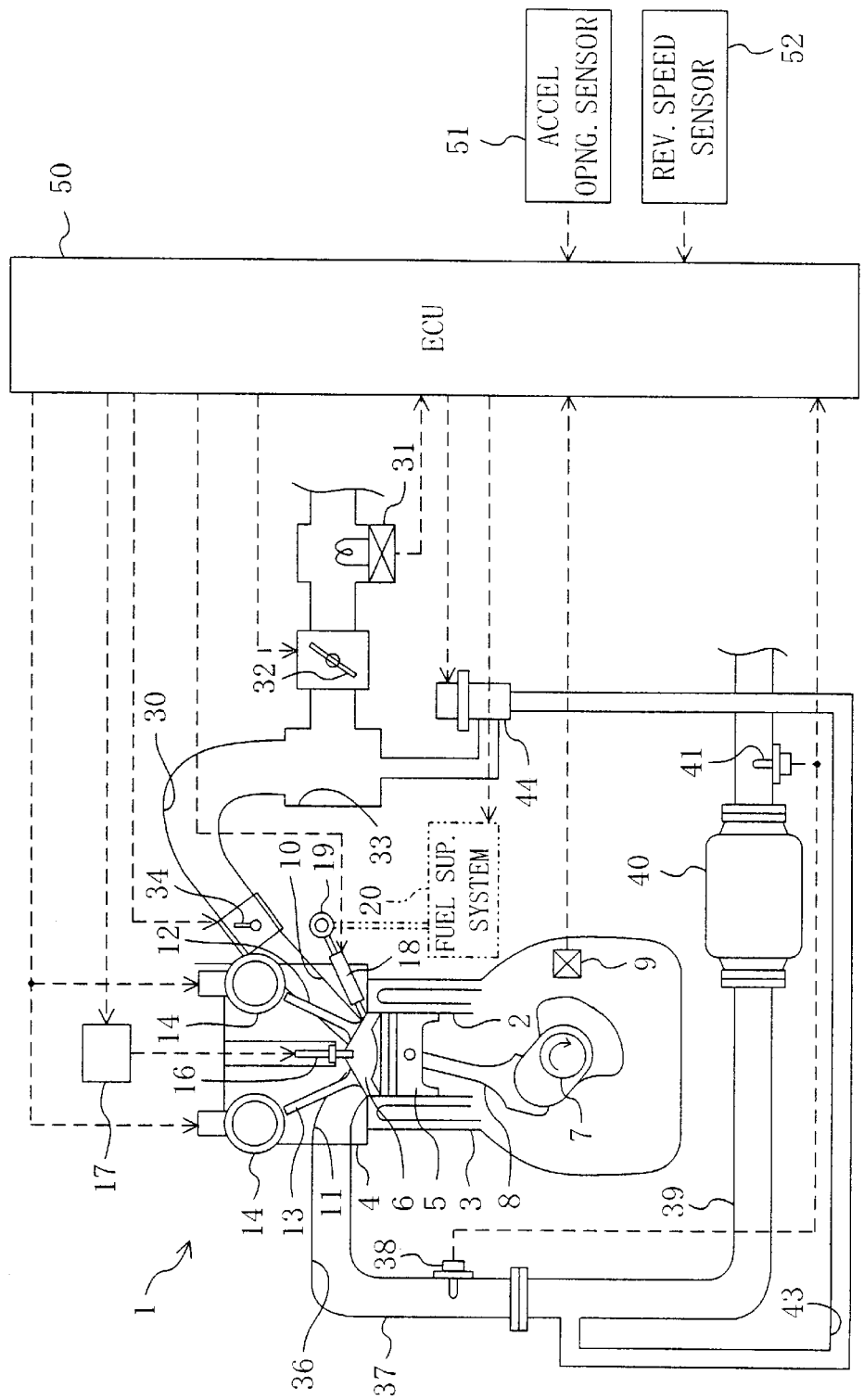
FIG. 2 is a diagram showing the entire structure of the engine.

FIG. 2 shows the entire structure of a direct-injection spark ignition engine 1 according to Embodiment 1 of the present invention. This engine 1 includes a cylinder block 3 in which a plurality of cylinders 2, 2, . . . (only one shown in the figure) are arranged in line and a cylinder head 4 disposed on the cylinder block 3. A piston 5 is fitted into each of the cylinders 2 for vertical reciprocating motion in the figure. A combustion chamber 6 is defined between the piston 5 and the cylinder head 4 in the cylinder 2. A crank shaft 7 is rotatably supported below the piston 5 in the cylinder block 3, and the crank shaft 7 and the piston 5 are connected through a connecting rod 8. At one side of the crank shaft 7, a solenoid-operated crank angle sensor 9 is disposed for detecting the revolving angle of the crank shaft 7.

Figure 3:
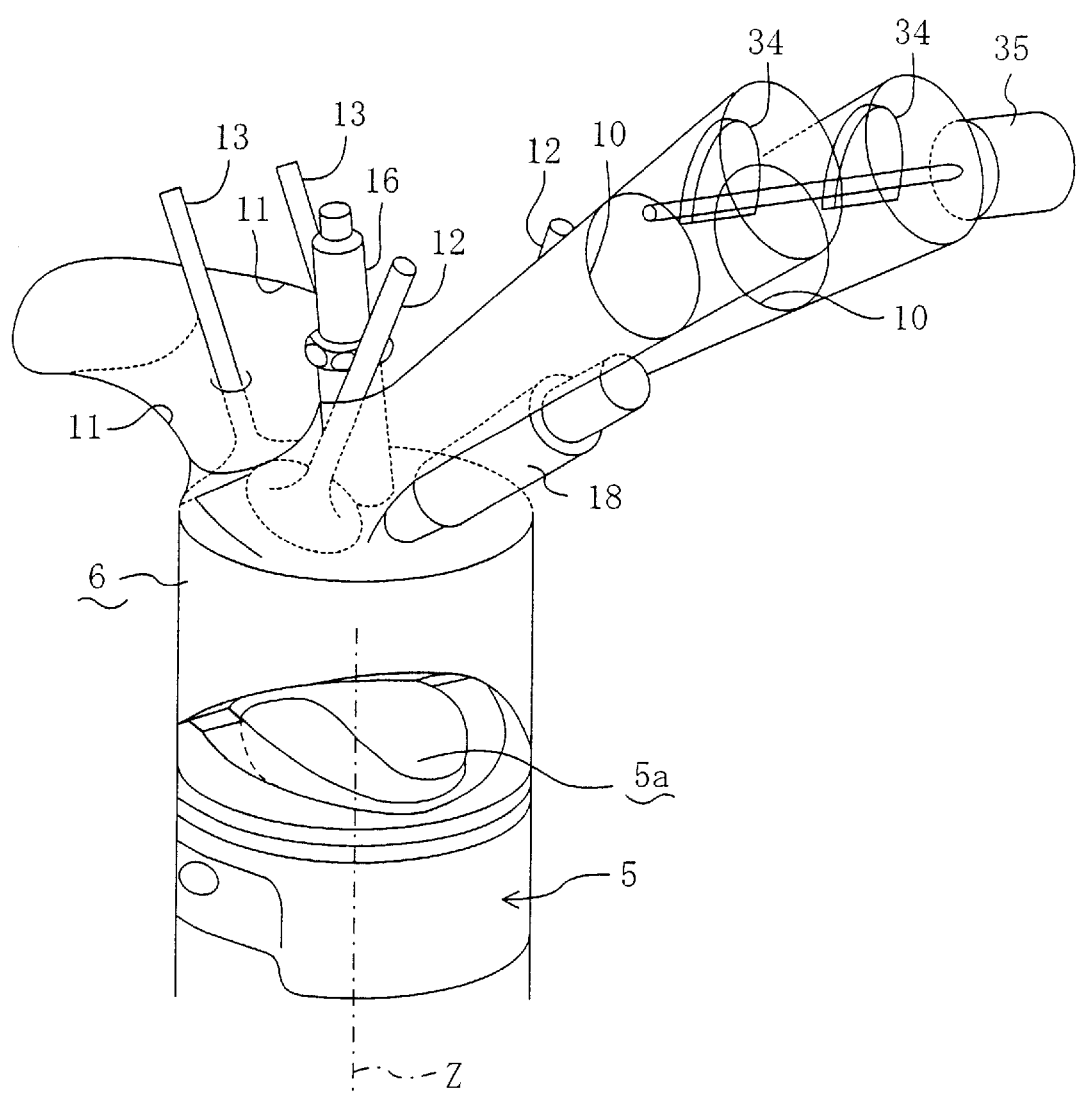
FIG. 3 is a perspective view showing the layout of a piston crown surface, an intake port, a spark plug and an injector.

As shown in FIG. 3 in enlarged manner, the ceiling of each cylinder 2 is formed with two inclined surfaces extending substantially from its midportion to the vicinity of the lower end surface of the cylinder head 4, thereby forming a so-called "pent-roof type" combustion chamber 6 which takes on a roof-like form such that the inclined surfaces lean to each other. Two intake ports 10 and two exhaust ports 11 are formed in the two inclined surfaces, respectively. Intake valves 12, 12 and exhaust valves 13, 13 are disposed at the corresponding open ends of the ports. The two intake ports 10, 10 each extend straight and obliquely upward from the combustion chamber 6 and are open independently of each other on one side of the engine 1 (right-hand side in FIG. 2), while the two exhaust ports 11, 11 meet together halfway, then extend substantially horizontally and are finally open on the other side of the engine 1 (left-hand side in FIG. 2).

The intake valve 12 and the exhaust valve 13 are opened in a manner to be pressed in directions of their valve axes by two cam shafts (not shown) pivoted inside of the cylinder head 4. These cam shafts are rotated by respective timing belts in synchronism with the crank shaft 7, so that the intake valve 12 and the exhaust valve 13 can be opened at each predetermined timing for each cylinder 2. Known variable valve timing mechanisms 14, 14 each for continuously changing the phase relative to the crank shaft 7 within a predetermined range of angles are attached to the two cam shafts, respectively. The variable valve timing mechanisms 14, 14 changes individually the respective opening/closing timings of the intake valve 12 and the exhaust valve 13.

Further, as shown in FIG. 3, a spark plug 16 is disposed at an upper part of the combustion chamber 6 so as to be surround by the four intake and exhaust valves 12, 13. An electrode at the distal end of the spark plug 16 is located at a position that protrudes from the ceiling of the combustion chamber 6 by a predetermined distance. On the other hand, a firing circuit 17 (shown only in FIG. 2) is connected to the proximal end of the spark plug 16 to conduct electricity to the spark plug 16 at a predetermined ignition timing for each cylinder 2. The crown surface of the piston 5 forming the bottom of the combustion chamber 6 has such a form as to correspond to the ceiling of the combustion chamber 6, and the midportion thereof is provided with a lemon-shaped cavity 5a.

At the peripheral edge of the combustion chamber 6, an injector (fuel injection nozzle) 18 is disposed so as to be sandwiched between the two intake ports 10, 10. This injector 18 is a known swirl injector for injecting a fuel as a swirl, through a nozzle hole located at its distal end, in the form of a hollow corn in a direction that the axis of the injector 18 extends. With this swirl injector 18, when the fuel injection pressure is increased, the penetration of fuel spray is also increased in accordance with rise in the pressure. Furthermore, as shown as an example in FIG. 4, the penetration of fuel spray tends to become smaller as the spray cone angle is increased. On the contrary, the penetration becomes larger as the spray cone angle is decreased. It should be noted that the injector 18 may be provided with a variable mechanism (variable spray angle mechanism) which can change the intensity of a swirl component of the fuel so that the variable mechanism may operate to adjust the swirl component of fuel thereby changing the spray cone angle of fuel spray.

A fuel distributing pipe 19 common to all the cylinders 2, 2, . . . is connected to the proximal end of the injector 18 to distribute a high-pressure fuel, having been supplied from a fuel supply system 20, to each cylinder 2. More specifically, the fuel supply system 20 is configured as for example shown in FIG. 5A, wherein a low-pressure fuel pump 23, a low-pressure regulator 24, a fuel filter 25, a high-pressure fuel pump 26 and a high-pressure regulator 27 are arranged in this order from upstream to downstream of a fuel passage 22 communicating between the fuel distributing pipe 19 and a fuel tank 21.

The fuel, having been pumped up from the fuel tank 21 by the low-pressure fuel pump 23, is pressure-regulated by the low-pressure regulator 24, filtered by the fuel filter 25, and then fed under pressure to the high-pressure fuel pump 26. The high-pressure fuel pump 26 and the high-pressure regulator 17 are connected individually to the fuel tank 21 through a return passage 29 to regulate fuel supplied to the fuel distributing pipe 19 in adequate pressure conditions (for example, substantially 3 MPa to 13 MPa, preferably 4 MPa to 7 MPa during stratified-charge combustion operation) by returning part of the fuel raised in pressure by the high-pressure fuel pump 26 toward the fuel tank 21 through the return passage 29 while controlling the flow rate of the fuel by the high-pressure regulator 27. The return passage 29 is provided with a low-pressure regulator 28 for regulating the pressure conditions of the fuel returned toward the fuel tank 21. Thus, in the fuel supply system 20, the high-pressure fuel pump 16 and the high-pressure regulator 28 constitutes a injection pressure regulating means for regulating the fuel injection pressure of the injector 18.

Figure 5A:
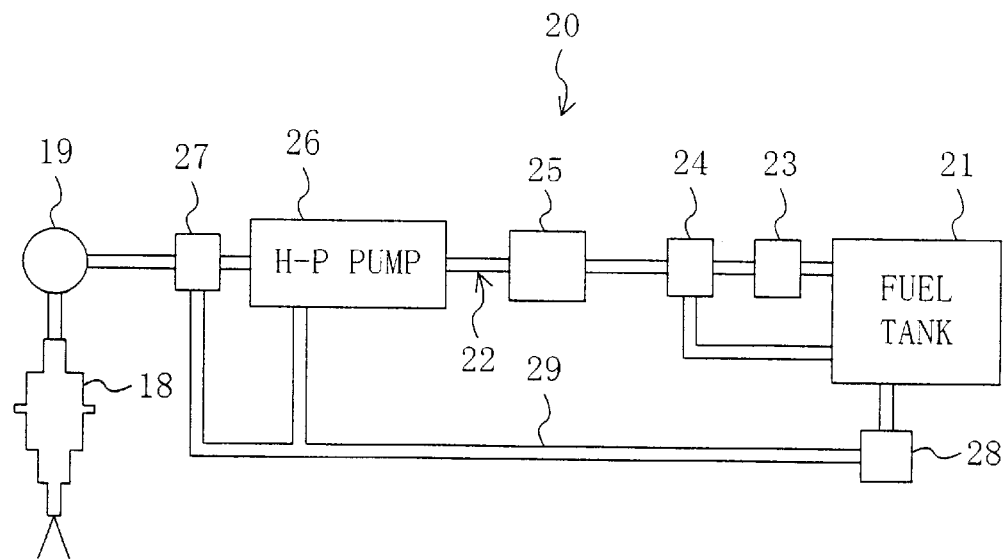
FIGS. 5A–B shows schematic diagrams illustrating structures of fuel supply systems.
Figure 5B:
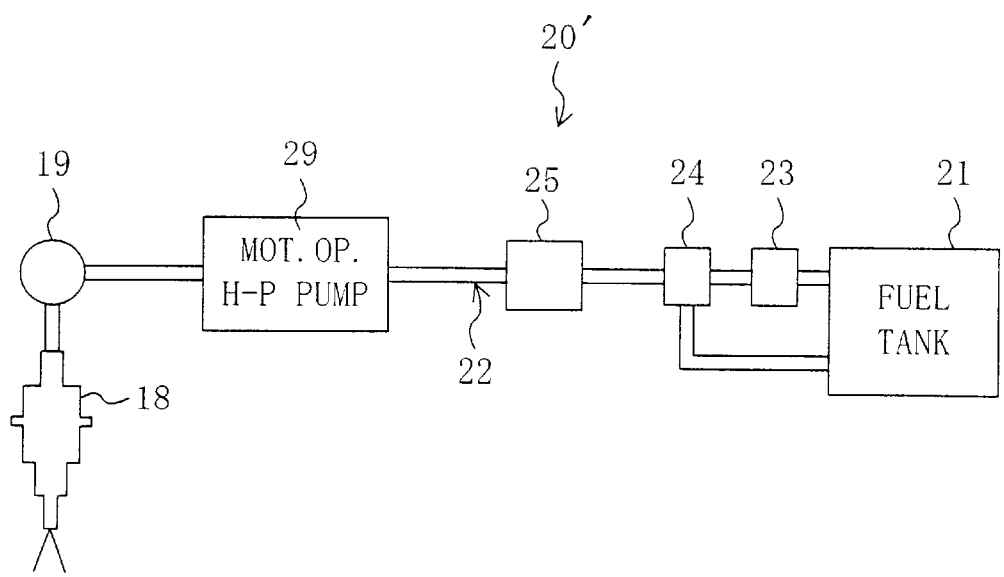

It should be noted that the configuration of the fuel supply system 20 is not limited to that shown in FIG. 5A and the high-pressure regulator 27 can be omitted from the system, as for example in the case of a fuel supply system 20' shown in FIG. 5B. In such a case, the pressure conditions of a fuel can be controlled, with the use of a motor-operated high-pressure pump 29 which has an ability to change the discharge amount of the fuel over a wide range, by variably regulating the discharge amount of the fuel flowing from the motor-operated high-pressure pump 29 toward the fuel distributing pipe 19.

As shown in FIG. 2, an intake passage 30 which communicates with the intake ports 10, 10 of each cylinder 2 is connected to one side surface of the engine 1. This intake passage 30 provides for supplying an intake air, having been filtered through an unshown air cleaner, to the combustion chamber 6 of the engine 1, wherein a hot-wire airflow sensor 31 for detecting the amount of an intake air taken into the engine 1, an electric throttle valve 32 for throttling the intake passage 30, and a surge tank 33 are disposed in this order from upstream to downstream of the intake passage 30. The electric throttle valve 32 is not mechanically connected to an unshown accel pedal and is driven into opening and closing motion to a desired valve position by an unshown electric drive motor.

The intake passage 30 located downstream from the surge tank 33 is formed into independent passages branched for each cylinder 2, and a downstream end of each independent passage is further branched into two passages communicating with the respective intake ports 10, 10. On the upstream sides of both of the two intake ports 10, 10, as also shown in FIG. 3, intake airflow control valves 34 are provide for controlling the flow rate of a tumble in the combustion chamber 6, and are operated into opening and closing positions by, for example, a stepping motor 35 (shown only in FIG. 3). Each of the intake airflow control valves 34, 34 is formed by partly cutting away a circular butterfly valve, in this embodiment, by cutting away a portion located below from a valve stem 34a. When the intake airflow control valve 34 is closed, an intake air flows downstream from only the cut-away portion to generate an intense tumble in the combustion chamber 6. On the other hand, as the intake airflow control valve 34 is opened, the intake air also flows through portions other than the cut-away portion so that the tumble intensity is gradually weakened.

A tumble generating means for generating a tumble in the combustion chamber 6 is constituted by the intake ports 11, 11. The tumble generating means can generate a tumble T flowing between the electrode of the spark plug 16 and the crown surface of the piston 6 toward the injector 18 during the compression stroke of the cylinder 2, as described later. Further, a variable tumble means which can change the flow rate of a tumble is constituted by the intake airflow control valve 34 and the stepping motor 35. It should be noted that the forms of the intake ports 10 and the intake airflow control valves 34 are not limited to those as described above. For example, the intake ports may be a so-called common port in which its flow passages are combined together on the upstream side. In this case, the form of the intake airflow control valve may be based on a butterfly valve having a form corresponding to a cross section of the common port and may be obtained by partly cutting away the butterfly valve like the first-mentioned intake airflow control valve.

An exhaust passage 36 for exhausting a burnt gas (exhaust gas) from the combustion chamber 6 is connected to the other side surface of the engine 1. The upstream end of the exhaust passage 36 constitutes an exhaust manifold 37 which is branched for each cylinder 2 and communicates with the exhaust port 11. A linear O$_2$ sensor 38 for sensing the oxygen concentration in an exhaust gas is disposed at a collecting pipe part of the exhaust manifold 37. The linear O$_2$ sensor 38 is used for detecting the air fuel ratio based on the oxygen concentration in the exhaust gas. With this sensor, an power output linear to an oxygen concentration can be obtained within a predetermined range of air fuel ratios including the theoretical air fuel ratio.

The upstream end of an exhaust pipe 39 is connected to the confluent portion of the exhaust manifold 37, while the downstream end thereof is connected to a catalyst 40 for purifying the exhaust gas. The catalyst 40 is a NOx absorption-reduction type one for absorbing NOx in an atmosphere of an exhaust gas of high oxygen concentration while emitting absorbed NOx with decrease in oxygen concentration and reductively purifying the exhaust gas, and exhibits high exhaust gas purification performance like so-called 3-way catalytic converter particularly in the vicinity of the theoretical air fuel ratio. Further, in order to determine the deteriorating condition of the catalyst 40, a known lambda O$_2$ sensor 41 which inverts its output stepwise from the border line on the theoretical air fuel ratio is provided on the downstream side of the catalyst 40. It should be noted that 3-way catalytic converter may be additionally disposed in line with the NOx absorption-reduction type catalyst 40.

Furthermore, an upstream end of an EGR passage 43 for recirculating part of the exhaust gas flowing through the exhaust passage 36 to the intake passage 30 is connected to an upstream portion of the exhaust pipe 39. A downstream end of the EGR passage 43 is connected to a portion of the intake passage 30 located between the throttle valve 32 and the surge tank 33. In the EGR passage 43, near to its downstream end, an electric EGR valve 44 capable of opening control is disposed for controlling the amount of recirculation of the exhaust gas through the EGR passage 43.

The variable valve timing mechanism 14, the firing circuit 17 of the spark plug 16, the injector 18, the high-pressure regulator 27 of the fuel supply system 20, the electric throttle valve 32, the intake airflow control valves 34, the electric EGR valve 44 and the like are controlled in their operations by an engine control unit (hereinafter, referred to as an ECU) 50. On the other hand, the ECU 50 receives output signals from at least the crank angle sensor 9, the airflow sensor 31, the linear O$_2$ sensor 38 and the lambda O$_2$ sensor 41, and also receives output signals from an accel opening sensor 51 for sensing the accel stroke and output signals from a revolving speed sensor 52 for sensing the revolving speed of the engine 1 (revolving speed of the crank shaft 7).

The ECU 50 controls, based on the signal input from each sensor, the valve timings of the intake and exhaust valves 12, 13, the fuel injection quantity, injection timing and injection pressure of the injector 18, the amount of intake air regulated by the throttle valve 32, the tumble intensity regulated by the intake airflow control valves 34, the rate of exhaust gas recirculation regulated by the EGR valve 44 and the like in accordance with the operating conditions of the engine 1.

Figure 6:
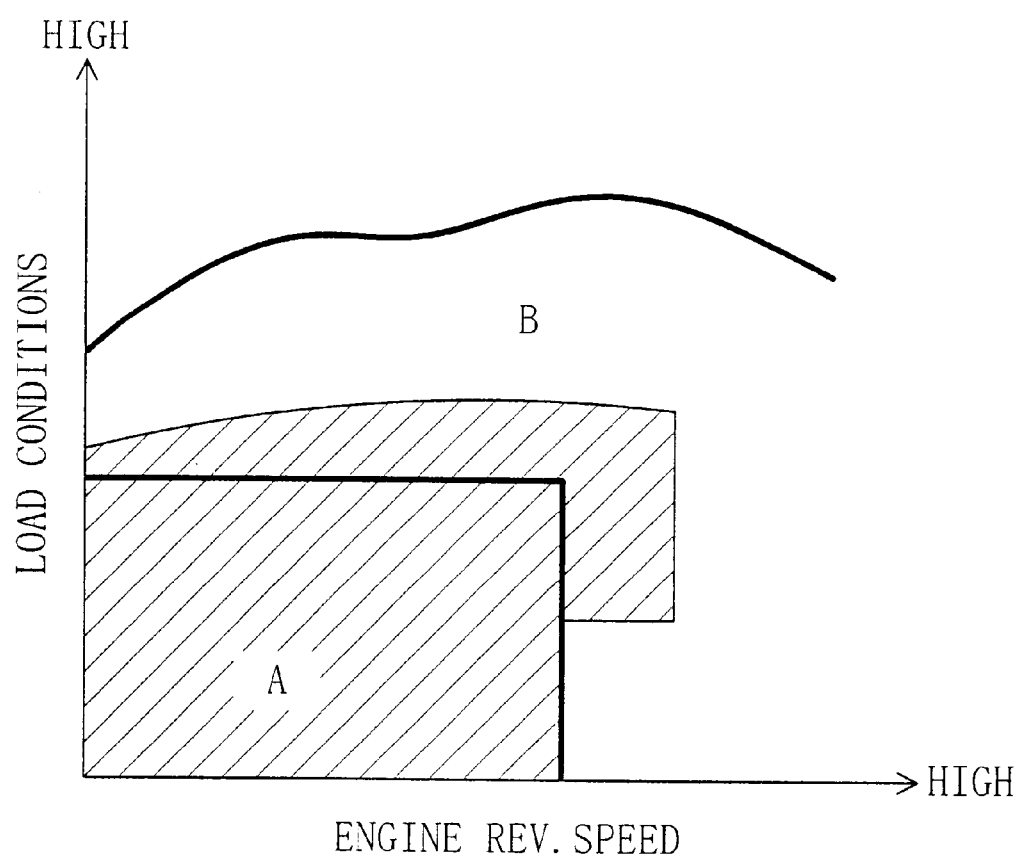
FIG. 6 is a graph showing an exemplary control map in which respective operation zones where the engine is put into stratified-charge combustion condition and homogeneous-charge combustion condition are set.

More specifically, as shown as an example in FIG. 6, in the warm conditions of the engine 1, a setting operation zone A on the low-load and low-speed end is a stratified-charge combustion zone. In this zone, the engine 1 falls into a stratified-charge combustion mode, in which a mixture is combusted existing collectively in a stratified form in the vicinity of the spark plug 6, by injecting a fuel from the injector 18 during a predetermined period at the compression stroke of the cylinder 2 (for example, the range from 40° to 140° before the top dead center (BTDC) at the compression stroke during the stratified-charge combustion operation). In this stratified-charge combustion mode, the throttle valve 32 is set at a relatively large opening in order to reduce intake loss of the engine 1. At this time, an average air fuel ratio of the combustion chamber 6 is leaner (for example, A/F>25) than the theoretical air fuel ratio.

On the other hand, a zone B other than the stratified-charge combustion zone is a homogeneous combustion zone. In this zone, the engine 1 falls into a combustion mode in which a fuel is injected by the injector 18 during the intake stroke of the cylinder 2 so as to be sufficiently mixed with an intake air so that a homogeneous mixture is formed in the combustion chamber 6 and then combusted. In this homogeneous combustion mode, under most operating conditions, the fuel injection quantity, the throttle opening and the like are controlled so that the air fuel ratio of the mixture is substantially equal to the theoretical air fuel ratio (A/F≈14.7). Particularly under full load operating conditions, the air fuel ratio is controlled to be richer (for example, approximately A/F=13) than the theoretical air fuel ratio thereby obtaining a large power output corresponding to high load.

Further, in a region shown in oblique lines in the figure in the warm conditions of the engine 1, the EGR valve 44 is opened to recirculate part of the exhaust gas to the intake passage 30 through the EGR passage 43. At this time, the opening of the EGR valve 44 is controlled in accordance with the load conditions and revolving speeds of the engine 1 at least so that the rate of exhaust gas recirculation (hereinafter, also referred to as the EGR rate) is smaller at higher load. In this manner, production of NOx can be suppressed by the exhaust gas reflex without impairing combustion stability of the engine 1. Further, during the engine cold time, to give top priority to ensuring combustion stability, the engine 1 is operated in the homogeneous combustion mode over the entire range of operating conditions and the EGR valve 44 is fully closed.

For example, the rate of amount of exhaust gas recirculation recirculated to the intake passage 30 through the EGR passage 43 relative to the amount of fresh air may be used as the EGR rate. As employed herein, the fresh air refers to the outside air calculated by excluding the recirculated exhaust gas, the fuel gas and the like from the air taken in the cylinder 2.

The present invention is characterized, as described above, in that when the engine 1 is operated in the stratified-charge combustion mode, a tumble in the combustion chamber 6 is maximally utilized, and fuel spray behavior is controlled by the tumble thereby suitably stratifying a mixture. That is, when the engine 1 is in the stratified-charge combustion zone A, the tumble generated at the intake stroke of each cylinder 2 is retained up to the late stage of the compression stroke of the cylinder 2 and a fuel is injected to impinge substantially oppositely against the tumble with a suitable penetration. In this manner, the fuel spray travels toward the spark plug 16 while being gradually reduced in speed by the tumble, and during the time, carburetion of fuel droplets and mixture thereof with the air are promoted so that a flammable mixture is formed and retained in the vicinity of the spark plug 16 electrode at the ignition timing for the cylinder 2 as shown in oblique lines in FIG. 1.

In other words, the fuel is injected by controlling the penetration of fuel spray from the injector 18 to correspond to the flow rate of the tumble and operating the injector 18 at a predetermined timing calculated back from the ignition timing for the cylinder 2. Such operation control on the injector 18 is performed by the ECU 50 as described above based on a predetermined control program. Therefore, the ECU 50 corresponds to a fuel injection control means for injecting the fuel from the injector 18 in correspondence with the ignition timing for the cylinder 2 by controlling the penetration of fuel spray from the injector 18 to correspond to the flow rate of the tumble so that the fuel spray goes against the tumble, becomes a flammable mixture at the time of ignition of the spark plug 16 and stays in the vicinity of the spark plug 16.

More specifically, in this embodiment, ① the configuration of the piston 5 crown surface, ② the orientation and spray cone angle of fuel spray from the injector 18 and ③ the position of the spark plug 16 electrode are optimally set in association with each other, and further ④ the penetration of fuel spray from the injector 18 is controlled in accordance with the flow rate of the opposed tumble, thereby providing suitable stratification of the mixture as described above. Below, the above features ① to ④ will be described in detail.

Piston Crown Surface Configuration

Figure 1:
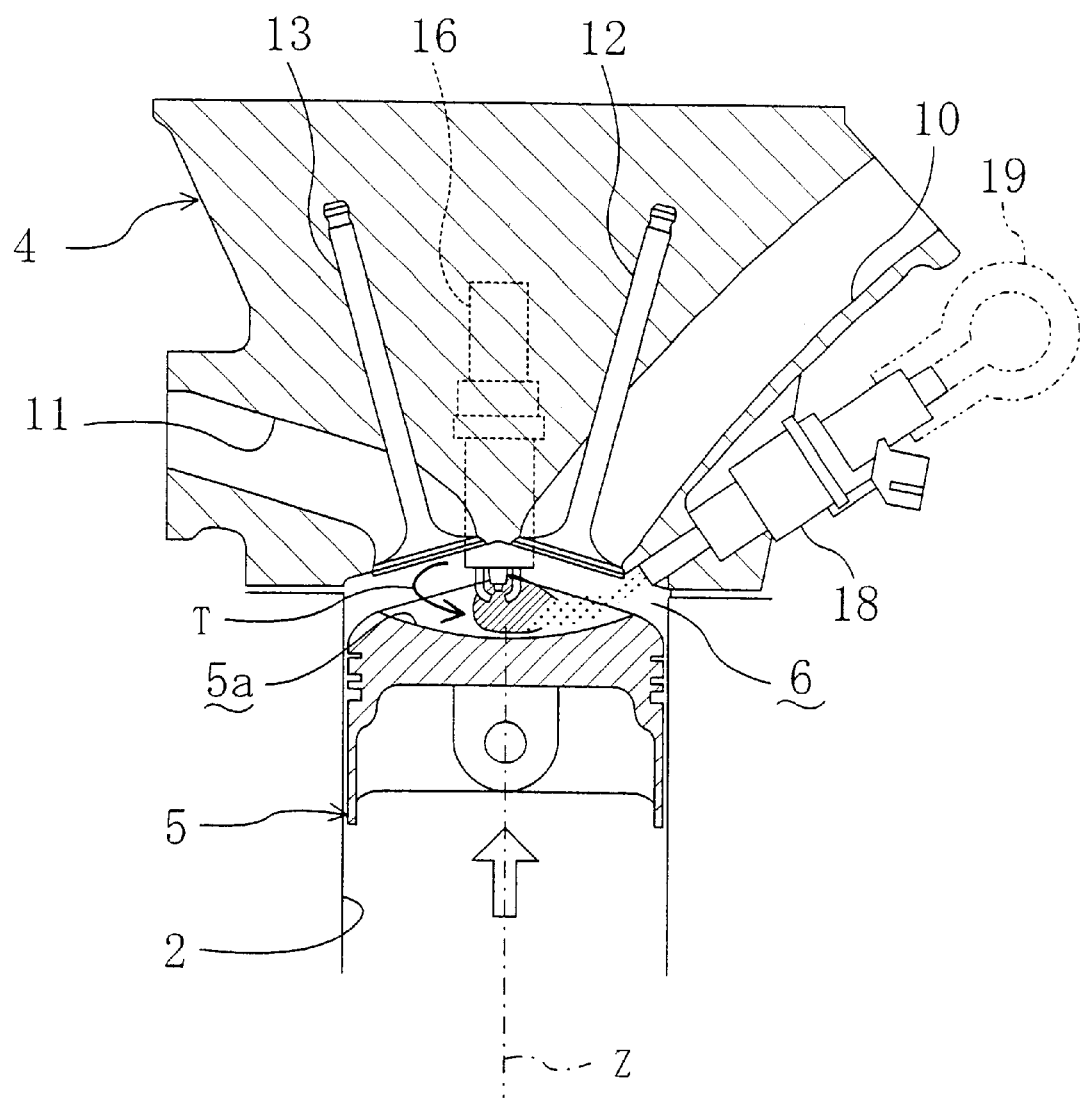
FIG. 1 is a view illustrating a condition of a mixture residing in the vicinity of a spark plug electrode at an ignition timing for a cylinder in a direct-injection spark ignition engine according to Embodiment 1 of the present invention.
Figure 7A:
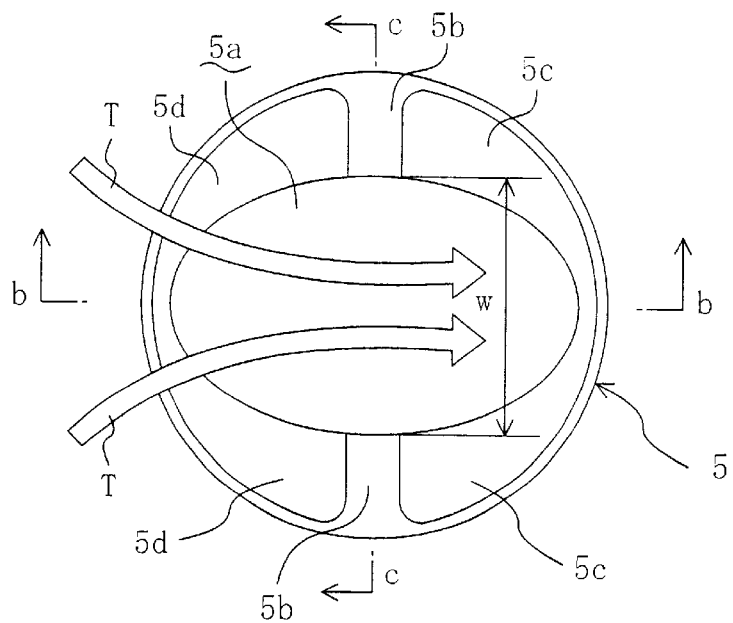
FIGS. 7A–C.
Figure 7B:
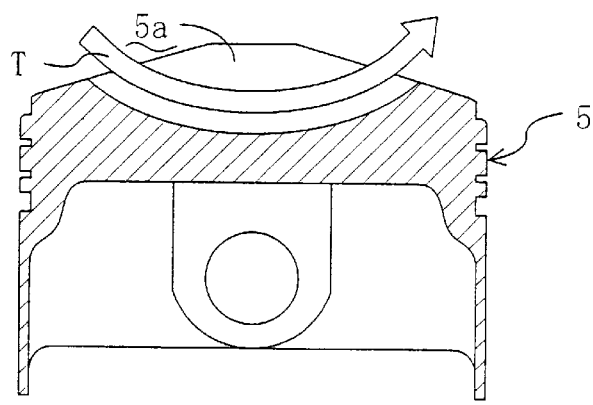
Figure 7C:
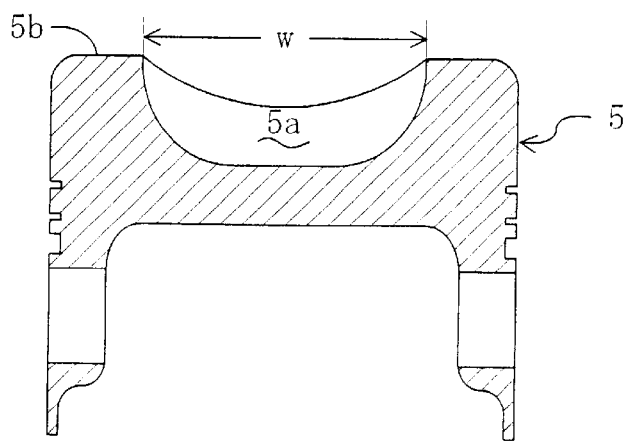
Figure 8:
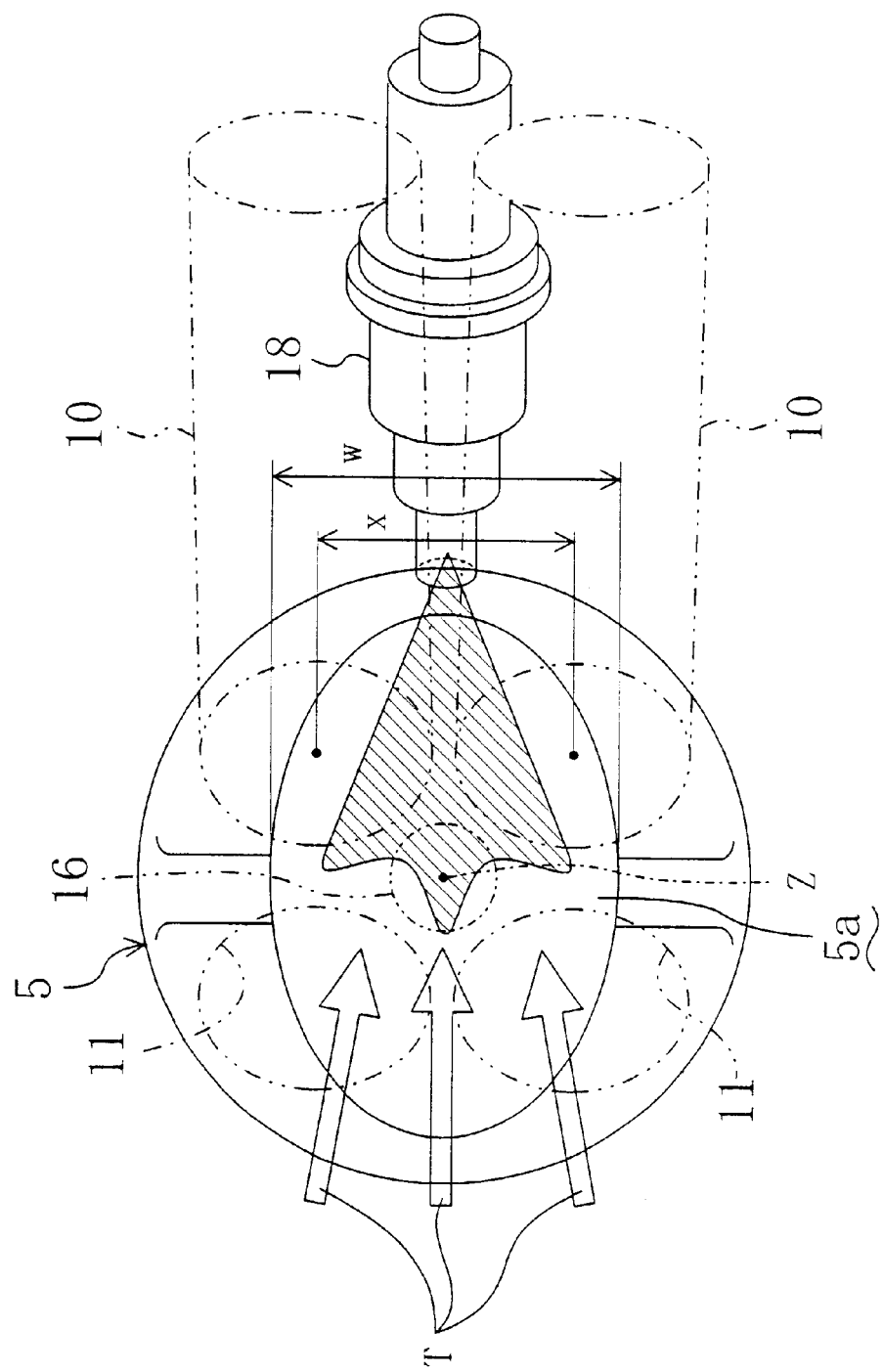
FIG. 8 is a diagram illustrating the positional relation among a cavity of the piston crown surface, a tumble and fuel spray when viewed along the center line of the cylinder.

First, as shown in FIGS. 7 and 8 and also in FIGS. 1 and 3, the crown surface of the piston 5 is formed with a lemon-shaped cavity 5a extended in a direction of fuel injection from the injector 18 (direction in which the center line of fuel spray extends) when viewed along the cylinder center line z. Further, as shown in FIG. 8, the cavity 5a has its widthwise dimension that contains fuel spray (as shown in oblique lines in the figure) from the injector 18 as a whole.

In detail, the cavity 5a maximizes its width substantially at its lengthwise midportion and gradually narrows it toward both ends. As shown in FIG. 8, the opening width w thereof is maximized in the vicinity of the spark plug 16 electrode when viewed along the cylinder center line z. The opening width w at this point is set to include the geometrical area of fuel spray assuming that the fuel spray from the injector 18 reaches the vicinity of the cylinder center line as shown in the figure. As a result, the opening width w exceeds the center distance x between the intake ports 10, 10 at the ceiling of the combustion chamber 6. Accordingly, the sidewall surfaces of the cavity 5a located at both lateral sides thereof are spaced sufficiently away from the spark plug 16 electrode, and therefore it can be prevented that the sidewall surfaces interfere with growth of a flame core and deteriorate flame propagation performance. The geometrical area of fuel spray will be described later.

The bottom surface of the cavity 5a is substantially in an arcuate form when viewed in a direction orthogonal to the cylinder center line z as shown in FIG. 7B. The deepest portion thereof is located at a position corresponding to the cylinder center line z, that is, substantially at the center of the cross section of the cylinder 2. The distance along the cylinder center line z between the bottom surface of the cavity 5a and the ceiling of the combustion chamber 6 is maximized at the position corresponding to the cylinder center line z. Further, as shown in FIG. 7C, the sidewall surfaces of the cavity 5a located at both lateral sides thereof rise gently from its bottom surface and extend upward, and the height of the sidewall surfaces is maximized substantially at the lengthwise midportion of the cavity 5a.

Figure 36A:
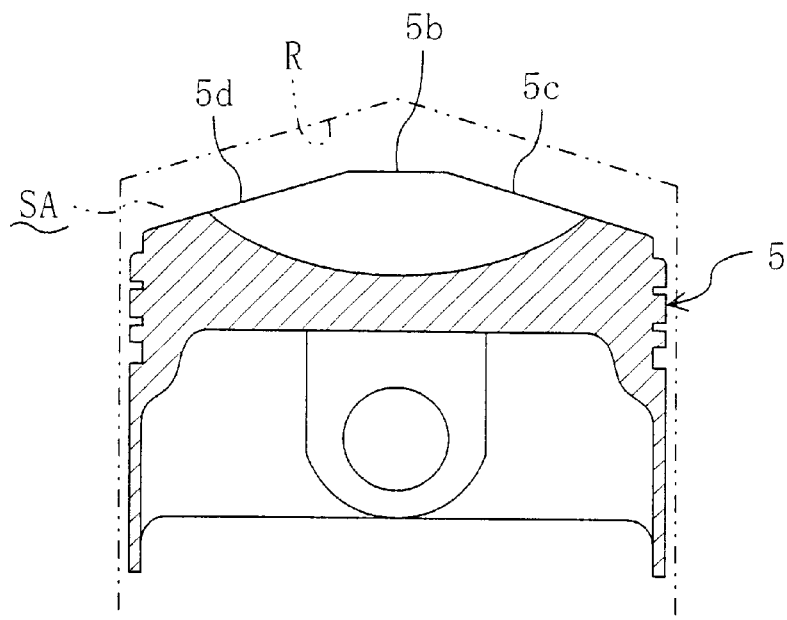
FIGS. 36A–B show diagrams illustrating a squish area created between the piston crown surface and the ceiling of the combustion chamber in Embodiment 1.
Figure 36B:
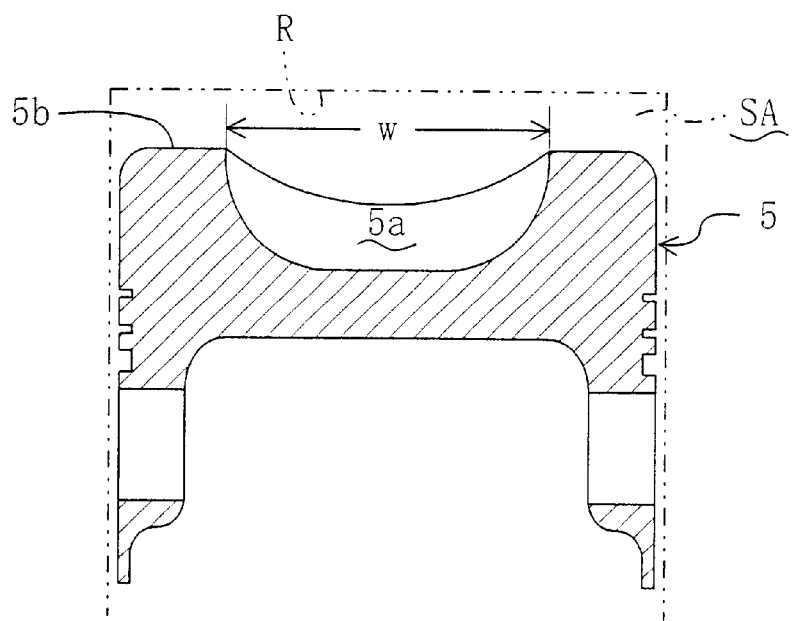

Furthermore, an outer portion of the piston 5 crown surface, from which the cavity 5a is excluded, is formed so as to be substantially parallel with the inclined surfaces of the opposed combustion chamber 6 ceiling. As shown in FIG. 36, during a predetermined period before the top dead center during the compression stroke of the cylinder 2 (for example, BTDC 40° CA to TDC), a clearance defined by the outer portion of the piston 5 crown surface and the ceiling of the combustion chamber 6 (as shown in the imaginary line in the figure) forms a squish area SA for generating a squish flowing toward the cavity 5a. It should be noted that when the intake and exhaust valves 12, 14 are closed, the ceiling of the combustion chamber 6 includes the bottom surfaces of the intake and exhaust valves 12, 13 which extend along the inclined surfaces of the cylinder head 4.

More specifically, as also shown in FIGS. 36 and 7A, the outer portion of the piston 5 crown surface is formed, at its locations corresponding substantially to the lengthwise midportion of the cavity 5a, i.e., at its locations that sandwich the spark plug 16 electrode between both lateral sides of the cavity 5a, with central squish area sections 5b constituting the squish area SA in cooperation with the ceiling of the combustion chamber 6. Further, in the outer portion of the piston crown surface, intake-side and exhaust-side squish area sections 5c, 5d are provided to continue from the central squish area sections 5b toward the intake side (right-hand side of the figure) and the exhaust side (left-hand side of the figure), respectively.

The configuration of the piston 5 crown surface as mentioned above allows a tumble to smoothly flow along the cavity 5a formed in the piston 5 crown surface and thus allows a tumble T (see FIG. 30) generated during the intake stroke of the cylinder 2 to be surely retained without damping up to the late stage of the compression stroke of the cylinder 2. Then, as shown in FIG. 8, when a fuel is injected by the injector 18, the tumble T, T flowing along the inner wall surface of the cavity 5a gradually decreases the speed of fuel spray while suppressing diffusion of the fuel spray, thereby retaining a flammable mixture layer in the center of the combustion chamber 6.

Further, as described above, during the time from the late stage of the compression stroke of the cylinder 2 to the vicinity of the top dead center at the compression stroke thereof, intense squishes are generated which flows from the squish area SA between the outer portion of the piston crown surface and the ceiling of the combustion chamber 6 toward the cylinder center line z. In detail, the squishes are generated to flow toward the cylinder center from the squish area SA extending from the central squish area sections 5b to the exhaust and intake sides. This squishes suppress diffusion of the mixture. Furthermore, the squishes and the tumble T are integral to form such flow distribution as to enwrap the flammable mixture layer. This flow distribution generates a flammable mixture excellent in ignitability in the vicinity of the spark plug electrode.

Briefly, in this embodiment, in consideration of properties (penetration and spray cone angle properties) of fuel spray from the later-described injector 18, the squish area is formed in a suitable region of the piston 5 crown surface in order to suppress diffusion of the fuel spray, which stays in the vicinity of the spark plug 16 electrode, by the action of the squishes, while the opening width w of the cavity 5a is set at an optimal size which is not excessively large and not excessively small in order that the sidewall surfaces of the cavity 5a may not interfere with propagation of flame front.

Figure 37:
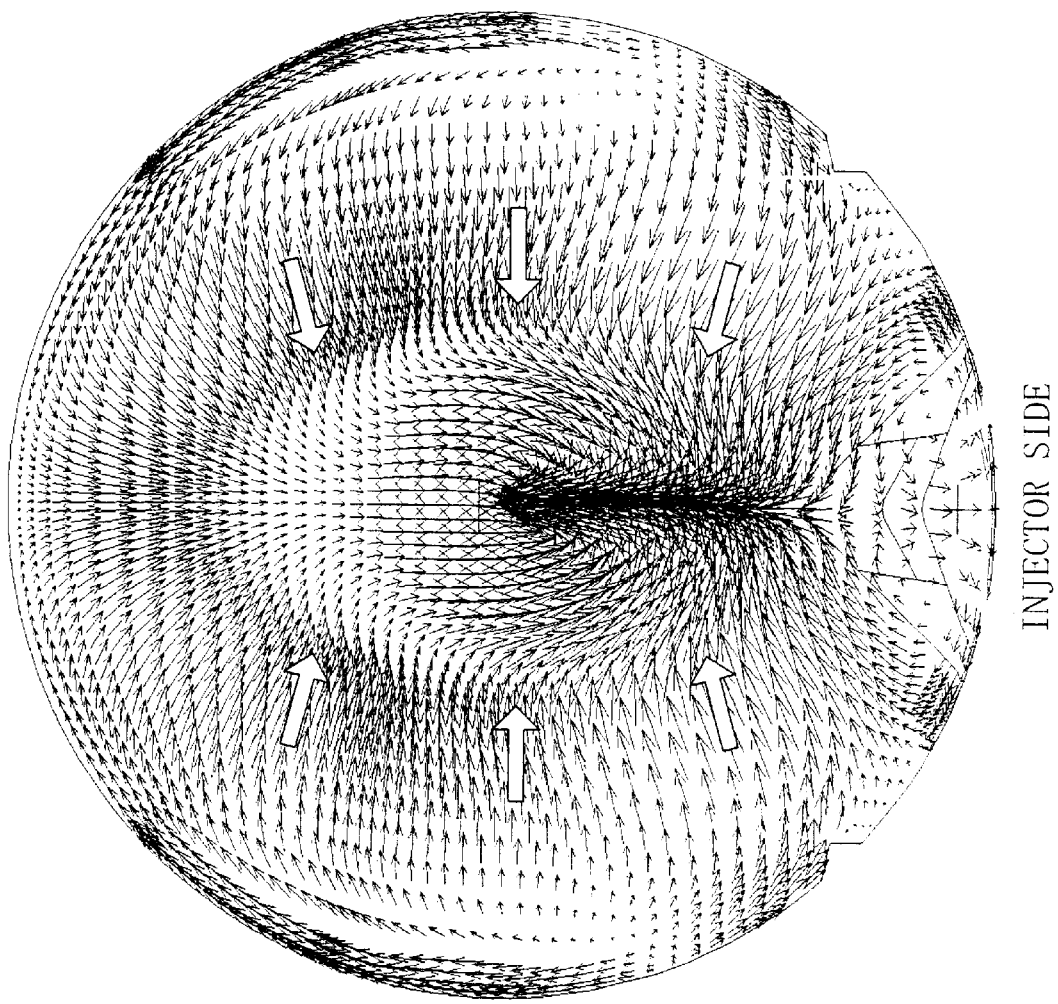
FIG. 37 is a diagram showing the result of a CFD analysis of flow distribution near to the ignition timing for the cylinder in a cross section of the combustion chamber when viewed along the center line of the cylinder.
Figure 38:
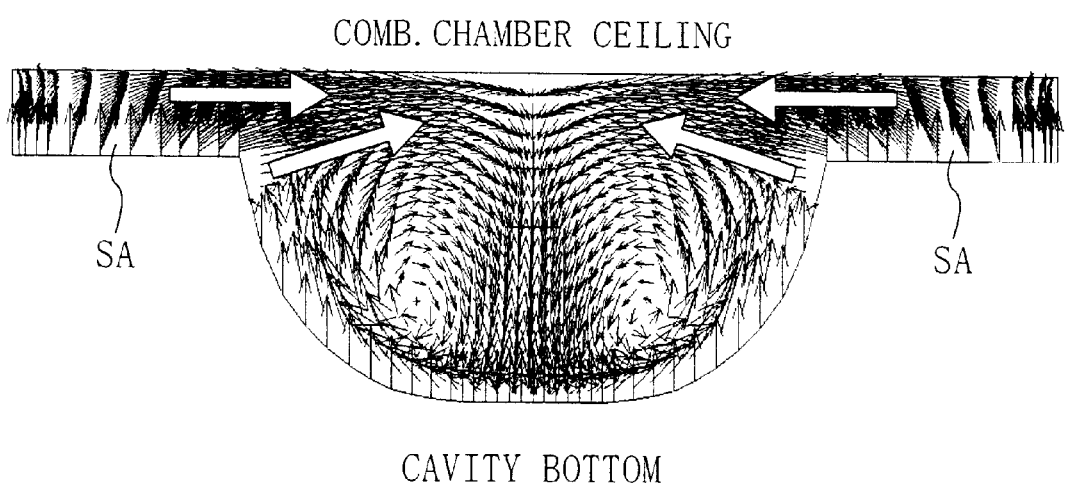
FIG. 38 is a corresponding diagram of FIG. 36 in a longitudinal cross section of the combustion chamber when viewed from an injector side.

FIGS. 37 and 38 show results obtained by analyzing flow distribution of the combustion chamber 6 near to the ignition timing for the cylinder 2 (for example, at BTDC 20° CA or later) through the application of CFD (computational fluid dynamics). The effects of the squishes are specifically shown in these figures. That is, though the length of each arrow indicates the flow direction, not the flow intensity, such flow distribution as to enwrap the flammable mixture layer in the middle of the combustion chamber 6 as a whole can be seen from the figures as described above. More specifically, FIG. 37 shows flow distribution in a cross section of the cylinder 2 which is orthogonal to the cylinder center line z and includes the spark plug 16 electrode when viewed along the cylinder center line z. As seen from the figure, the fuel spray flow from the injector 18, an air flow induced by the spray flow, the tumble, and squishes (the flow direction of which are shown in white arrows) are integral to form such flow distribution as to retain the mixture in the cylinder center.

FIG. 38 shows flow distribution in a longitudinal cross section of the cylinder 2 which includes the cylinder center line z when the cylinder center is viewed from the injector 18 side. As shown in white arrows in the figure, it can be seen that intense squishes are generated which flow from the squish area SA extending to both the lateral sides toward the inside of the cavity 5a. The squishes from both the lateral sides impinge one against another midway therebetween and then flows from the combustion chamber ceiling toward the bottom surface (lower side in the figure) of the cavity 5a thereby damping the mixture flow inversely flowing from the bottom surface of the cavity 5a toward the combustion chamber ceiling (upper side in the figure).

Figure 17B:
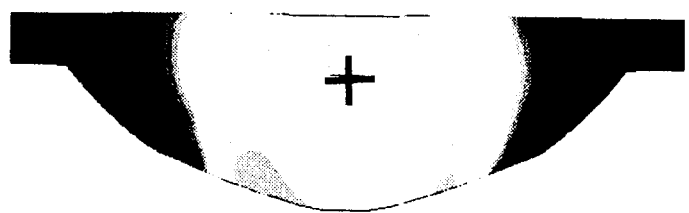
Figure 18A:
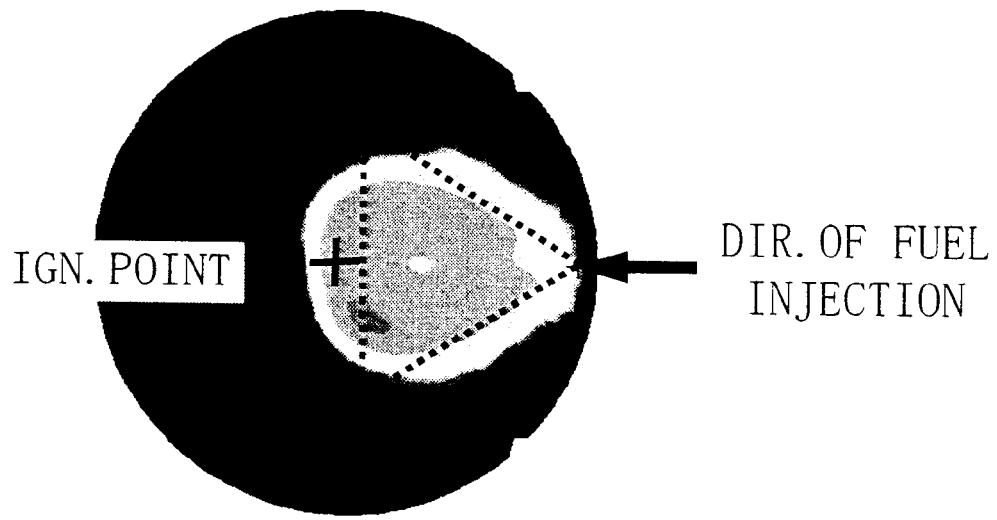
FIGS. 18A–B show a state of a mixture when the piston crown surface is formed with a lemon-shaped cavity.
Figure 18B:
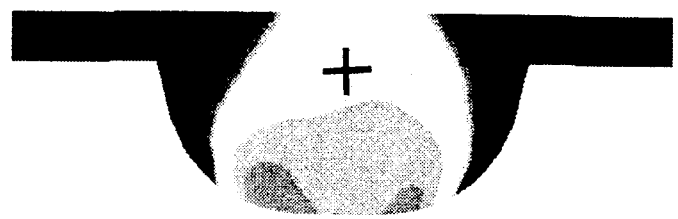

By the action of such flow distribution, a compact mass of flammable mixture excellent in ignitability can be formed in the vicinity of the spark plug 16 electrode as shown in FIGS. 18A and 18B described later. This flammable mixture layer has a form to diminish its diameter as it approaches the ceiling of the combustion chamber 6 when viewed from the injector 18 side as shown in FIG. 18B. It can be seen from comparison with that shown in FIG. 17B as described later that particularly diffusion of fuel spray in the widthwise direction of the cavity 5a can be suppressed by the squishes. If the mixture is thus concentrated in the vicinity of the spark plug 16 electrode so that the concentration of the mixture in the flammable mixture layer is made suitable, stable ignitability and excellent combustion quality of the mixture can be obtained over a wide range of engine operating conditions.

Injector Layout

Secondly, the layout of the injector 18 and the spray cone angle of fuel spray will be described with reference to FIGS. 9 to 18. As first shown in FIG. 9, the injector 18 is disposed so that its axis (corresponding to the center line F of fuel spray in this embodiment) makes a tilt angle δ of approximately 30° with respect to an assumed plane orthogonal to the cylinder center line z. Further, the spray cone angle θ of fuel spray from the injector 18 generally changes depending upon the pressure conditions of the combustion chamber 6. In this embodiment, however, the spray cone angle θ of fuel spray during the compression stroke of the cylinder 2 is set to fall within the range of θ=about 20° to about 60°.

Figure 10A:
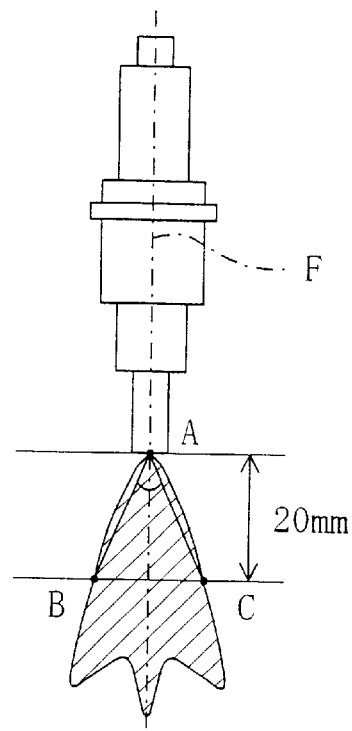
FIGS. 10A–B.
Figure 10B:
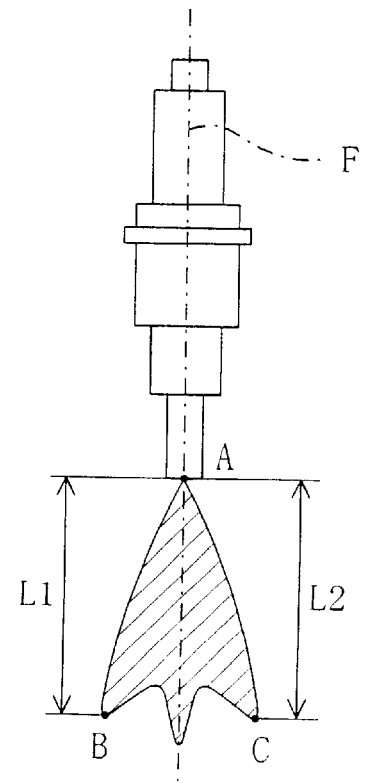

Here, the definition of fuel spray in this description will be described with reference to FIG. 10. As shown in FIG. 10A, two points B and C at which an assumed plane through the spray center line F and the profile of fuel spray interconnect with each other are determined, and ∠BAC is defined as the spray cone angle θ (i.e., θ=∠BAC). Further, as shown in FIG. 10B, when leading edges of a main jet (fuel droplet area) of fuel spray, exclusive of a so-called "premature jet" (initial fuel spray), on the leading end side thereof in the assumed plane through the spray center line F are assumed as points B and C, respectively, the distance along the spray center line F from the nozzle hole point A of the injector 18 to point B is assumed as L1, and the distance from point A to point C is assumed as L2, the spray penetration L is defined as an average distance among them (i.e., L=(L1+L2)/2).

As an actual measuring method for the spray cone angle θ and the spray penetration L, there may be used a laser sheet method, for example. Specifically, first, a sample made of dry solvent the aspect of which corresponds to that of the actual fuel is used as a fluid to be injected from the injector, and the pressure of the sample is set at a predetermined value (for example, 7 MPa) within the range of fuel pressures actually used under normal temperature conditions. Further, as an ambient pressure, the inside of a pressure vessel including a laser-transmittable window for filming spray and a measuring window is pressurized to, for example, 0.25 MPa. Then, under normal temperature conditions, the fuel is injected by inputting trigger pulse signals at a predetermined pulse width to the injector 18 so that the amount of spray per pulse reaches 9 mm$^3$/stroke. At this time, 5 mm-thick laser light sheet is irradiated with the fuel spray to pass the spray center line thereof, and spray images are photographed from a direction orthogonal to the laser light sheet plane by a high-speed camera. Then, the spray cone angle θ and penetration L of spray are determined in accordance with the above-described definitions based on the image photographed 1.56 ms after the trigger pulse signal has been input.

It should be noted that the spray profile in the photographed image refers to the profile of the area of particle samples of droplet form. Since the area of particle samples is illuminated by the laser light sheet, the spray profile can be found from a part of the photographed image in which brightness changes.

Figure 11:
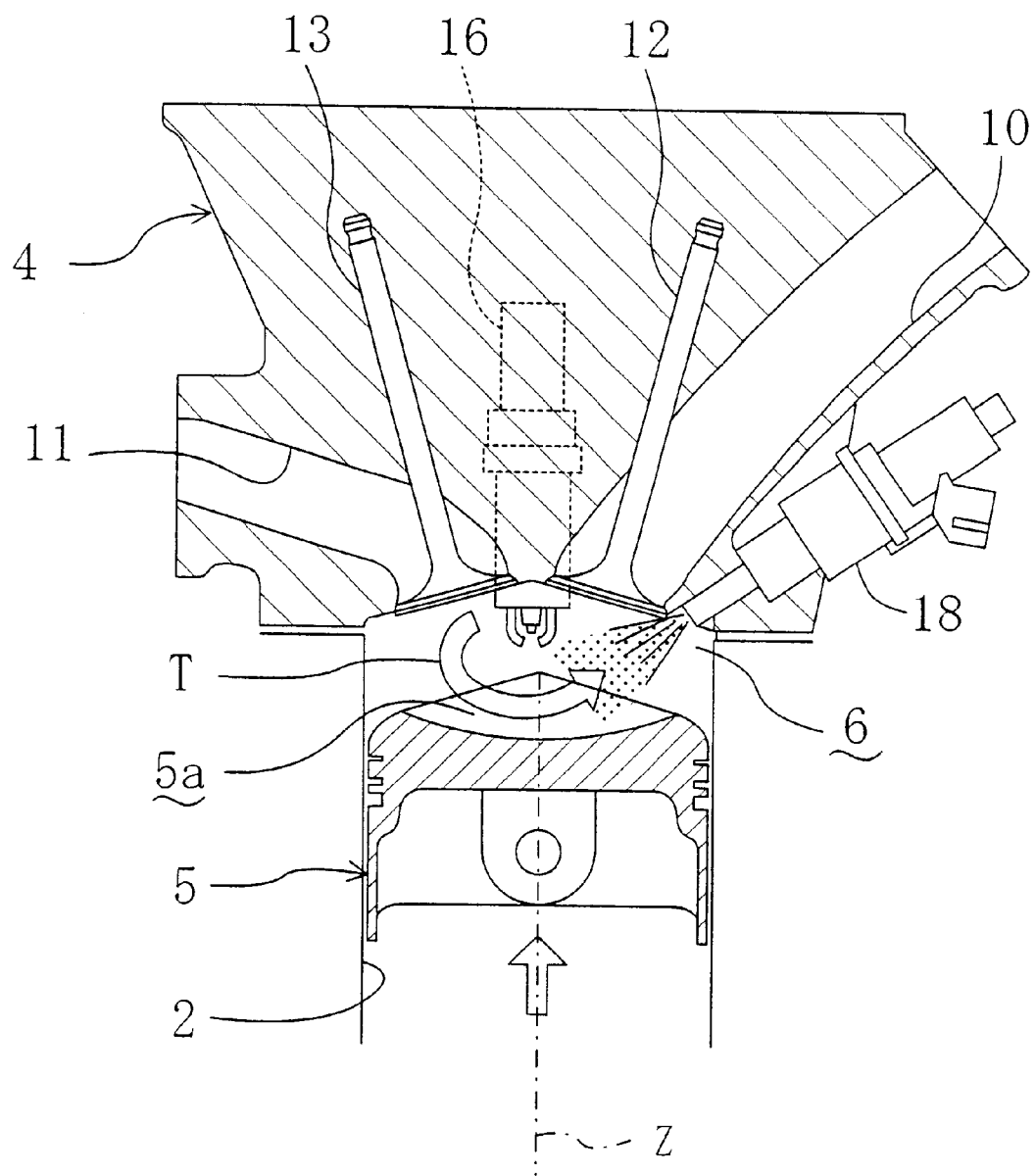
FIG. 11 is a view corresponding to FIG. 1 at a fuel injection timing for the cylinder.

With the above-described layout of the injector 18, i.e., if the tilt angle δ of the spray center line F and the spray cone angle θ are optimally set as described above, the engine 1 of this embodiment can cause fuel spray to effectively impinge against the tumble T flowing along the cavity 5a of the piston 5 crown surface at the fuel injection timing as shown in FIG. 11 so that the midportion (predetermined region surrounding the spray center line F) of the fuel spray is substantially in opposite relation to the tumble T.

More specifically, for example, if the tilt angle δ of the spray center line F is decreased under approximate 25° (as shown in a dash-single-dot line F1 in FIG. 12), most of fuel spray from the injector 18 is transported toward the spark plug 16 with part of the tumble (second partial tumble flow Ts) flowing along the ceiling of the combustion chamber 6, while remaining fuel spray impinges against part of the tumble (first partial tumble flow Tm) flowing along the cavity 5a of the piston 5 crown surface and then travels along with the first partial tumble flow Tm toward the combustion chamber 6 ceiling. As a result, as shown in a dash-single-dot line in FIG. 13, though the local air fuel ratio in the vicinity of the spark plug 16 electrode temporarily enters in a flammable range at the arrival of the mixture transported by the first and second partial tumble flows TS and Tm, it immediately changes to an excessively fuel-rich state and in an extremely short time returns to a fuel state leaner than that in the flammable range. That is, the local air fuel ratio in the vicinity of the spark plug 16 electrode sharply varies.

Figure 12:
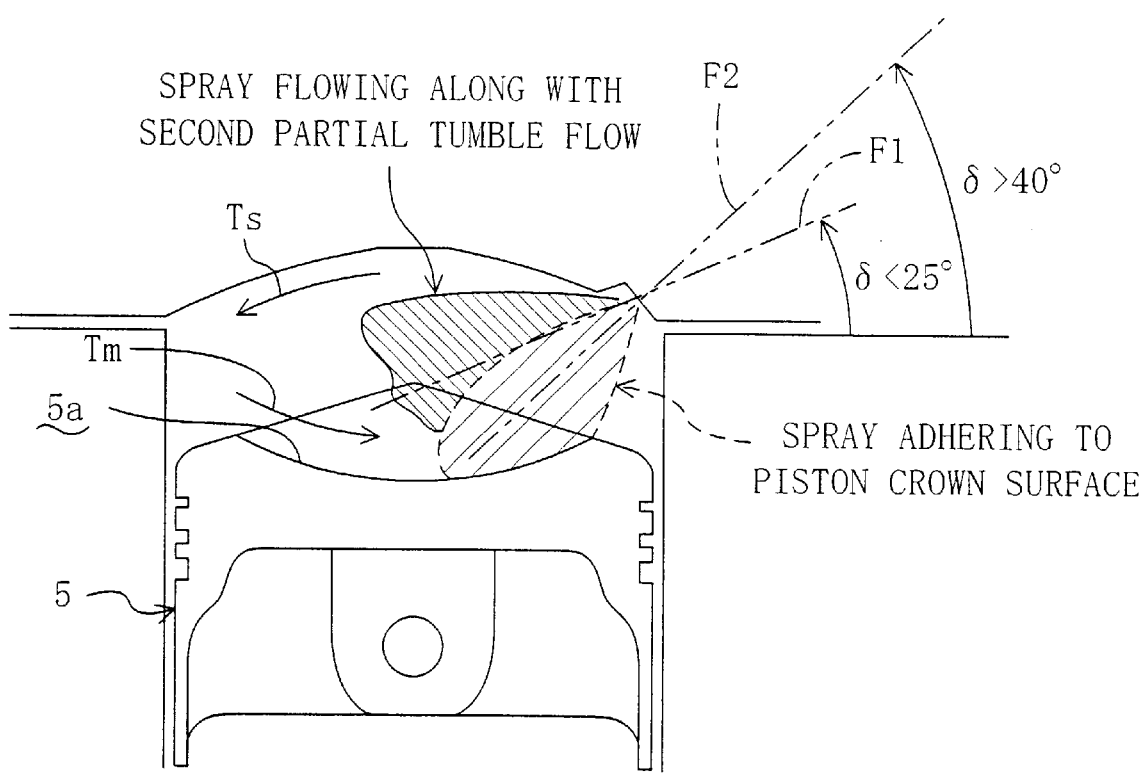
FIG. 12 is a diagram illustrating change of fuel spray behavior caused by change of the center line of fuel spray.
Figure 13:
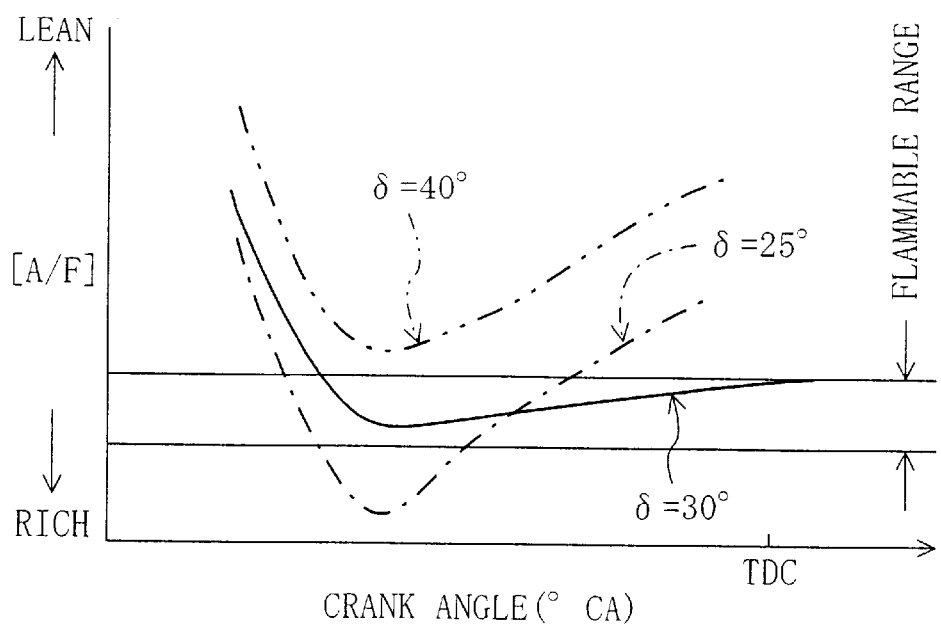
FIG. 13 is a graph showing the change in the local air fuel ratio around the spark plug electrode in the vicinity of the top dead center in correspondence with the change in the center line of fuel spray.
Figure 14:
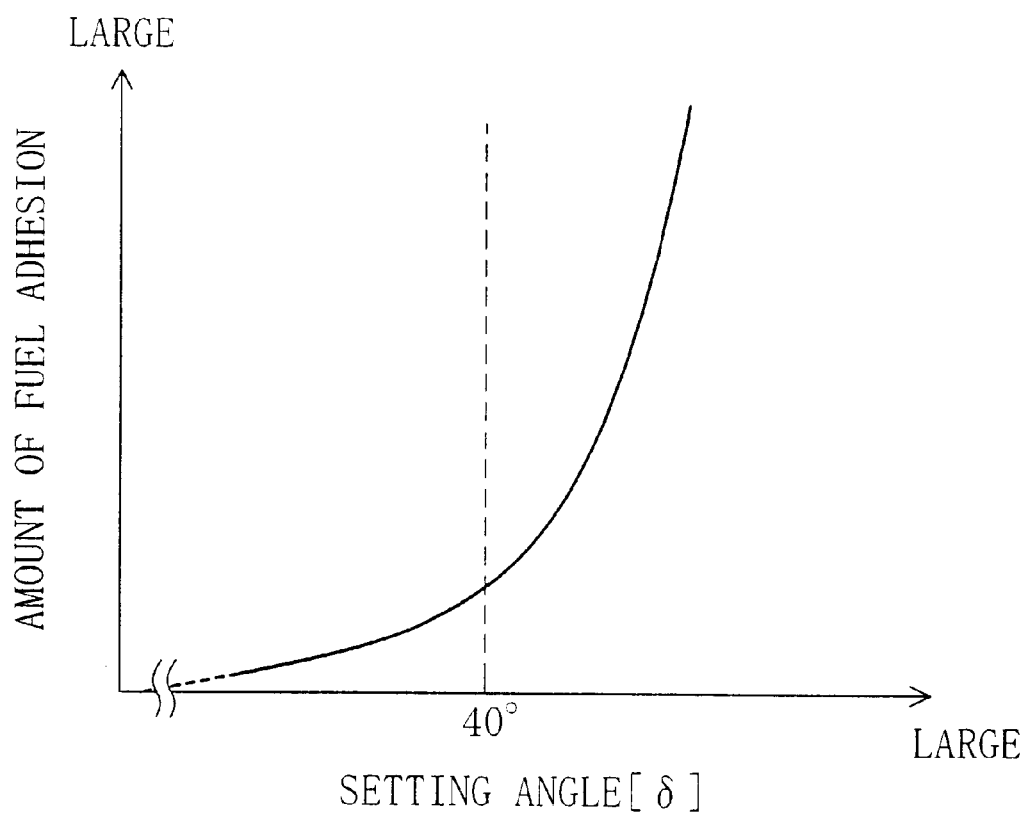
FIG. 14 is a graph showing the relation between the change in the center line of fuel spray and the change in amount of adhesion of fuel to the piston crown surface.

On the other hand, as shown in a dash-double-dot line F2 in FIG. 12, if the tilt angle δ of the spray center line F is increased over approximate 40°, most of fuel spray from the injector 18 impinges against the piston 5 crown surface and adheres thereto as shown in broken lines in the same figure. Therefore as shown in a dash-double-dot line in FIG. 13, the local air fuel ratio in the vicinity of the spark plug 16 electrode does not enter in the flammable range and the mixture falls into non-ignitable condition. Between the amount of adhesion of fuel to the piston 5 crown surface and the tilt angle δ of the spray center line F, i.e., the setting angle of the injector 18, a relationship, such for example as shown in FIG. 14, is established. As can be seen from the figure, if the setting angle of the injector 18 exceeds 40°, the amount of adhesion of fuel is abruptly increased.

After all, it can be said that the tilt angle δ of the spray center line F is preferably set within the range of δ=about 25° to about 40° in order to stably hold the concentration conditions of the mixture within the flammable range. For example, if the tilt angle δ of the center line F of fuel spray from the injector 18 is approximately 30° like this embodiment, fuel spray from the injector 18 effectively impinges against the tumble T in substantially opposite relation. Therefore, the traveling speed of fuel spray can be precisely controlled by the tumble T thereby stably retaining the mixture in the vicinity of the spark plug 16 electrode. That is, as shown in a solid line in FIG. 13, the local air fuel ratio in the vicinity of the spark plug 16 electrode is retained within the flammable range for a relatively long time thereby providing extremely high ignition stability. In addition, this enhances flexibility in controlling the ignition timing (for example, which can be set within the range from BTDC 40° to TDC at the compression stroke of the cylinder 2 during stratified-charge combustion operation) thereby enabling further fuel economy improvement. Note that the graph of FIG. 13 is concerned with the test conducted under conditions that the spray cone angle θ of fuel spray is approximately 45° for every δ.

Figure 16A:
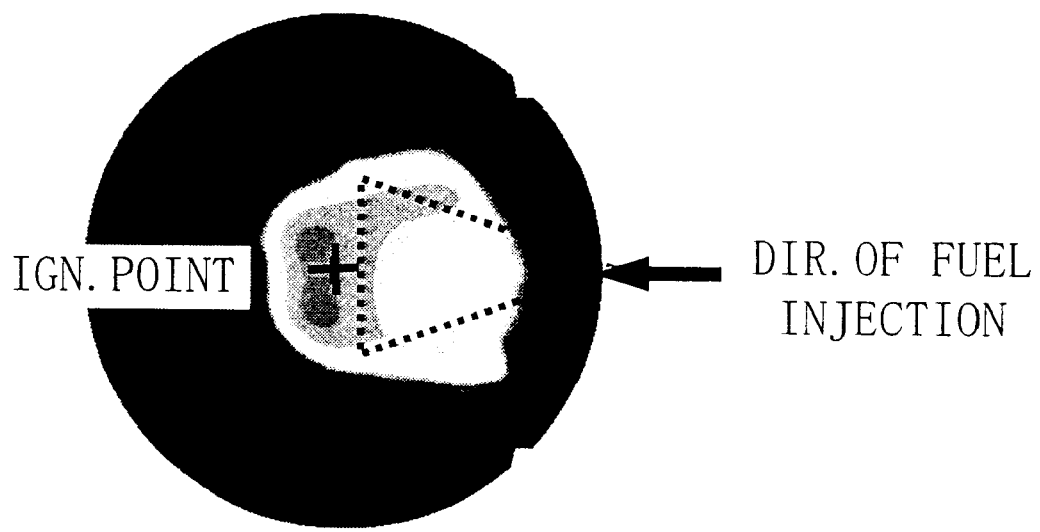
FIGS. 16A–B show a state of a mixture when the spray cone angle of fuel spray is approximately 20°.
Figure 16B:
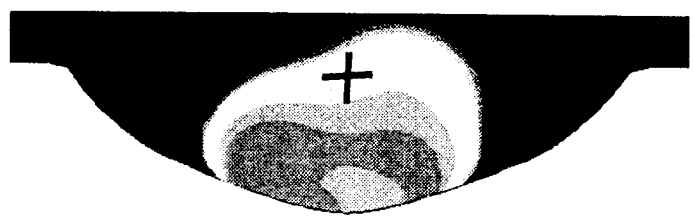
Figure 17A:
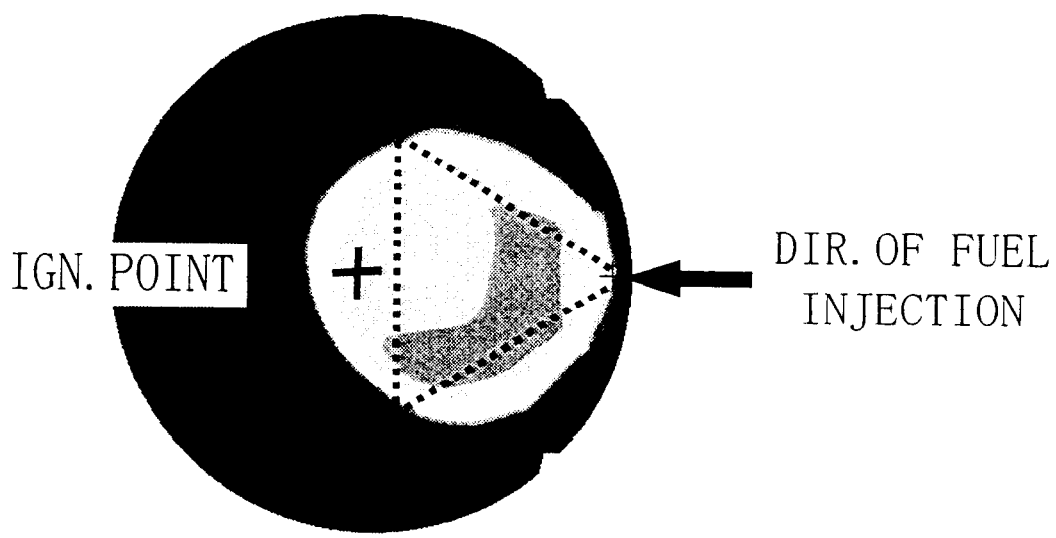
FIGS. 17A–B show a state of a mixture when the spray cone angle of fuel spray is approximately 60°.

Next, in consideration of the spray cone angle θ of fuel spray from the injector 18, if the spray cone angle θ is large, the fuel spray is necessarily diffused so that the mixture is easy to dilute. On the other hand, if the spray cone angle θ is too small, carburetion of fuel droplets and mixture thereof with air cannot sufficiently be made, so that the mixture in the vicinity of the spark plug 16 electrode may be excessively rich. Specifically, FIGS. 16 to 18 show observation results of the flammable mixture layer in the vicinity of the spark plug 16 electrode when the spray cone angle θ is approximately 20° or 60°. A in each figure is a view from the combustion chamber 6 ceiling side along the cylinder center line z, and B in each figure is a view from the injector 18 side in a direction orthogonal to the cylinder center line z. Note that in each figure, the air fuel ratio A/F of the black zone located outside of the cylinder is A/F≧60.

Unlike this embodiment, FIGS. 16 and 17 show the results of the test conducted using a piston (see FIG. 33) which is formed with a spherical cavity over the entire crown surface. As can be seen from the test results, when the spray cone angle θ is approximately 20°, the mixture is suitably stratified in the vicinity of the spark plug 16 electrode (shown in + mark in the figure) at the ignition timing for the cylinder. However, when θ is approximately 60°, the mixture is largely diffused so that ignition stability may be impaired due to decrease in the local air fuel ratio in the vicinity of the spark plug electrode.

On the other hand, from the results of the test in which the piston crown surface is provided with a lemon-shaped cavity and the outer portion, other than the cavity, of the crown surface is provided with squish area sections like this embodiment, it can be seen that even if the spray cone angle θ is approximately 60° as shown in FIG. 18, diffusion of the mixture can be suppressed and the mixture can be suitably stratified like the case where θ is approximately 20° as shown in FIG. 16. The reason for this can be understood that, though described above, the orientation of the tumble is introduced to flow toward the fuel spray by the lemon-shaped cavity of the piston crown surface so that the fuel spray impinges against the tumble thereby suppressing diffusion in its traveling direction and the squishes flowing from the squish area between the piston crown surface and the combustion chamber ceiling toward inside of the cavity suppress diffusion of the fuel spray particularly in the widthwise direction of the cavity.

In addition, as seen from FIG. 18B, as the flammable mixture layer approaches the combustion chamber ceiling side (upper side in the figure), it takes on a more diametrically diminished form and its profile is spaced farther away from the sidewall surfaces of the cavity by the action of the squishes. This prevents adhesion of fuel to the sidewall surfaces and suppresses deterioration of fuel economy and increase of unburnt HC in the exhaust gas.

As described so far, in this embodiment, the spray cone angle θ of fuel spray from the injector 18 is set within the range of approximately 20° or 60° as shown in FIG. 15 and therefore, the local air fuel ratio in the vicinity of the spark plug 16 electrode can be stably held at a value within the flammable range. Note that though the spray cone angle θ also changes depending upon the pressure conditions of the combustion chamber 6 as described above, the spray cone angle θ during stratified-charge combustion operation is more preferably at a value within the range of θ=about 40° to about 45° in the engine 1 of this embodiment.

Position of Spark Plug Electrode

Figure 9:
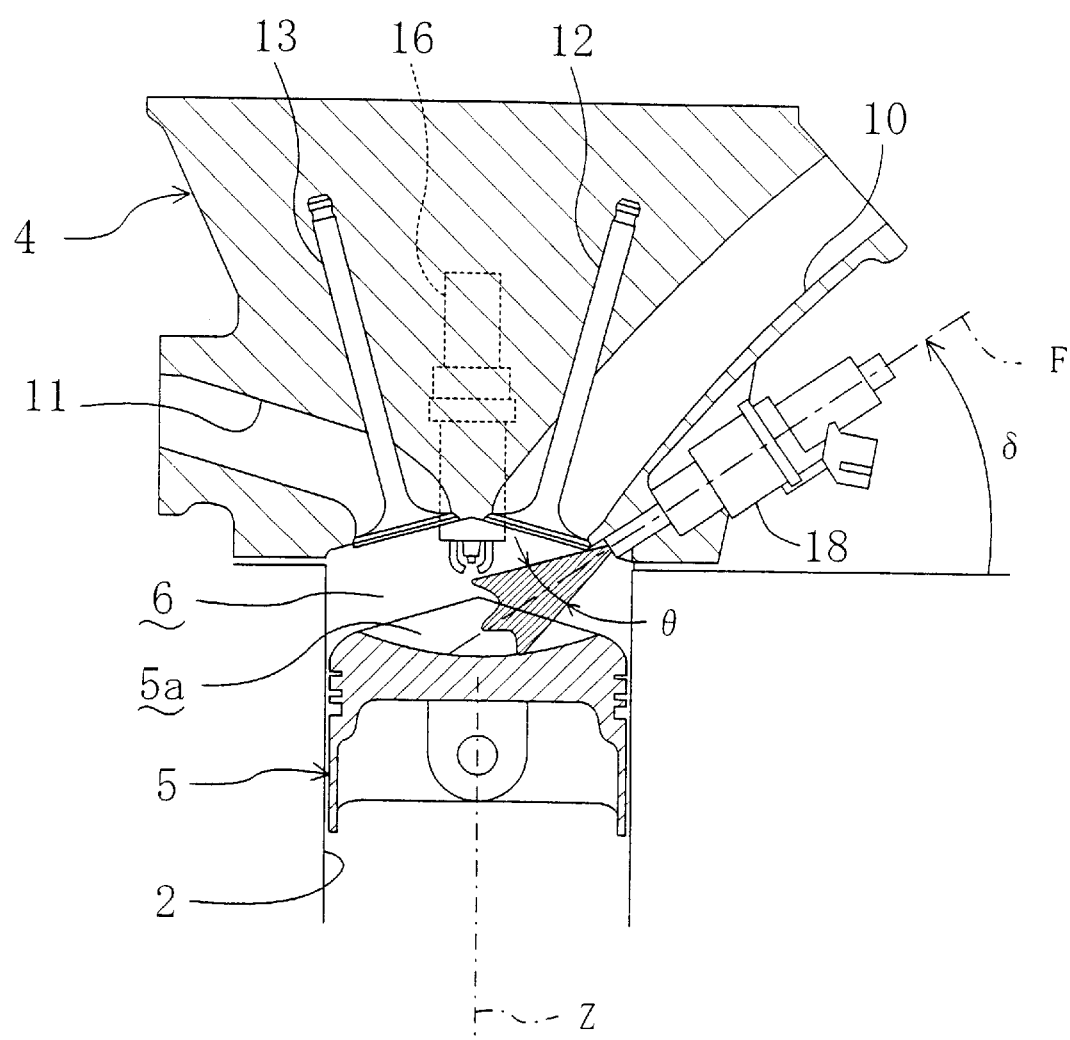
FIG. 9 is a view illustrating the geometrical area, center line and spray cone angle of fuel spray from the injector.
Figure 19:
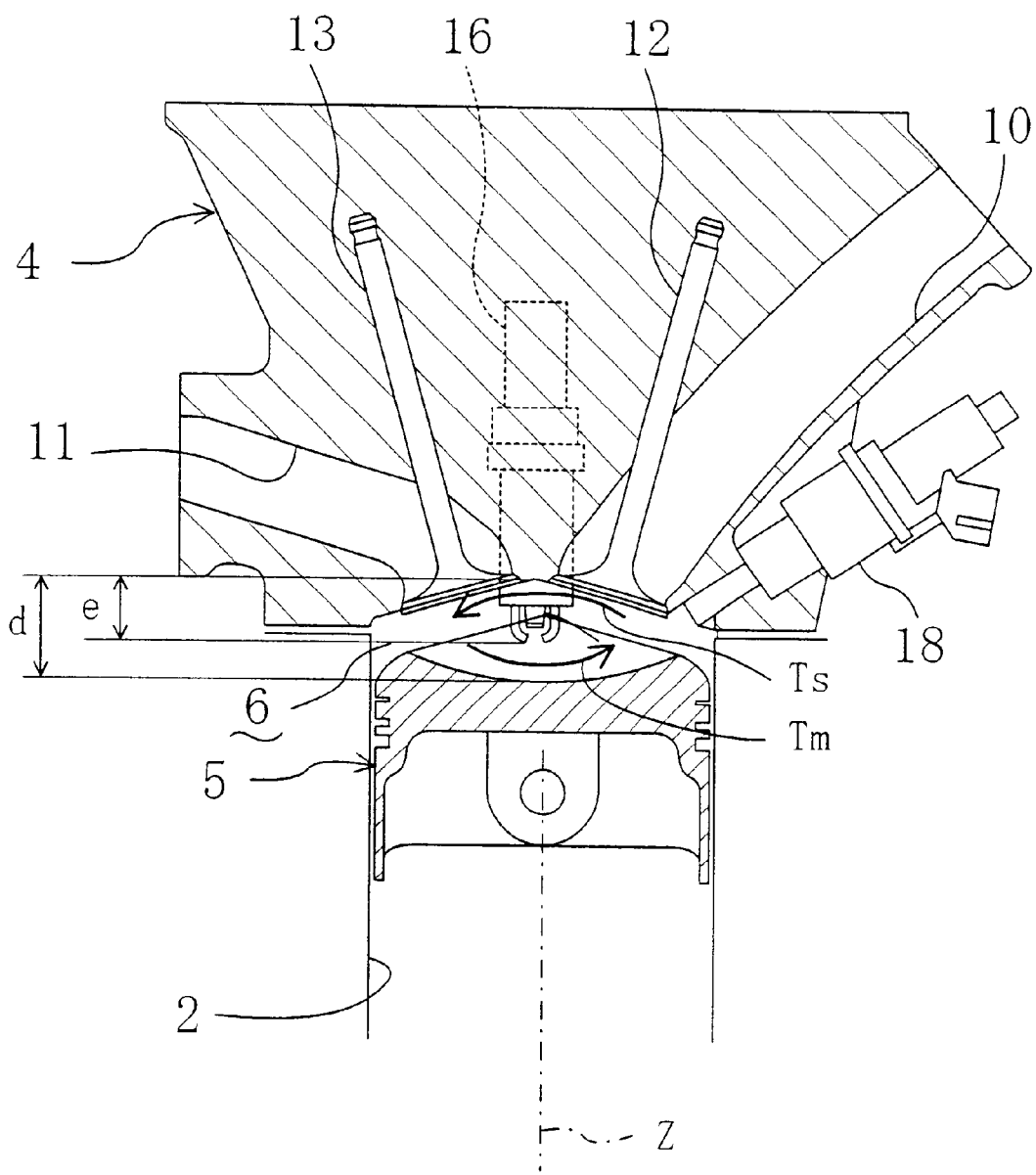
FIG. 19 is a view illustrating the position of the spark plug electrode in comparison with a tumble at an ignition timing for the cylinder.

As described above, in this embodiment, the flammable mixture layer of suitable concentration can be retained centrally in the combustion chamber 6 by controlling behavior of fuel spray from the injector 18 mainly using the tumble T. Further, in order to surely ignite the mixture residing in such a condition, the spark plug 16 is disposed so that its electrode protrudes from the ceiling of the combustion chamber 6 in a direction parallel to the cylinder center line z as also shown in FIGS. 9 and 19. Accordingly, the electrode of the spark plug 16 is located at a position upper (closer to the ceiling of the combustion chamber 6) than that of the center line F of fuel spray from the injector 18 when viewed in the direction orthogonal to the cylinder center line z as shown in both the figures. In other words, when viewed along the spray center line F, the spark plug 16 electrode is located closer to the combustion chamber 6 ceiling than the piston 5 crown surface with respect to the spray center line F.

Furthermore, in this embodiment where the fuel is injected toward the piston 5 crown surface located at an obliquely downward position by the injector 18, the spark plug 16 electrode is located at a position lower than that of the injection nozzle of the injector 18 (i.e., closer to the piston 5 crown surface with respect to an extending direction of the cylinder center line z). And, as described above, since the spark plug 16 electrode is spaced away from the combustion chamber 6 ceiling, flame propagation performance can be more excellent. This also improves combustion conditions.

Specifically, it is assumed that at the ignition timing for the cylinder 2 as shown in FIG. 19 (for example, when the engine 1 is in predetermined low-load operating conditions and the ignition timing is at BTDC 30° CA), d is the distance on the cylinder center line z from the combustion chamber 6 ceiling to the piston 5 crown surface, i.e., d is the distance from substantially the uppermost position of the combustion chamber 6 ceiling to the deepest position of the cavity 5a of the piston 5. In this case, the distance e (amount of protrusion) on the cylinder center line z from the uppermost position of the combustion chamber 6 ceiling to the spark plug 16 electrode is set at a value ranging from approximately ⅓d to approximately ⅔d. Therefore, if part of the tumble flowing along the piston 5 crown surface during the compression stroke of the cylinder 2 is defined as a first partial tumble flow Tm and part of the tumble flowing along the combustion chamber 6 ceiling during that is defined as a second partial tumble flow Ts, the spark plug 16 electrode is located between the first partial tumble flow Tm and the second partial tumble flow Ts for a period from the start of fuel injection of the injector 18 to the ignition timing for the cylinder when the rate of the first partial tumble flow Tm is largely reduced due to impingement against the fuel spray.

At the subsequent ignition timings, the spark plug 16 electrode is difficult to subject to either effect of the first partial tumble flow Tm and the second partial tumble flow Ts also because of significant reduction of the first partial tumble flow Tm. That is, the spark plug 16 electrode is spaced away from the region where the main stream of the second partial tumble flow Ts is generated, located in the center of the tumble T vortex over a duration after the fuel injection timing and before the ignition timing for the cylinder 2, and held in a condition that the mixture easily stays therearound at the ignition timing.

Further, the spark plug 16 electrode is located above (including the outside of the spray area) from the spray center line F of the geometrical area of fuel spray from the injector 18 (see FIG. 9). Herein, the geometrical area of fuel spray refers to the area of droplets of the fuel spray when it is assumed that the fuel spray is not affected by the tumble and swirl in the combustion chamber 6, and is determined based on the image photographed by the above-described laser sheet method. As described above, since the spark plug 16 electrode is disposed above from the spray center line F of the geometrical area of fuel spray, this suppresses adhesion of large fuel droplets included in initial fuel spray from the injector 18 to the spark plug 16 electrode thereby obviating the occurrence of smolder in the spark plug 16.

Figure 20:
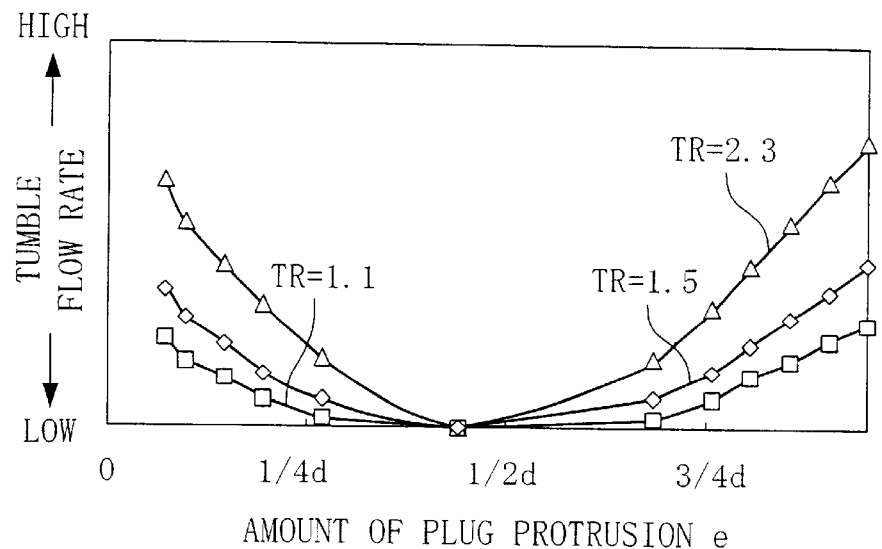
FIG. 20 is a graph showing the relation between the amount of protrusion of the spark plug electrode and the flow rate of the tumble.

FIG. 20 shows a graph when the amount of protrusion e of the spark plug 16 electrode has been changed and concurrently the flow rate of the tumble T immediately before fuel injection in the vicinity of BTDC 55° CA of the cylinder 2 has been measured at the position of the electrode. As can be seen from the figure, the tumble T minimizes its flow rate in the vicinity of the amount of protrusion e=½d, and the rate of the tumble T gradually increases with change in the amount of protrusion e regardless of where the amount of protrusion e is either larger or smaller than that value. This means that in the vicinity of BTDC 55° CA and near to the amount of protrusion e=½d, the spark plug 16 electrode is located around the vortex center of the tumble T. Note that three curves in the graph represent the cases where the tumble ratios TR are 1.1, 1.5 and 2.3, respectively.

Figure 21:
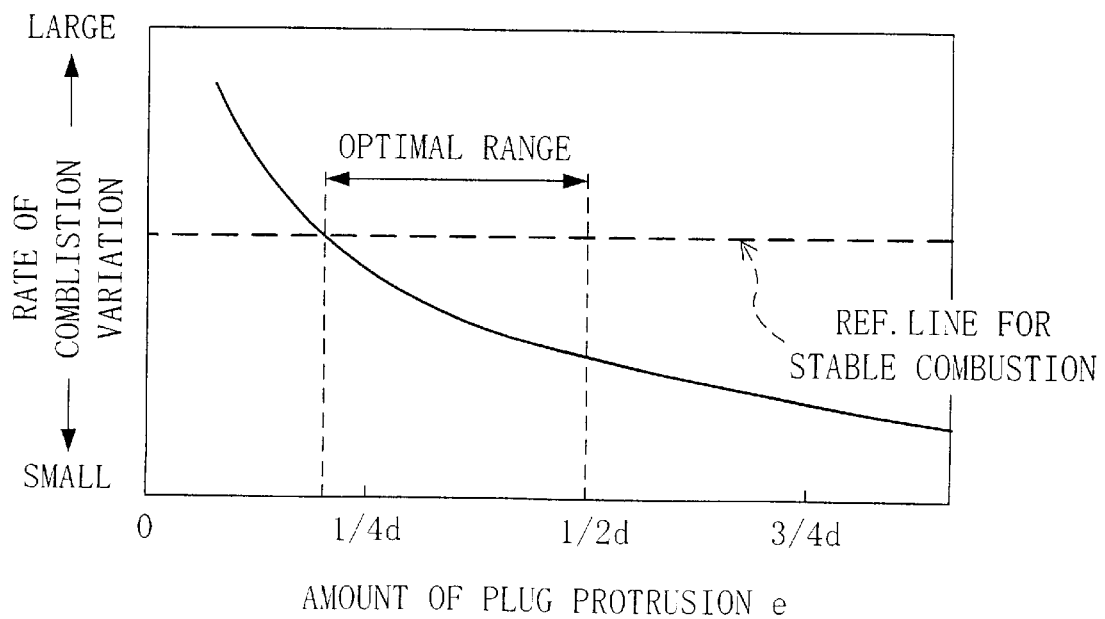
FIG. 21 is a graph showing the relation between the mount of protrusion of the spark plug electrode and the rate of combustion variation.

FIG. 21 shows how the rate of variation of the indicated mean effective pressure (Pi) of the engine 1 (an indication representing the magnitude of cycle-by-cycle variation of combustion) changes when the amount of protrusion e of the spark plug 16 electrode is changed. As can be seen from the figure, the rate of variation of Pi exceeds a predetermined reference line (for example, about 5%) at the amount of protrusion e<0.2d. In this condition, the local air fuel ratio in the vicinity of the spark plug 16 electrode is lean so that combustion quality is deteriorated. On the other hand, if the amount of protrusion e≧0.2d, as the amount of protrusion e is increased, the spark plug 16 electrode becomes closer to the piston 5 crown surface and the local air fuel ratio in the vicinity of the electrode becomes richer, so that the rate of combustion variation becomes smaller. However, if the amount of protrusion e is increased over 0.5d, then the spark plug 16 electrode may contact the spray center line F of the geometrical area of fuel spray thereby causing inconveniences due to adhesion of large fuel droplets at the initial spray.

After all, the amount of protrusion e of the spark plug 16 electrode has an optimal range in consideration of some points such as ease of retention of the mixture, ignitability to the mixture and prevention of adhesion of large fuel droplets. This range is, as shown in the arrow in FIG. 21, e=approx. 0.2d~0.5d in the vicinity of BTDC 55° CA shown in the figure.

Figure 22:
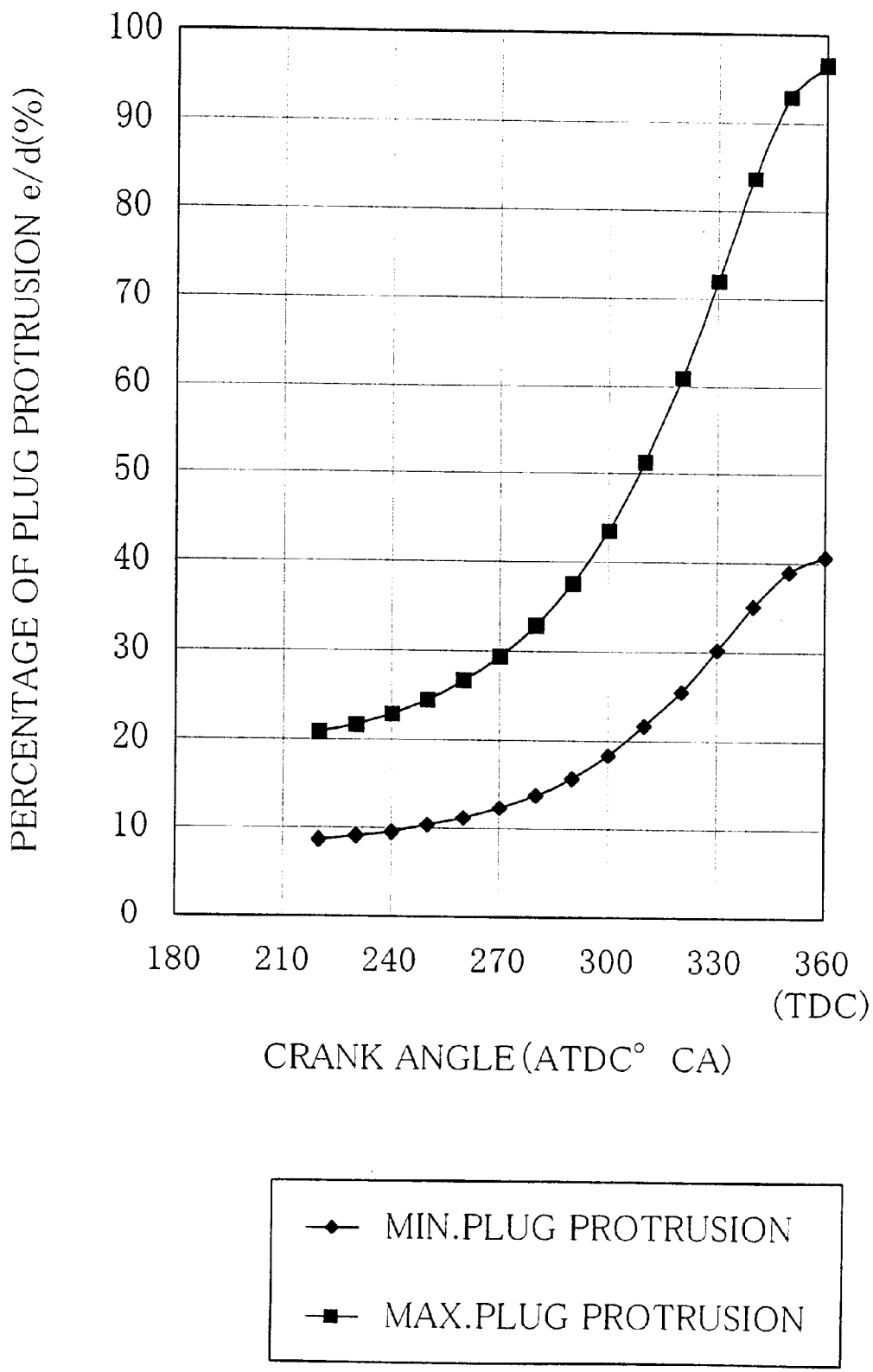
FIG. 22 is a graph in which the range of percentage of protrusion of the spark plug electrode is set in accordance with the change in the fuel injection timing for the cylinder.

At this point, since the distance d on the cylinder center line z from the combustion chamber 6 ceiling to the piston 5 crown surface during the compression stroke of the cylinder 2 is generally decreased with upward motion of the piston 5, if it is assumed that the amount of protrusion e of the spark plug 16 electrode is constant, the rate e/d changes as shown in FIG. 22. Such being the case, in this embodiment, the amount of protrusion e is set so that the rate of amount of protrusion e/d is a value within the region interposed between both graphs shown in the figure. With reference to the figure, it will be noted that if the crank angle is for example BTDC 140° CA (ATDC 220° CA) corresponding to the advancing-side earliest ignition start timing (crank angle position) in the stratified-charge combustion zone, e/d=approx. 10% to approx. 20% is established.

Further, if the crank angle is BTDC 55° CA (ATDC 305° CA) corresponding to the ignition start timing (crank angle position) at relatively low engine speeds in the stratified-charge combustion zone, e/d=approx. 20% to approx. 50% is established. Furthermore, if the crank angle is BTDC 40° CA (ATDC 320° CA) corresponding to the ignition start timing (crank angle position) substantially at idling speed, e/d=approx. 25% to approx. 60% is established. Moreover, if the crank angle is at the top dead center (TDC) during the compression stroke of the cylinder 2, the percentage of protrusion e/d of the spark plug electrode is e/d=approx. 40% to approx. 95%. Note that the ignition timing for each cylinder 2 in the stratified-charge combustion zone in this embodiment is set within the range of approx. BTDC 40° CA to approx. TDC.

Tumble Rate and Spray Penetration Control

Finally, in this embodiment, stable mixture formation is possible even for the change in the operating conditions of the engine 1 by controlling penetration of fuel spray from the injector 18 in accordance with the flow rate of the tumble. This point will be hereinafter described in detail.

Figure 23:
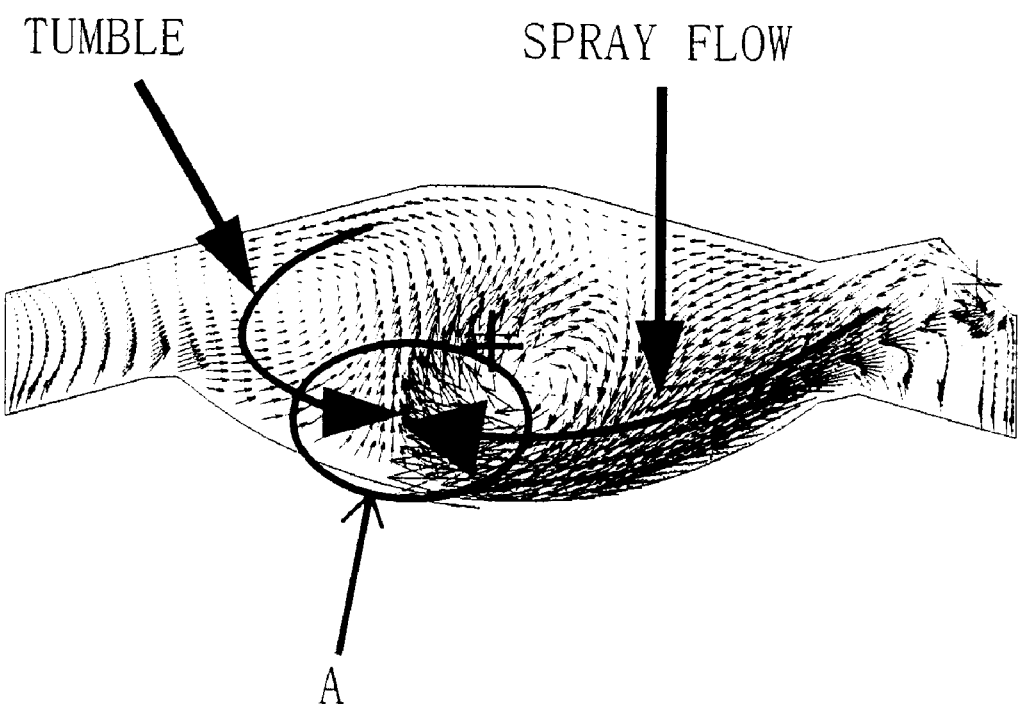
FIG. 23 is a view showing the result of a CFD analysis of flow distribution where the tumble and the fuel spray are balanced one against another in a combustion chamber.
Figure 24A:
FIGS. 24A–B.

FIG. 23 shows the result of analysis of flow distribution of the combustion chamber 6 near to the ignition timing for the cylinder 2 through the application of CFD (computational fluid dynamics) when penetration of fuel spray from the injector 18 is controlled in accordance with the flow rate of the tumble. As shown in bold arrows in the figure, the tumble and spray flow travel from both lateral sides to middle of the figure along the piston crown surface, and the impingement point A between them is located in the vicinity of the spark plug electrode represented in + mark in the figure. Accordingly, as for example shown in FIG. 24A, a flammable mixture mass of suitable concentration can be retained near to the spark plug 16 electrode (represented in + mark in the figure) near to the ignition timing for the cylinder 2.

Figure 24B:
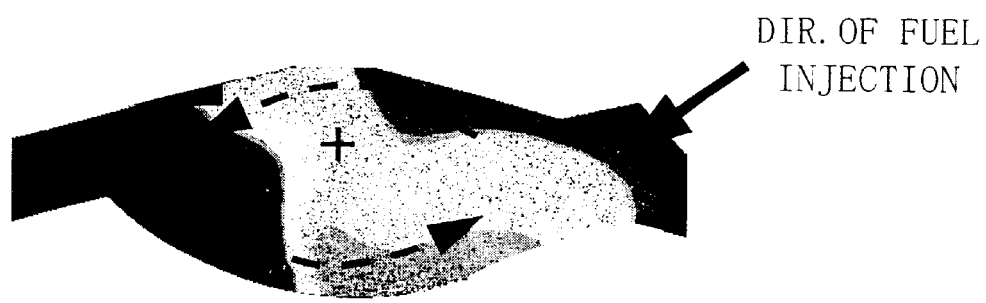

At this point, since the flow rate of the tumble in the combustion chamber generally changes with the engine revolving speed (revolving speed of the crank shaft 7), if the mixture will be suitably stratified over a wide range of operating conditions, penetration of fuel spray from the injector should be controlled in accordance with the engine operating conditions. For this purpose, as an example, it can be considered to change and regulate the fuel injection pressure of the injector. In this case, the flow rate of the tumble is too much small during, for example, engine idling operation. Therefore, if the fuel injection pressure will be decreased correspondingly, atomization property and other properties of fuel may be deteriorated. On the contrary, when the flow rate of the tumble exceeds a predetermined upper limit in, for example, mid-to-higher engine speed range, if the fuel injection pressure is increased correspondingly, there may be caused an inconvenience that the impingement of the fuel spray against the tumble is too much hard. In this case, though the mixture stays in the vicinity of the spark plug 16 electrode, it is largely diffused as for example shown in FIG. 24B and decreases its degree of stratification so that ignition stability of the mixture may be impaired.

In contrast, in this embodiment, since the intake airflow control valves 34 (see FIG. 3) disposed in the intake ports 10 of each cylinder 2 are controlled in opening mainly in accordance with the change in the revolving speed of the engine 1 to change the flow rate of the tumble T in the combustion chamber 6 and the fuel injection pressure of the injector 18 is correspondingly regulated, suitable mixture stratification can be implemented in the entire stratified-charge combustion zone A (see FIG. 6).

Figure 25A:
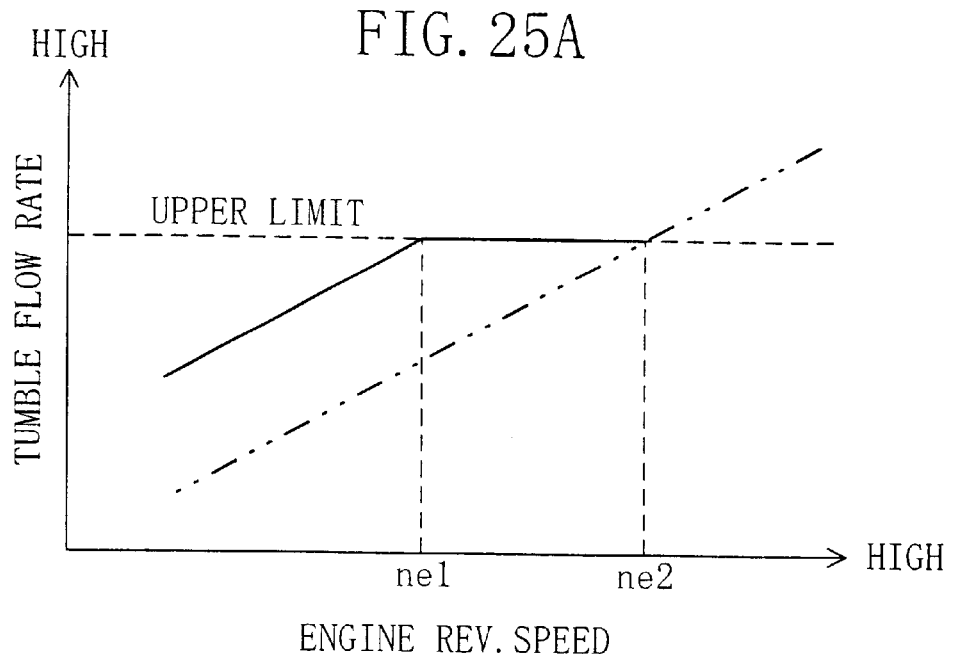
FIGS. 25A–B show maps respectively showing the change in the flow rate of the tumble and the penetration of fuel spray in accordance with the revolving speed of the engine.

Specifically, as shown in FIG. 25A, when the engine 1 is in the stratified-charge combustion zone and its revolving speed is equal to or smaller than a first set value ne1 (for example, 2500 rpm), the intake airflow control valve 34 is fully closed. In this manner, the flow rate of the tumble can be increased as compared with the case where the intake airflow control valve 34 is open (shown in an imaginary line in the figure). Next, when the engine revolving speed exceeds the first set value ne1 and the flow rate of the tumble reaches the predetermined upper limit, the intake airflow control valve 34 is gradually opened with increase in the engine revolving speed in order that even if the engine revolving speed becomes high, the flow rate of the tumble T is not increased over the upper limit. Then, after the engine revolving speed exceeds a second set value ne2 (for example, 3500 rpm) and the engine 1 shifts to the homogeneous combustion zone, the intake airflow control valve 34 is fully opened to ensure the amount of intake air.

Such operation control on the intake airflow control valve 34 is performed by the ECU 50 based on a predetermined control program. Therefore, the ECU 50 corresponds to a tumble control means for operating the intake airflow control valve 34 to suppress increase in the tumble flow rate associated with increase in the revolving speed of the engine 1 when the engine revolving speed reaches and exceeds the set value.

Figure 25B:
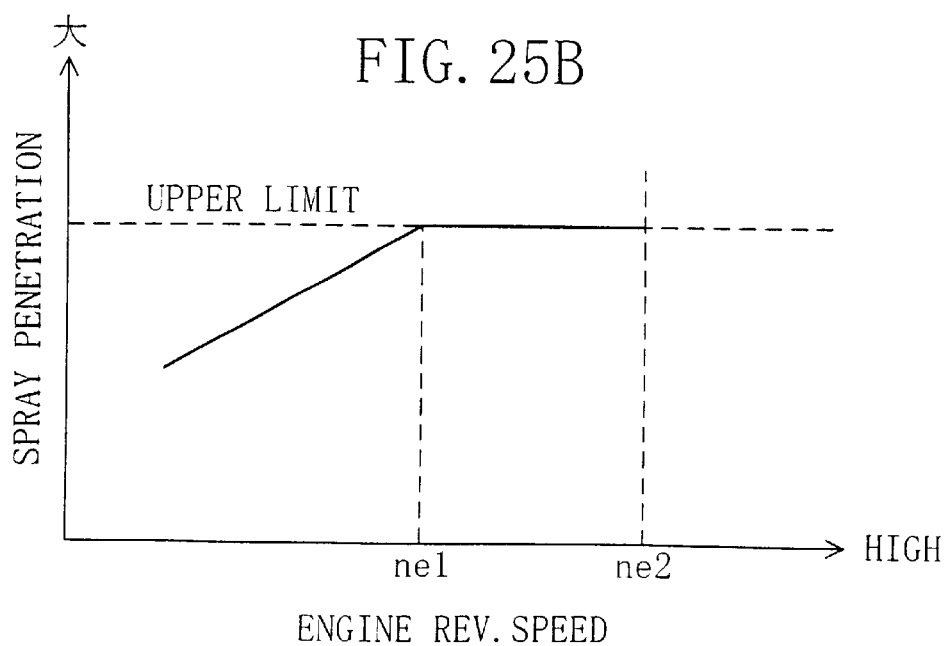

And, the fuel injection pressure of the injector 18 is changed to correspond to the change in the tumble flow rate as described above, thereby changing penetration of fuel spray as shown in FIG. 25B. That is, when the engine 1 is in the stratified-charge combustion zone and its revolving speed is equal to or lower than the first set value ne1, fuel spray penetration is enhanced in correspondence to rise in the revolving speed. On the other hand, from the time the engine revolving speed exceeds the first set value ne1 until it reaches the second set value ne1, fuel spray penetration is held substantially constant. Further, after the engine revolving speed exceeds the second set value ne2 and the engine 1 shifts to the homogeneous combustion zone, the fuel injection pressure is determined in accordance with the balance between the injection quantity and the injectable time interval of fuel.

Figure 26:
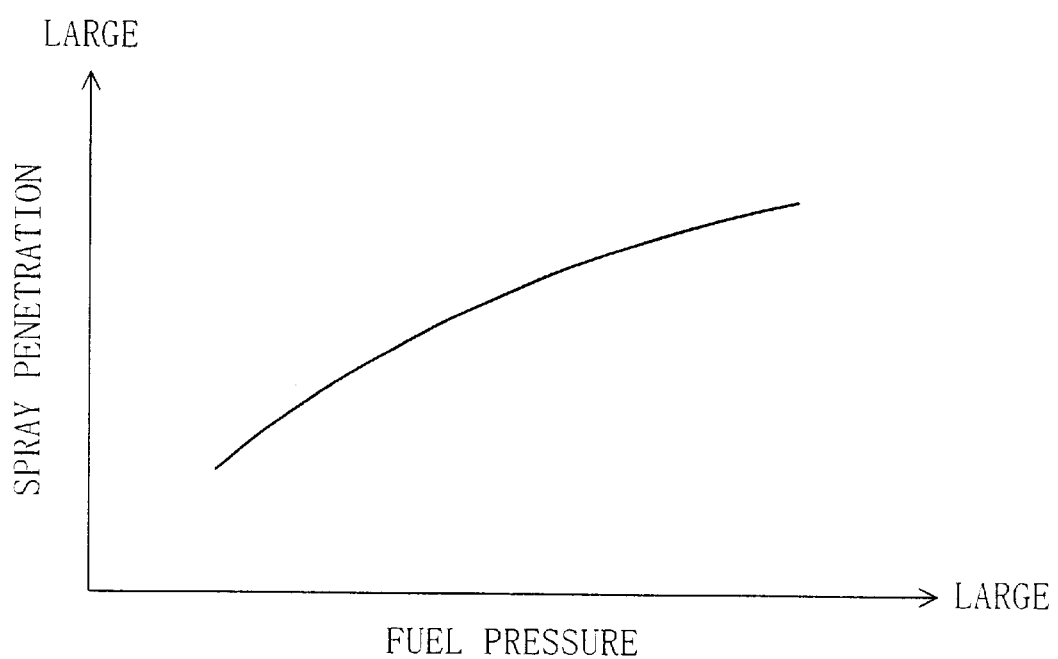
FIG. 26 is a map showing the relation between the penetration of fuel spay and the fuel injection pressure.

Such control on spray penetration is based on that the pressure of fuel supplied to the injector 18 (fuel pressure) is changed by operating the high-pressure regulator 27 of the fuel supply system 20 through the ECU 50 under a predetermined control program. A relationship as shown in FIG. 26 is established between the fuel pressure and the spray penetration. Therefore, in the actual control procedure, the fuel injection pressure will be regulated, in consideration of the relationship of FIG. 26, so that the relationship between the engine revolving speed and the spray penetration is such as to be shown in FIG. 25B. Accordingly, the ECU 50 also corresponds to the configuration of a fuel injection control means for increasing penetration of fuel spray from the injector 18 in accordance with increase in the engine revolving speed until the revolving speed reaches a set value and suppressing increase in penetration when the engine revolving speed reaches or exceeds the set value.

Figure 27A:
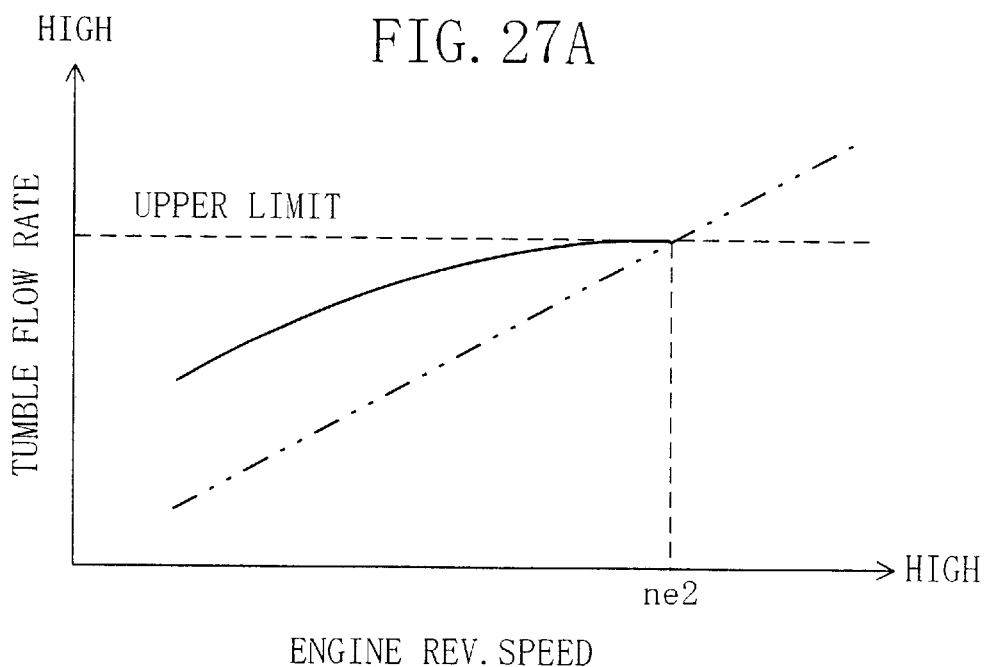
FIGS. 27A–B show maps corresponding to FIG. 25 in a modification.
Figure 27B:
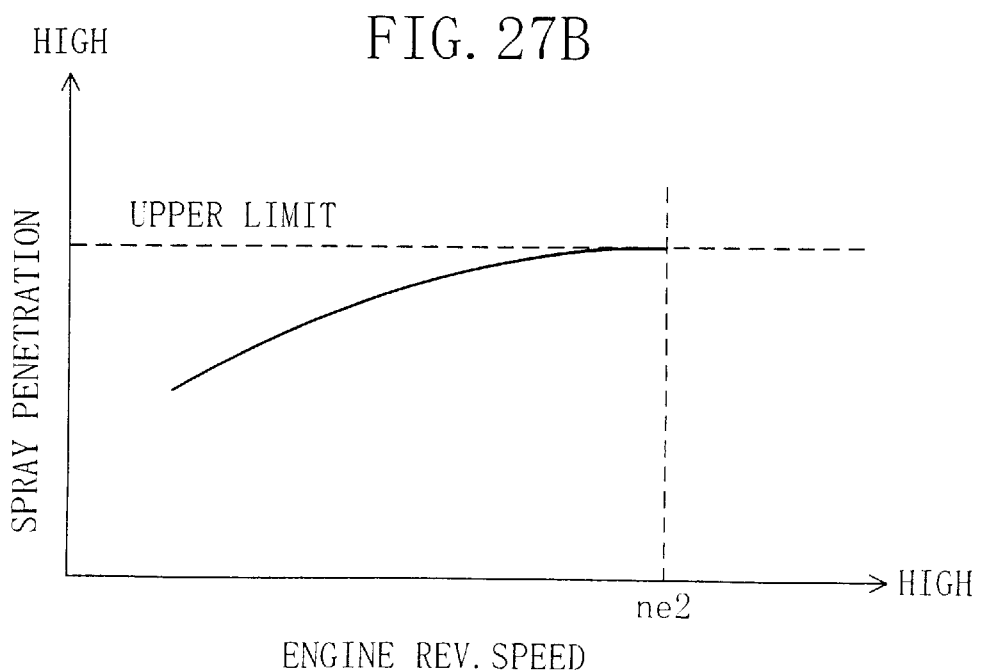

As a modification, control on the tumble flow rate and the spray penetration may be conducted in a manner shown in FIG. 27. Specifically, during the time the revolving speed of the engine 1 is equal to or smaller than the second set value ne2, the flow rate of the tumble T may be gradually increased within the range of values not larger than the upper limit as shown in FIG. 27A by gradually opening the intake airflow control valve 34 in accordance with increase in the engine revolving speed, and the fuel spray penetration may be correspondingly enhanced in accordance with the engine revolving speed as shown in FIG. 27B.

Figure 39A:
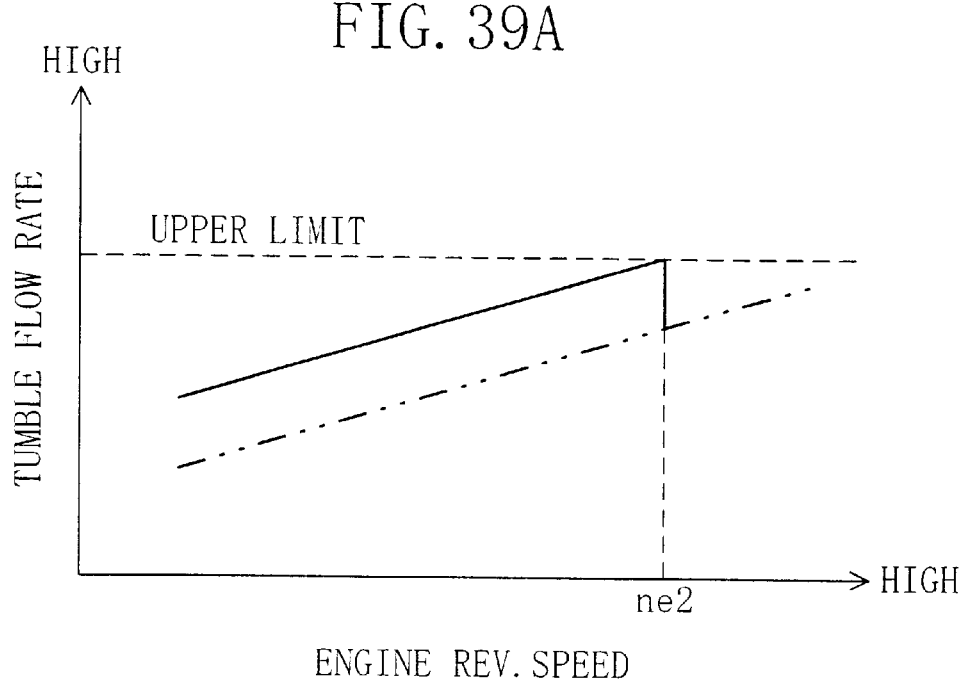
FIGS. 39A–B show corresponding graphs of FIG. 25 according to a second modification of Embodiment 1.
Figure 39B:
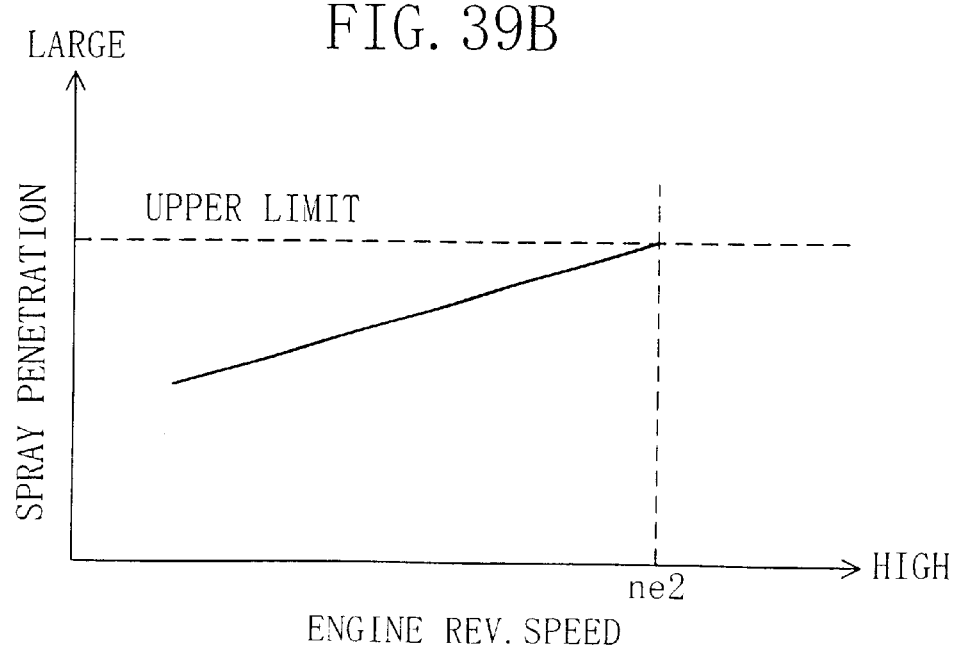

Alternatively, as a second modification, when the engine 1 is for example in the stratified-charge combustion zone A, the intake airflow control valve 34 may be held in a fully closed position so that only the fuel injection pressure may be controlled. In this manner, as for example shown in FIG. 39A, during the time the revolving speed of the engine 1 is equal to or smaller than the second set value ne2, the flow rate of the tumble T gradually increases with the increase in the engine revolving speed. Thereafter, when the engine revolving speed exceeds the second set value ne2, the intake airflow control valve 34 is opened so that the tumble flow rate reduces. Then, the tumble flow rate increases again. Through the regulation of the fuel injection pressure with the injector 18 in a manner corresponding to such changes in the tumble flow rate, the fuel spray penetration can be changed as shown in FIG. 39B.

When only the fuel injection pressure is thus regulated without operating the intake airflow control valve 34, since the regulation of the fuel injection pressure is excellent in responsibility, the system can respond to, without delay, even an abrupt change in the operating conditions of the engine 1, such as its transient state. Therefore, the combustion quality of the engine 1 can be extremely improved not only in its steady state but also in its transient state. Furthermore, such control is preferable particularly for such engines that even if the revolving speed is increased due to the combustion chamber design and the intake system design as shown in the figure, its attendant increase in the tumble flow rate is relatively small.

In the direct-injection engine 1 of this embodiment, as described above, the flow rate of the tumble T in the combustion chamber 6 is controlled so as not to exceed the upper limit by controlling the opening of the intake airflow control valve 34 in order that the mixture residing in the vicinity of the spark plug 16 electrode may not be widely diffused and diluted. This means that the tumble ratio in the combustion chamber 6 will have a value within a predetermined range in the stratified-charge combustion zone of the engine 1. Specifically, it can be said that in this embodiment, the upper limit of the tumble flow rate is set so that the tumble ratio in the combustion chamber 6 has a value within the range between approximately 1.1 to 2.3, and the revolving speed ne1 of the engine 1 is set to correspond to the set upper limit. The tumble ratio herein refers to a standard of the tumble intensity in the in-cylinder combustion chamber, and more specifically, is defined as a value obtained by measuring the vertical angular velocity of the in-cylinder airflow at each intake valve lift, integrating the measured value and dividing the integrated value by the angular velocity of the crank shaft. Accordingly, if the tumble ratio is constant, a higher engine speed leads to a higher tumble flow rate in the cylinder.

Figure 28:
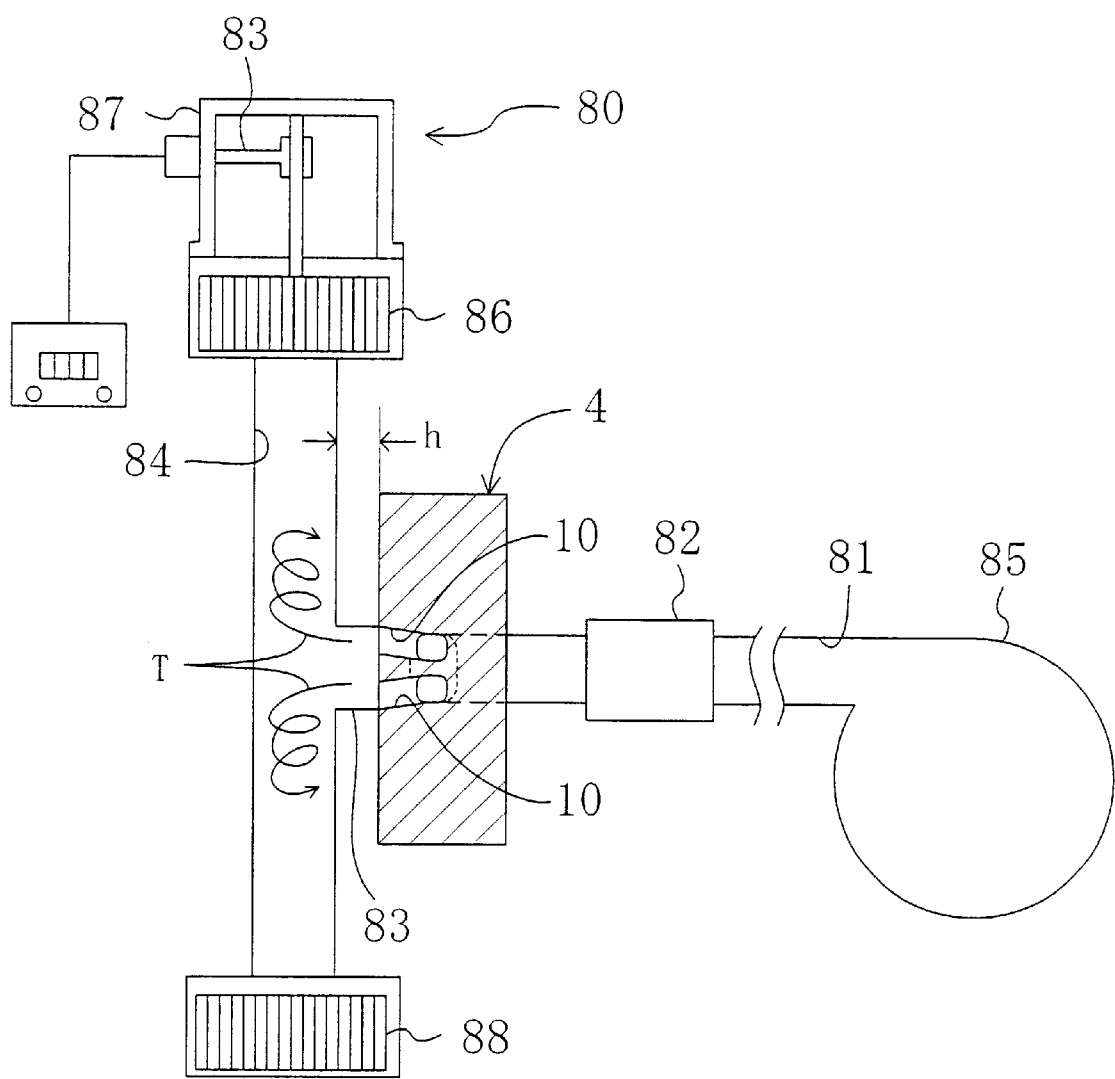
FIG. 28 is a schematic diagram of the structure of an apparatus for measuring a tumble ratio.

Furthermore, measurements will be made of the vertical angular velocity of the in-cylinder airflow with, for example, a rig 80 of configuration as shown in FIG. 28. Specifically, in the figure, reference numeral 4 denotes an engine cylinder head 4. The cylinder head 4 is laterally disposed on the rig 80, and an intake supply apparatus 82 for supplying an intake air for measurement through an intake supply passage 81 is connected to the upstream ends of the intake ports 10, 10 of a given cylinder. The downstream ends of the intake ports 10, 10 are connected to the approximately midportion of the measuring tube 84 through a connecting pipe 83. The intake supply apparatus 82 provides for feeding an air supplied from a blower 85 to the intake ports 10, 10 while regulating the air so that the differential pressure between the intake ports 10, 10 and the measuring tube 84 comes into a condition near to the atmospheric pressure at full-open throttle.

Moreover, the measuring tube 84 is formed of a cylinder the diameter of which is equal to that of the air cylinder and the length of which is about 10 times as long as its diameter. One end thereof on the top side of the figure is connected with an impulse meter 87 equipped with a honeycomb-shaped rotor 86, while the other end on the bottom side of the figure is connected with a dummy rotor 88 having rotational resistance equal to that of the rotor 86. Note that the length of the measuring tube 84 about 10 times as long as its diameter is for ensuring measurement precision and stability and for the same reason the connecting pipe 83 has a shorter length h (for example, about 2 cm) and a diameter as large as that of the air cylinder.

When the air is fed from the blower 85 to the intake ports 10, 10 through the intake supply passage 81, the intake airflow passes through the intake ports 10, 10 into the inside of the measuring tube 83 to form a circumferentially swirling flow, and the swirling flow travels toward both ends of the measuring tube 84 and then imparts torque to the rotor 86. The torque is measured via a torque arm 89 of the impulse meter 87, and the vertical angular velocity of the in-cylinder airflow is determined based on the measured value.

Figure 29A:
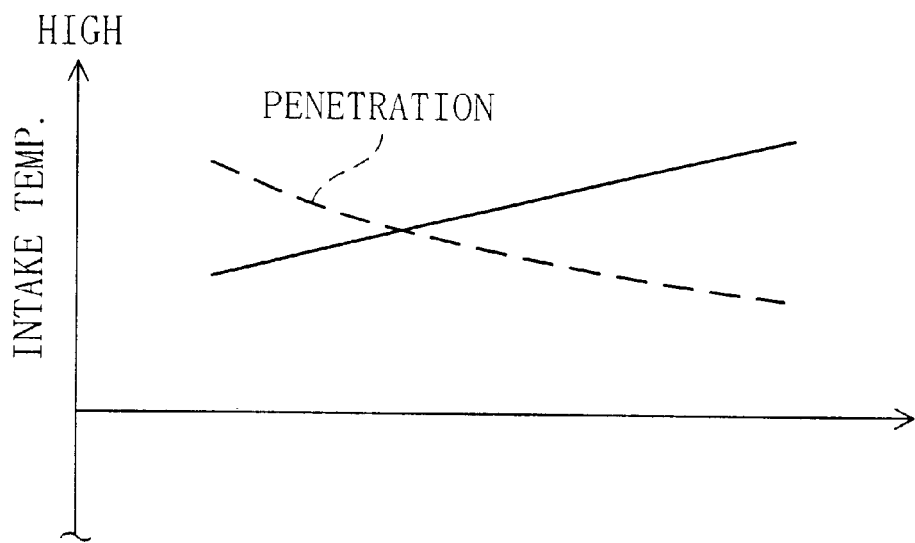
FIG. 29A–B.

Generally, penetration of fuel spray from the injector 18 changes depending upon the temperature conditions of the combustion chamber 6 of the engine 1. The temperature conditions of the combustion chamber 6 vary depending upon the load conditions and revolving speed of the engine 1. Further, they also change depending upon the warm-up conditions of the engine 1 and the existence/absence of exhaust gas recirculation (EGR). As an example, after the engine warming-up, the temperature of the intake air taken in the combustion chamber 6 becomes higher than that before the completion of warming-up, and the combustion temperature is also increased so that the temperature of the combustion chamber 6 is elevated. Furthermore, the increase in the combustion temperature induces an elevated exhaust temperature, and therefore at the recirculation of the exhaust gas through the EGR passage 43, the intake air temperature is increased under the influence of the high-temperature exhaust gas. As a result, as for example shown in FIG. 29A, when the temperature of the combustion chamber 6 is elevated, fuel carburetion is promoted so that spray penetration has a tendency to decrease as shown in a broken line in the same figure.

Figure 29B:
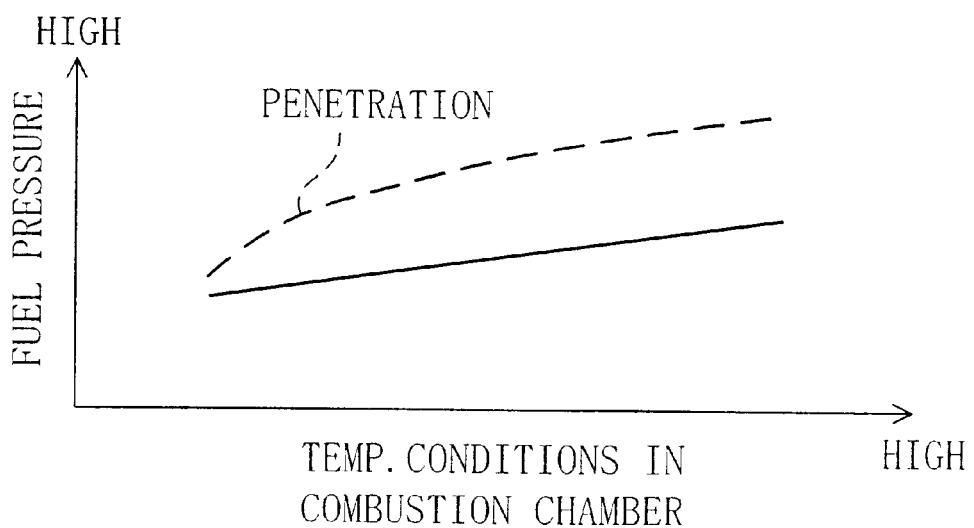

To cope with this and implement suitable mixture stratification as described above, it is essential to balance tumble intensity against fuel spray penetration. Therefore, in this embodiment, the fuel injection pressure of the injector 18 is set in accordance with the fuel injection quantity and the engine revolving speed, and additionally, it is corrected in accordance with the temperature conditions of the combustion chamber 6 as described above. Specifically, as shown in a solid line in FIG. 29B, the fuel injection pressure (fuel pressure) is corrected, based on the load conditions, revolving speed and the water temperature of the engine 1, existence/absence of exhaust gas recirculation through the EGR valve 44 or the like, so that as a higher temperature of the engine 1 is supposed, the fuel injection pressure becomes higher. As a result, the spray penetration is increased as shown in a broken line in the figure. That is, even if the spray penetration is decreased due to increase in temperature of the combustion chamber 6 in the cylinder 2, the injection pressure is correspondingly elevated to keep the spray penetration constant, thereby suppressing fluctuations in concentration conditions of the mixture in the vicinity of the spark plug 16 electrode.

Operations and Effects

Next, description will be made about the behavior, operations and effects of the inventive direct-injection spark ignition engine during stratified-charge combustion operation.

Figure 30:
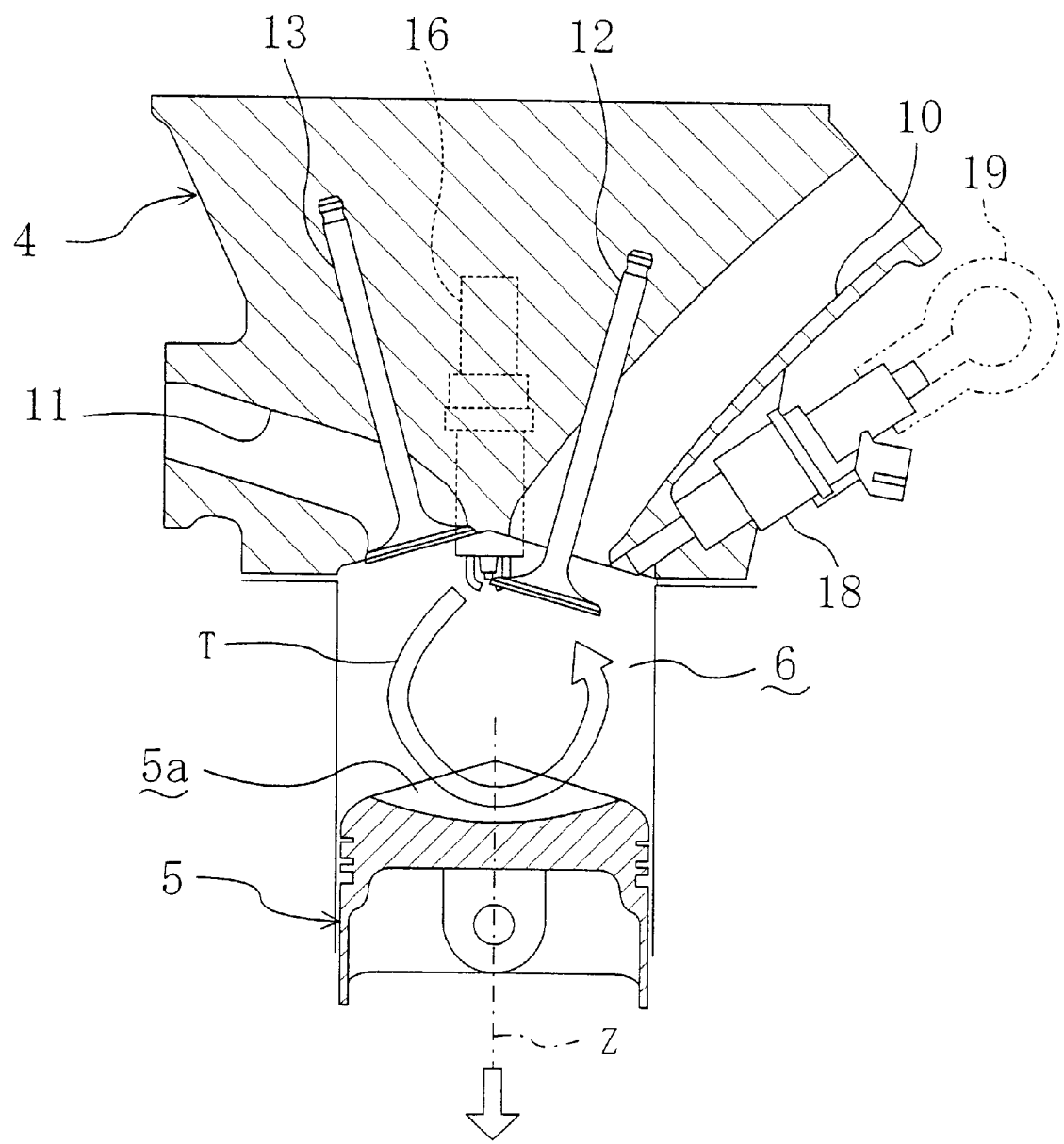
FIG. 30 is view corresponding to FIG. 1 at an intake stroke of the cylinder.

In the stratified-charge combustion zone A of the engine 1, when the piston 5 moves down from the top dead center during such an intake stroke of the cylinder 2 as shown in FIG. 30, an intake air flows into the combustion chamber 6 through a clearance between the valve head of the intake valve 12 in open position and the opening end of the intake port 10 so that a tumble T is generated as shown in the arrow in the figure. In detail, the intake air taken in the combustion chamber 6 through the downward movement of the piston 5 flows into the combustion chamber 6 mainly through portion of the opening end of the intake port 10 closer to the spark plug 16. With further downward movement of the piston 5, the intake air flows downward along the cylinder inner periphery on the exhaust side (left-hand side of the figure), is turned to the intake side (right-hand side of the figure) along the piston 5 crown surface, and then flows upward thereby forming a tumble T longitudinally widely swirling over the entire combustion chamber 6.

Subsequently, the cylinder 3 shifts to the compression stroke. During this stroke, when the piston 5 moves up from the bottom dead center, the volume of the combustion chamber 6 is reduced by the upward movement of the piston 5 and the tumble T is thus pressed in a compact shape. Though its flow rate is gradually decreased, the tumble T is not collapsed but retained up to the middle and later stages of the compression stroke of the cylinder 2. Further, also after the middle stage of the compression stroke of the cylinder 2, the combustion chamber space of suitable form is left between the pent-roof type combustion chamber 6 ceiling and the cavity 5a of the piston 5 crown surface, and therefore the retentivity of the tumble T in the combustion chamber 6 is enhanced. At the time, the tumble T (first partial tumble flow) flowing along the piston 5 crown surface from exhaust to intake side (from left- to right-hand side of the figure) turns backward near to the injection nozzle of the injector 18 and then flows along the combustion chamber 6 ceiling from intake to exhaust side. Particularly, the first partial tumble flow T is guided along the cavity 5a of the piston 5 crown surface to flow toward the injection nozzle of the injector 18.

Therefore, as shown in FIG. 11, when a fuel is injected by the injector 18, the major part of the fuel spray impinges substantially oppositely against intense partial flow of the tumble T flowing along the cavity 5a of the piston 5 crown surface. Thereby, carburetion of fuel droplets and mixture thereof with the ambient air are promoted, and the fuel spray is gradually reduced in speed while advancing to push away the tumble T so that a flammable mixture layer of suitable concentration is formed at the ignition timing for the cylinder 2 as shown in FIG. 1. This flammable mixture layer stays around the spark plug 16 electrode located in the center of the combustion chamber 6. Further, squishes flowing from outside of the cavity 5a toward the cylinder center suppress diffusion of the flammable mixture layer thereby enhancing precision of retention thereof around the spark plug 16 electrode. In this state, electricity is conducted to the spark plug 16 so that the flammable mixture layer is ignited thereby providing well stratified-charge combustion.

In short, during the compression stroke of the cylinder 2, the tumble T is guided along the cavity 5a of the piston 5 crown surface to flow from the center of the combustion chamber 6 toward the injection nozzle of the injector 18, and additionally, fuel spray is caused to effectively impinge against the tumble T in a suitable direction with an appropriate penetration and divergence. As a result, the mixture can be suitably stratified and retained in the center of the combustion chamber 6.

At the time, the opening of the intake airflow control valve 34 provided in the intake port 10 is controlled in accordance with the operating conditions of the engine 1 so that the flow rate of the tumble T is regulated to fall within an optimal range, and the fuel injection pressure of the injector 18 is controlled likewise so that the fuel spray penetration is adjusted to fall within an optimal range matching with the flow rate of the tumble T. Therefore, even if the operating conditions of the engine 1 change from idling to mid load and mid engine speed range, the tumble intensity and the fuel spray penetration are balanced one against another within an optimal range in which they are neither too much intense nor too much weak regardless of changes in the engine operating conditions. Accordingly, as described above, the flammable mixture of suitable concentration can be retained in the center of the combustion chamber 6.

After all, according to the direct-injection spark ignition engine 1 of this embodiment, fuel spray behavior is suitable controlled by the tumble T and the like in the combustion chamber 6 of the cylinder 2 over the entire stratified-charge combustion zone A so that suitable mixture stratification can be accomplished regardless of changes in the operating conditions. This implements excellent stratified-charge combustion and thus improves fuel economy and power output. Further, since such a method for forming a mixture enables implementation of good stratified-charge combustion conditions up to higher load and engine speed range than the prior art, the stratified-charge combustion zone is extended thereby providing further excellent fuel economy improvement effect over the entire range of operating conditions of the engine 1.

Furthermore, as described above, since the mixture of suitable concentration can be retained in the vicinity of the spark plug 16 electrode at the ignition timing for the cylinder 2, a period during which the mixture is stably ignitable can be extremely extended. This increases flexibility in controlling the ignition timing for the cylinder 2 thereby providing improved fuel economy and power output.

Moreover, it can be prevented that like the prior art (Japanese Unexamined Patent Publication Gazette No. 11-141338), the cavity inner wall surfaces opposed to the injector 18 are located near to the spark plug electrode to interfere with growth of a flame core in the initial combustion stage and deteriorate flame propagation performance, and additionally, adhesion of fuel to the piston crown surface can be decreased. This also further improves fuel economy and power output and reduces unburnt HC concentration in the exhaust gas.

Figure 31:
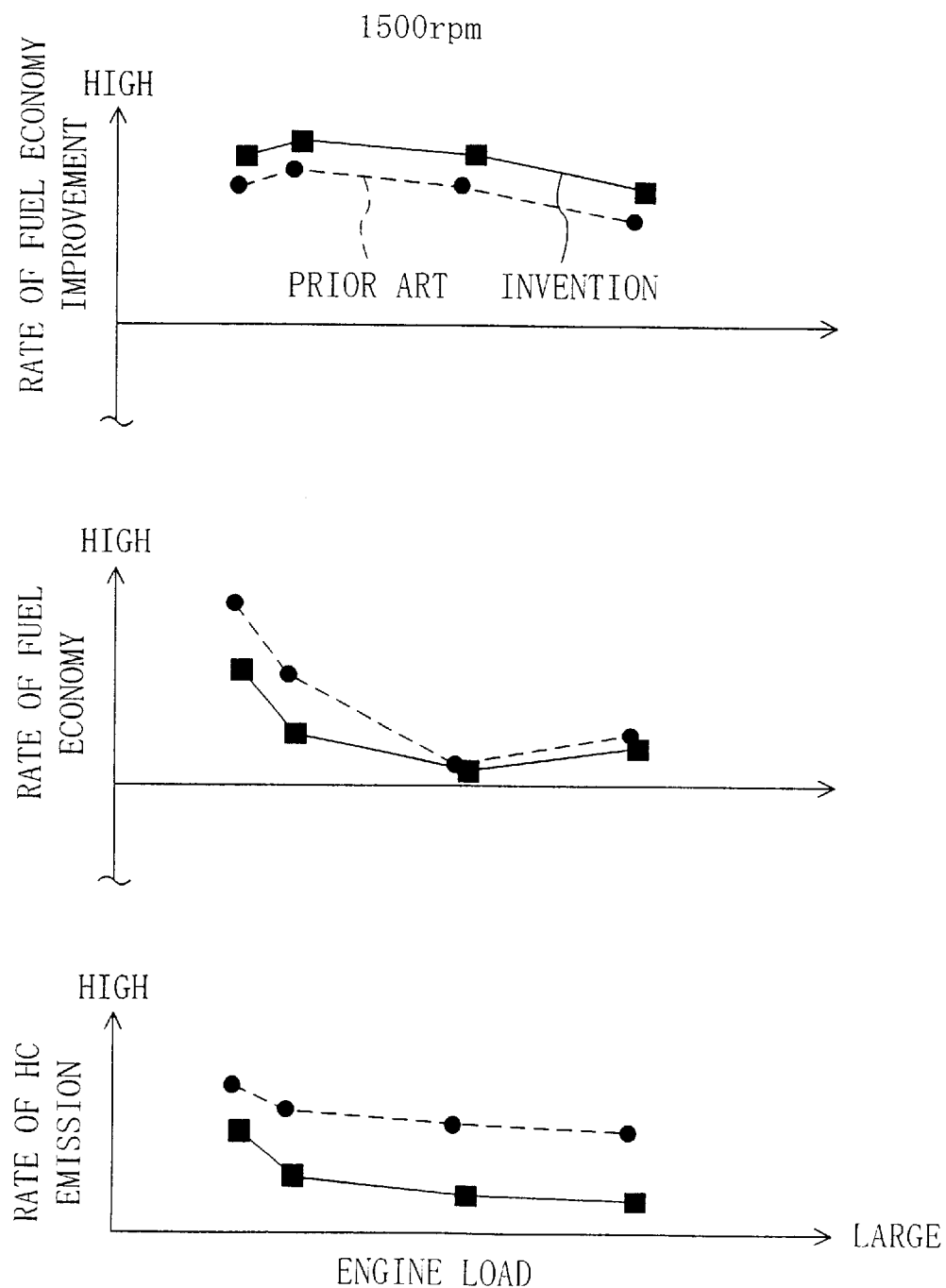
FIG. 31 shows graphs of comparison of the relation between engine load and each of the rate of fuel economy improvement, rate of fuel consumption and rate of HC emission at low speed of the inventive engine with that in the case of a conventional type direct-injection engine.
Figure 32:
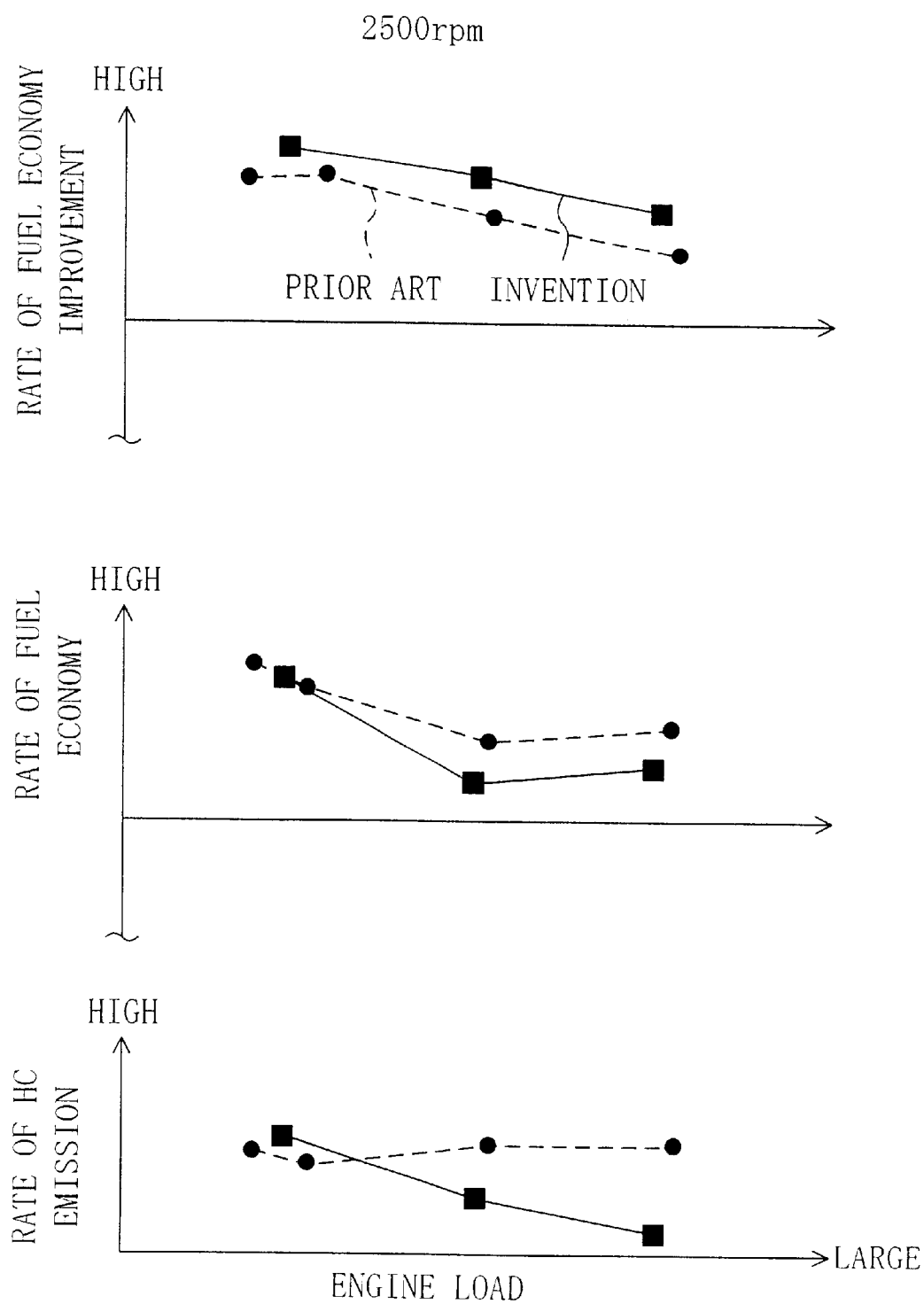
FIG. 32 shows graphs corresponding to FIG. 31 at middle speed of the engines.

Specifically, FIGS. 31 and 32 show the effects of fuel economy improvement and exhaust gas purification of the direct-injection spark ignition engine 1 of this embodiment in comparison with those of the direct-injection engine as shown in the above prior art. Specifically, FIG. 31 shows the rate of fuel economy improvement, rate of fuel economy and rate of HC emission of the engine 1 at a low engine speed (for example, 1500 rpm) based on engines of so-called port-injection type that injects a fuel to the intake port. As shown in a solid line in the figure, it can be seen that the inventive direct-injection engine 1 improves fuel economy also in a low speed range compared with the prior art direct-injection engine as shown in a broken line in the figure and can largely reduce unburnt HC emission. The reason for this is believed to be due to the fact that the amount of adhesion of fuel to the piston crown surface can be reduced.

FIG. 32 shows the results of a similar test at a mid engine speed (for example, 2500 rpm) of the engine 1. It can be seen that the inventive one as shown in solid lines of the figure has large fuel economy improvement effect and large unburnt HC emission reduction effect particularly on its high load end. This is because the inventive direct-injection engine 1, even a range of operating conditions where the prior art direct-injection engine would not capture fuel spray in the piston cavity, can suitable stratify a mixture around the spark plug electrode thereby providing good stratified-charge combustion.

Embodiment 2

Figure 33A:
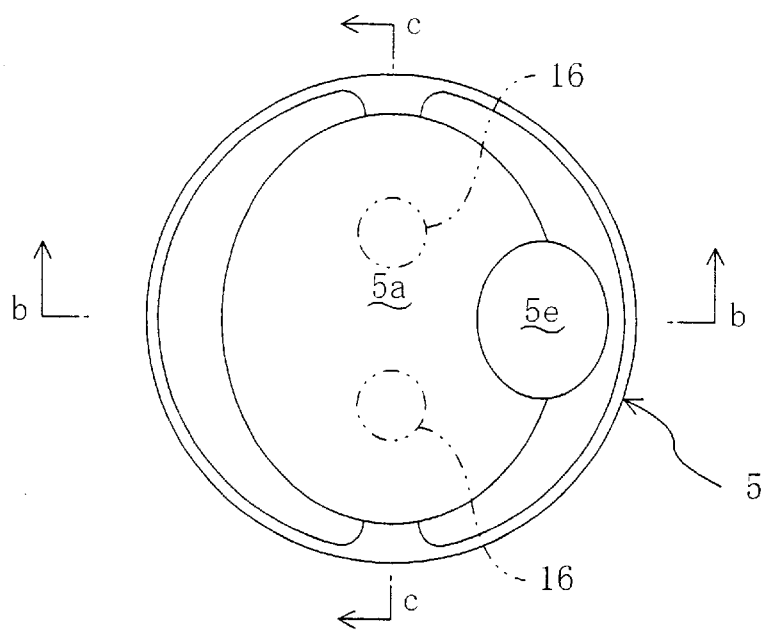
FIGS. 33A–C show views corresponding to FIG. 7 according to Embodiment 2 of the present invention.
Figure 33B:
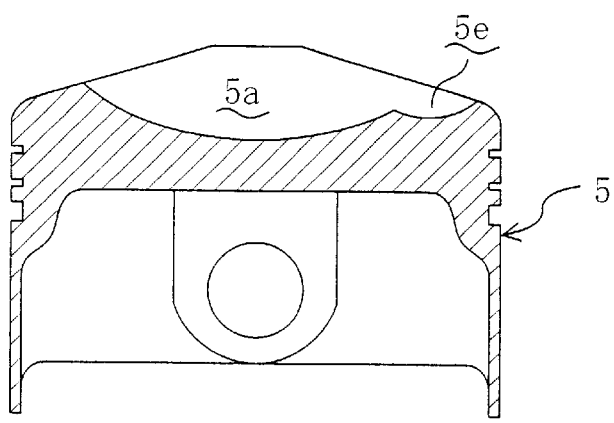
Figure 33C:
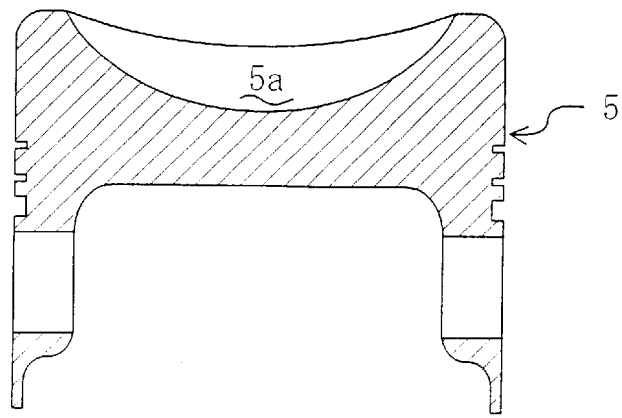

FIG. 33 shows a piston 5 of a direct-injection spark ignition engine 1 according to Embodiment 2 of the present invention. As is apparent from the figure, this engine of Embodiment 2 has a configuration in which the piston 5 crown surface is provided with a sphere-shaped cavity 5a extending over the entire piston 5 crown surface instead of the lemon-shaped cavity 5a as in Embodiment 1. Note that the engine 1 configuration of Embodiment 2 is the same as that of Embodiment 1 exclusive of the shape of the cavity 5a, and therefore the same components will be identified by the same reference characters and description thereof will be omitted.

As shown in FIGS. 33A and 33B, a portion of the piston 5 crown surface on the intake side (right-hand side of both the figures) is formed with a relatively small and shallow recess 5e such as may be merged into the sphere-shaped cavity 5a in order to avoid interference with fuel spray from the injector 18. The total volume of both the cavity 5a and the recess 5e is determined based on the compression ratio of the cylinder 2. Though the cavity 5a seems to be longitudinally larger when viewed along the cylinder center line as shown in FIG. 33A, this is because the piston 5 crown surface is identical in its entire shape with that of Embodiment 1, which corresponds to the combustion chamber 6 ceiling of the engine 1.

Because of such shape of the cavity 5a, the engine 1 of Embodiment 2 has a tendency of fuel spray from the injector 18 to be easily diffused toward both lateral sides when viewed along the spray center line F. That is, in Embodiment 1 engine, the sidewall surfaces of the lemon-shaped cavity 5a guide the tumble T so that it impinges against fuel spray and the squishes from outside of the cavity 5a suppress diffusion of the fuel spray. Therefore, even if the spray cone angle θ of the fuel spray is a relatively large value of θ=approx. 60°, the mixture can be suitably stratified as shown in FIG. 18. By way of contrast, since such action of squishes is weak in Embodiment 2, for the purpose of suitable stratification of the mixture, the spray cone angle θ of fuel spray from the injector 18 is set at a relatively small value as compared with Embodiment 1. In this manner, as shown in FIG. 16, a flammable mixture of suitable concentration can be retained in the center of the combustion chamber 6.

Figure 4:
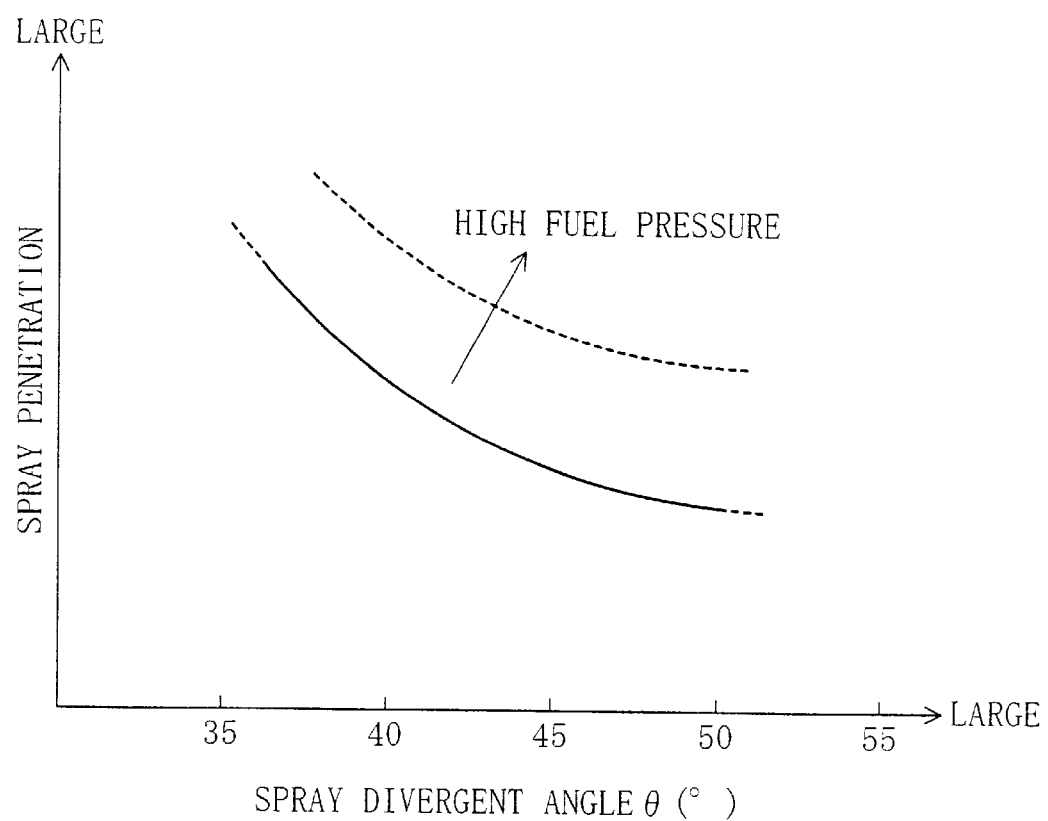
FIG. 4 is a graph showing an exemplary relation between the penetration and spray cone angle of fuel spray from the injector.

Specifically, in this embodiment, the spray cone angle θ of fuel spray from the injector 18 is adjusted by a variable mechanism of the injector 18 so as to fall within the range of, for example, θ=approx. 20° to approx. 50°. In this case, since the spray penetration shows a tendency to be larger as the spray cone angle θ is decreased as shown in FIG. 4, the fuel injection pressure may be correspondingly reduced to compensate for a change in the spray penetration. Alternatively, an injector which can change the fuel injection property and the spray cone angle individually, such as a known injector disclosed in Japanese Unexamined Patent Publication Gazette No. 9-133061, may be used. Alternatively, an air-assist type injector can be used which is adjustable in the fuel spray penetration and the spray cone angle with compressed air. In these manners, the spray cone angle θ of fuel spray from the injector can be made suitable and at the same time the fuel injection pressure and the spray penetration can be optimized.

Consequently, according to Embodiment 2, like Embodiment 1, suitable mixture stratification can be provided over a wide range of operating conditions of the engine 1, combustion quality can be improved thereby providing enhanced fuel economy and power output performance, and the exhaust gas can be further purified. In addition, because of the fact that the shape of the cavity 5a of the piston 5 decreases the S/V ratio (surface volume ratio) of the combustion chamber 6 and homogenizes flame propagation in all directions when viewed along the cylinder center line z, fuel economy and power output performance can be further improved.

Embodiment 3

Figure 40A:
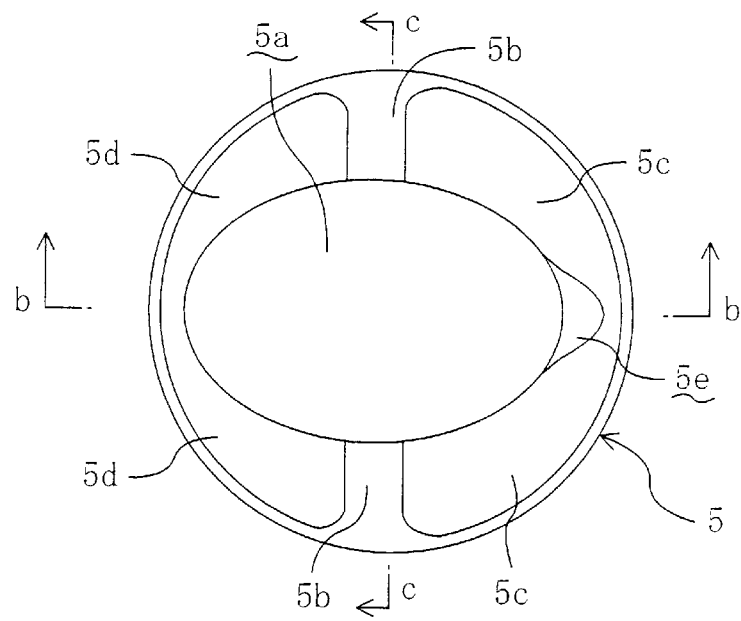
FIGS. 40A–C show corresponding views of FIG. 7 according to Embodiment 3 of the present invention.
Figure 40B:
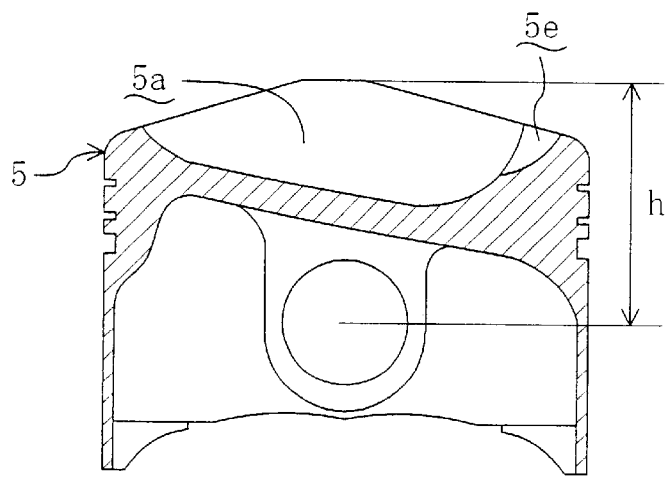
Figure 40C:
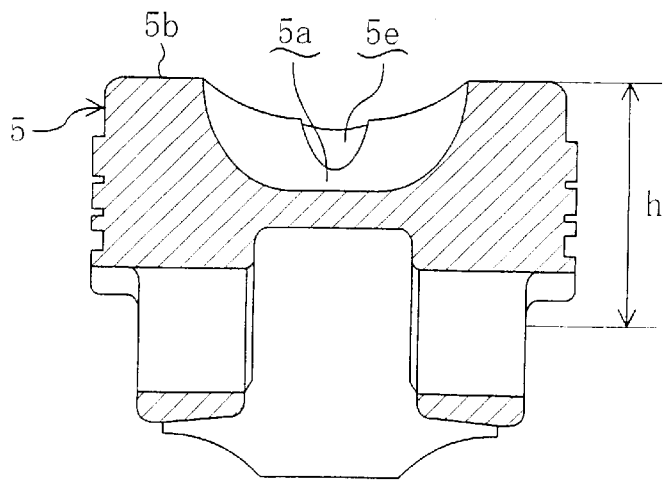

FIG. 40 shows a piston 5 of a direct-injection spark ignition engine 1 according to Embodiment 3 of the present invention. This engine of Embodiment 3 has a configuration in which, in order to decrease resistance to slide between the piston 5 and the inner wall surfaces of the cylinder 2, the compression height h (the height from the pin hole center to the crown surface top of the piston 5) is smaller than that of Embodiment 1 and the bottom surface of the cavity 5a of the piston 5 crown surface is formed to tilt toward the intake side of the combustion chamber 6. Since other parts of the engine 1 has the same configuration as Embodiments 1 and 2, the same parts will be indicated by the same reference characters and description thereof will be omitted.

Specifically, as shown in FIG. 40A, the piston 5 crown surface of Embodiment 3 is formed with a lemon-shaped cavity 5a similar to that of Embodiment 1 when viewed along the cylinder center line z. As shown in FIG. 40B, the bottom surface of the cavity 5a is formed so that its intake side portion of the right-hand side in the drawing is inclined to be deeper than its exhaust side portion of the opposite side thereof and its midportion intersecting the cylinder center line z constitutes a flat inclined surface. Accordingly, the deepest portion of the cavity 5a lies closer to the intake side than its position corresponding to the cylinder center line z. Further, since the tilt angle of the inclined surface (tilt angle thereof relative to the transverse section of the cylinder 2) is smaller than that of the inclined surface forming the ceiling of the combustion chamber 6, also in this cavity 5a, a position where the distance in the direction of the cylinder center line z between the cavity bottom surface and the combustion chamber ceiling is maximized is the position corresponding to the cylinder center line z.

Because the cavity 5a is formed to be deeper as it approaches the intake side in the above manner, the engine 1 of Embodiment 3 can enhance retentivity of the tumble T in the combustion chamber 6 even if the tumble T is weak as a whole as compared with the engine 1 of the Embodiment 1. Generally, when the cylinder 2 shifts to the compression stroke so that the piston 5 moves up from the bottom dead center, the tumble T formed in the combustion chamber 6 during the intake stroke of the cylinder 2 is compacted by volume reduction of the combustion chamber induced by the upward movement of the piston 5. As a result, the tumble T gradually decreases its flow rate, and particularly at the exhaust side of the combustion chamber 6 where its flow goes toward the piston 5 crown surface, damps in a relatively early stage under the influence of upward motion of the piston 5.

Therefore, when the tumble T in the combustion chamber 6 is weak as a whole, as schematically shown in FIG. 41, there occurs a phenomenon that while the tumble T is intensified at the intake side of the cylinder 6 (right-hand side in the figure: IN), it is abruptly damped at the exhaust side (left-hand side in the figure: EX) so that the vortex center of the tumble T shown in black circles in the figure gradually moves toward the intake side during the time from the early stage to middle stage of the compression stroke of the cylinder 2 and the retentivity of the tumble T is totally decreased. FIG. 42 shows results obtained by analyzing changes of the tumble T in the combustion chamber 6 through the application of CFD (computational fluid dynamics), wherein such changes in the flowing conditions as described above appear. When the retentivity of the tumble T is thus decreased, it becomes difficult to cause the tumble T to impinge against fuel spray from the injector 18 as aimed with stability.

Figure 43A:
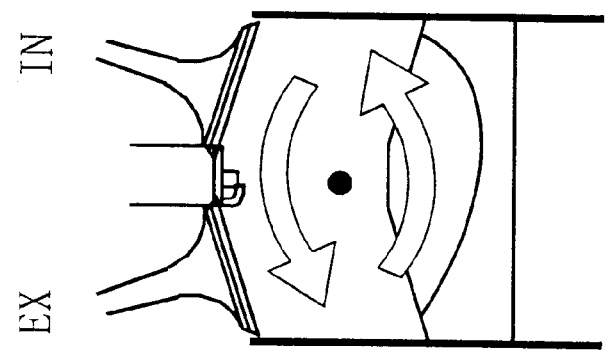
FIGS. 43A–C show diagrams corresponding to FIG. 41 in the case of a piston of Embodiment 3.
Figure 43B:
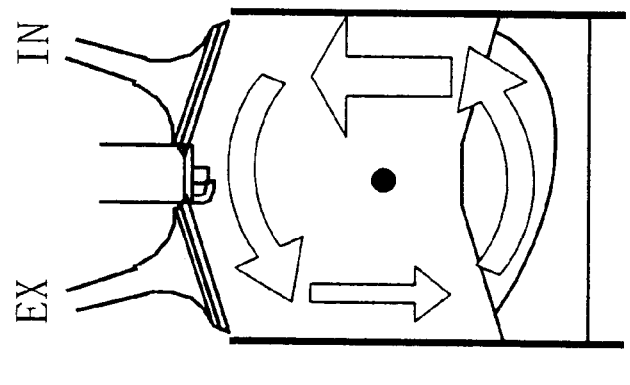
Figure 43C:
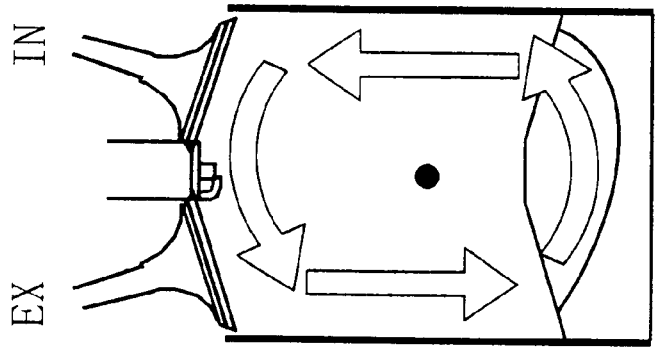

In contrast, for the engine 1 of Embodiment 3, as described above, the cavity 5a of the piston 5 crown surface is formed to be deeper at the intake side thereof than at the exhaust side and the bottom surface of the cavity 5a is inclined to be deeper from the exhaust side toward the intake side. Therefore, as schematically shown in FIG. 43, the tumble T at the exhaust side of the chamber 6 (left-hand side in the figure: EX) toward the piston 5 crown surface is oriented to the intake side thereof (right-hand side in the figure: IN) with the inclined bottom surface of the cavity 5*a*. In addition, since the combustion chamber 6 is larger in volume at the intake side than at the exhaust side, the vortex center of the tumble T is easily offset on the intake side of the combustion chamber 6. Under the synergy effect of these actions, movement of the vortex center toward the exhaust side can be suppressed thereby sufficiently ensuring the retentivity of the tumble T.

Furthermore, in forming the cavity 5*a* in the piston 5 crown surface, if the compression height h of the piston 5 will be decreased as far as possible, though can be understood clearly as viewed from the direction orthogonal to the cylinder center line z as shown in FIG. 40B, it is impossible for the cavity 5*a* to have a bottom surface of arcuate shape when viewed from that direction. That is, the compression height h of the piston 5 that should be small will mean that a pin hole is located at a relatively upper position. In this condition, if the cavity 5*a* bottom surface should be arcuately shaped, the bottom surface will interfere with a layout space for a small end of the connecting rod. After all, like this embodiment, the cavity 5*a* bottom surface will be formed so that its deepest portion is offset from the cylinder center line z and its portion near to the center is formed into a flat inclined surface.

A reference numeral 5*e* shown in FIG. 40 indicates a spray recess formed so that fuel spray from the injector 18 may not interfere with the periphery of the cavity 5*a* of the piston 5. The configuration of the cavity 5*a* exclusive of the spray recess 5*e* is symmetrical about the lengthwise center line as well as the widthwise center line when viewed along the cylinder center line z, as shown in FIG. 40A.

Consequently, according to Embodiment 3, the compression height h of the piston 5 can be decreased as far as possible to reduce mechanical resistance and at the same time the piston 5 crown surface can be formed with a cavity 5*a* of desired shape. This allows, even if the tumble T of the combustion chamber 6 is relatively weak, for holding the intensity of the tumble T up to the middle or later stage of the cylinder 2 compression stroke, thereby providing the same operations and effects as obtained in Embodiment 1.

Other Embodiments

Figure 44A:
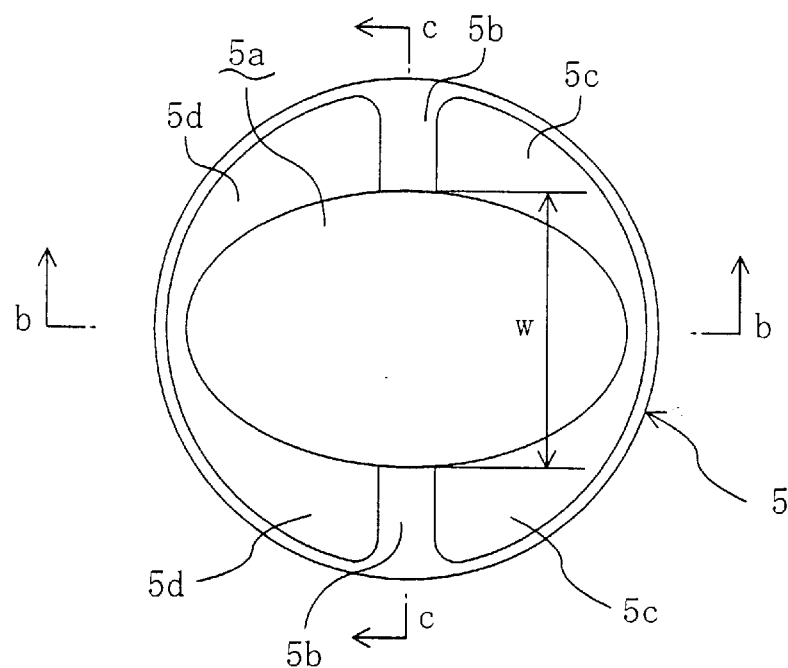
FIGS. 44A–C show corresponding diagrams of FIG. 7 according to another embodiment of the present invention in which the bottom surface of the cavity in the piston crown surface is flat.
Figure 44B:
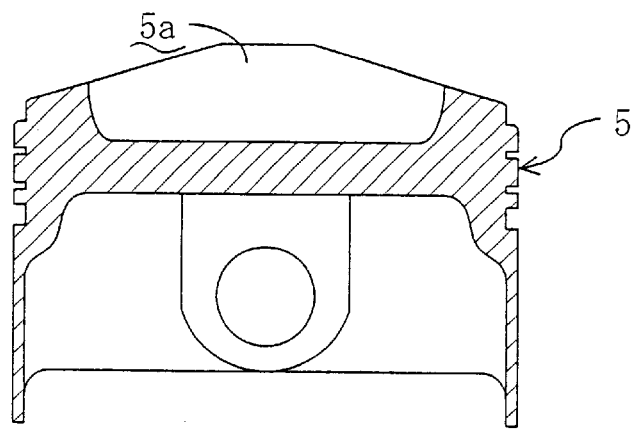
Figure 44C:
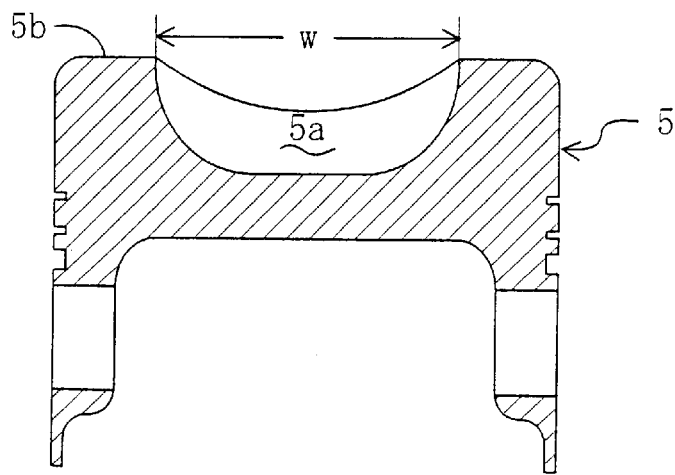

The present invention is not limited to Embodiments 1 through 3 described above, but includes various other embodiments. Specifically, in each of the foregoing embodiments, the piston 5 crown surface is formed with a cavity 5*a* as shown in FIG. 7, FIG. 33 or FIG. 40. However, such a cavity may not necessarily be provided but, for example, the piston 5 crown surface may have a flat shape as a whole. Further, if the lemon-shaped cavity 5*a* as in Embodiment 1 is provided, for the purpose of reduction in the compression height of the piston as described in Embodiment 3, the cavity 5*a* bottom surface can have a flat shape as a whole as for example shown in FIG. 44.

Furthermore, in each of the foregoing embodiments, the spark plug 16 electrode is located near to the cylinder center line. However, the position of the spark plug 16 electrode is not limited to that position, but it can be located at a position offset on the intake valve side or the exhaust valve side. It should be noted that also in such a case, the mixture must be retained in the vicinity of the spark plug 16 electrode at the ignition timing for the cylinder 2. Therefore, it is necessary to change the trade-off level between the flow rate of the tumble T and fuel spray penetration and the relationship between the ignition timing and the fuel injection timing in accordance with the position of the spark plug 16 electrode.

Moreover, the present invention is not limited to using a single spark plug 16 for each cylinder. For example, as shown in imaginary lines in FIG. 33, two spark plugs 16, 16 may be disposed in a line. In this case, electrodes of the two spark plugs 16, 16 are preferably located within the cavity 5*a* of the piston 5. In this manner, a period during which fuel spray can be stably ignited even in more widely diffused condition can be elongated.

Furthermore, in the foregoing embodiments, fuel spray penetration is controlled through the control of the fuel injection pressure of the injector 18. The control of fuel spray penetration is not limited to the above manner but, for example, can be made by the operation of the variable mechanism of the injector 18. Specifically, the relationship as shown in FIG. 4 is established between the penetration of fuel spray from the injector 18 and the spray cone angle. Therefore, if the spray cone angle is increased, the spray penetration can be decreased. On the contrary, if the spray cone angle is decreased, the spray penetration can be increased.

Figure 34A:
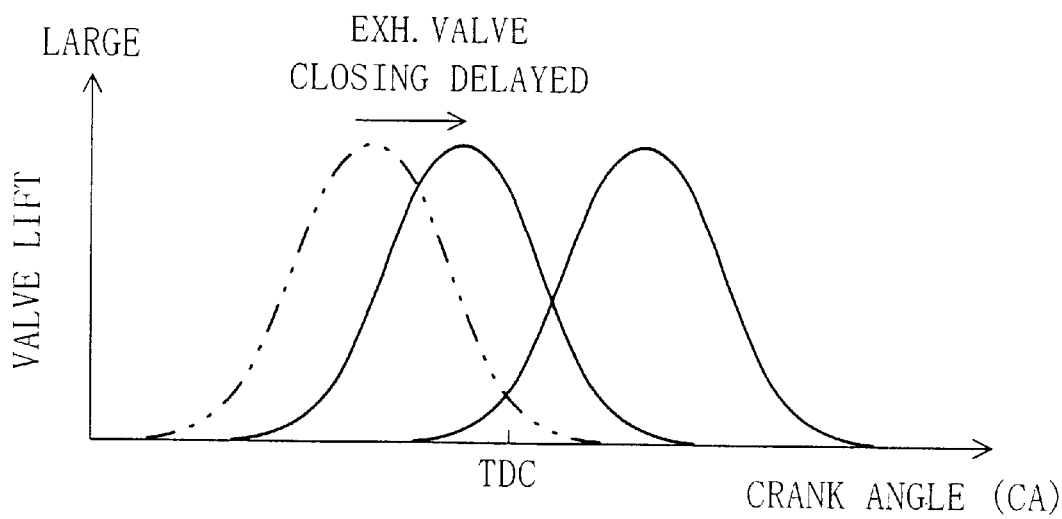
FIGS. 34A–B show diagrams illustrating another embodiment of the present invention in which the flow rate of the tumble is controlled by changing the valve timing.

Moreover, in the foregoing embodiments, the flow rate of the tumble T in the combustion chamber 6 is regulated by changing the opening of the intake airflow control valve 34 of the intake port 10. However, the regulation of the flow rate of the tumble T is not limited to the above manner but, for example, may be made by changing the opening/closing timing of the intake valve 12 or the exhaust valve 13 with the variable valve timing mechanism 14. Specifically, if the closing timing (valve timing) of the exhaust valve 13 is delayed in angle as shown in solid curves in FIG. 34A, the amount of burnt gas flowing from the exhaust side back to the combustion chamber 6 is increased as compared with the normal case as shown in imaginary curves in the same figure. This reduces the flow rate or flow quantity of the intake air taken in the combustion chamber 6 and thus reduces the flow rate of the tumble T. In addition, since the backward flow of burnt gas elevates the temperature in the combustion chamber 6, carburetion properties of fuel will not be deteriorated even if the fuel injection pressure is decreased in accordance with decrease in the tumble flow rate.

Figure 34B:
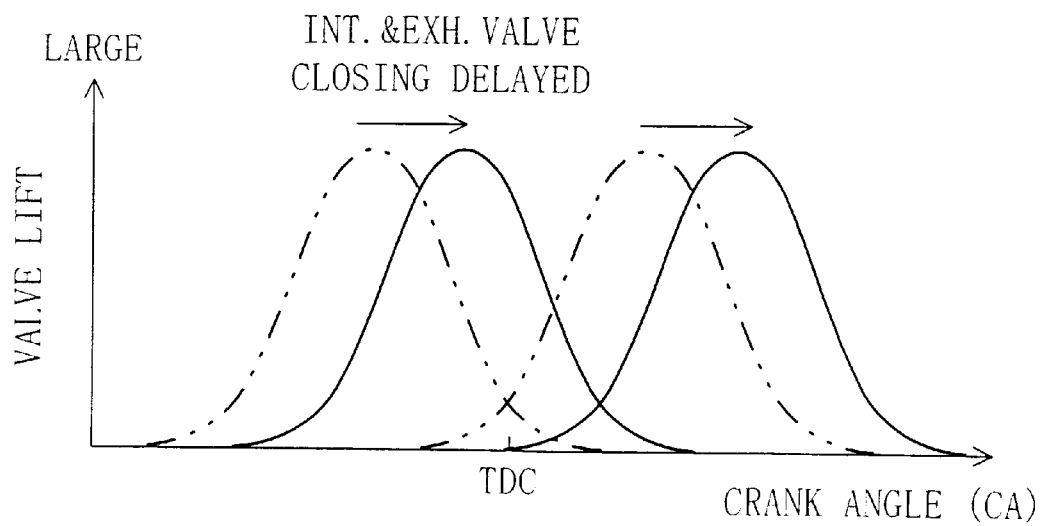
Figure 35:
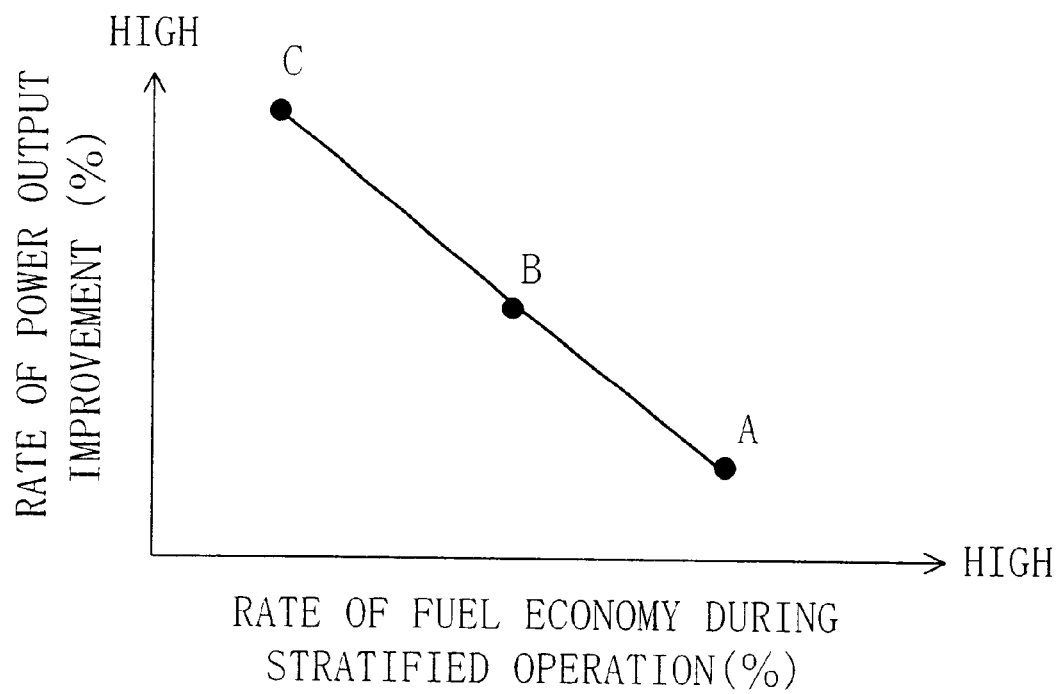
FIG. 35 is a graph showing the trade-off relationship between the rate of power output improvement and the rate of fuel economy improvement in a prior-art direct-injection engine.

Furthermore, if both the opening/closing timings of the intake valve 12 and the exhaust valve 13 are delayed in angle as shown in FIG. 34B, the above effects can be obtained likewise and additionally, the efficiency of intake can be decreased thereby reducing the flow rate of the tumble T. In this manner, the amount of change of the opening/closing timing of the intake valve 12 and the exhaust valve 13 can be suppressed relatively small and therefore changes in the operating conditions of the engine 1 can be suppressed. Alternatively, the flow rate of the tumble T can also be reduced by angularly delaying the opening/closing timing of the intake valve 12 alone, though is not shown in the figure.

In addition, the deepest portion of the cavity 5*a* formed in the piston 5 crown surface is located at a position corresponding to the cylinder center line z in Embodiments 1 and 2, while it is located closer to the intake side than the position corresponding to the cylinder center line z in Embodiment 3. The present invention is not limited to locating the deepest portion of the cavity 5*a* at those positions. For example, in Embodiment 1 or 2, the volume of the exhaust side space of the cavity 5*a* may be larger than that of the intake side space thereof for uniformization of the flame propagation velocity. In this case, the deepest portion of the cavity 5*a* will be located closer to the exhaust valve than the position corresponding to the cylinder center line z.

What is claimed is:

1. A direct-injection spark ignition engine in which a spark plug is disposed in a cylinder at a ceiling of a combustion chamber opposed to a crown surface of a piston, a fuel injection nozzle is disposed in the combustion chamber to inject a fuel from a peripheral portion of the combustion chamber, and the fuel injected from the fuel injection nozzle is stratified around an electrode of the spark plug during stratified-charge combustion operation, said engine comprising:

tumble generating means capable of generating a tumble which flows between the electrode of the spark plug and the crown surface of the piston toward the fuel injection nozzle during a compression stroke of the cylinder; and fuel injection control means for causing the fuel injection nozzle to inject the fuel in correspondence with an ignition timing for the cylinder so that fuel spray from the fuel injection nozzle goes against the tumble and stays in the vicinity of the electrode of the spark plug in the form of a flammable mixture at the time of ignition of the spark plug;

wherein the fuel injection control means controls penetration of fuel spray through the fuel injection nozzle in accordance with the flow rate of the tumble opposed to the fuel spray.

2. The direct-injection spark ignition engine of claim 1, wherein the electrode of the spark plug is disposed closer to the crown surface of the piston than to the nozzle hole of the fuel injection nozzle when viewed in a direction orthogonal to the center line of the cylinder.

3. The direct-injection spark ignition engine of claim 1, wherein the spray cone angle of fuel spray from the fuel injection nozzle during the compression stroke of the cylinder is at a value within the range of approximately 20° to 60°.

4. The direct-injection spark ignition engine of claim 1, wherein the fuel injection nozzle is disposed so that the fuel spray impinges substantially oppositely against the tumble flowing along the crown surface of the piston during the compression stroke of the cylinder.

5. The direct-injection spark ignition engine of claim 1, wherein the crown surface of the piston is formed with a cavity longer in a direction in which the center line of fuel spray extends when viewed along the center line of the cylinder, and the cavity has such a form that maximizes the distance thereof along the center line of the cylinder from the ceiling of the combustion chamber at the position corresponding to the center line of the cylinder.

6. The direct-injection spark ignition engine of claim 1, wherein the fuel injection control means controls the penetration of fuel spray from the fuel injection nozzle in accordance with the revolving speed of a crank shaft.

7. The direct-injection spark ignition engine of claim 1, wherein injection pressure regulating means is provided for regulating the fuel injection pressure of the fuel injection nozzle, and the fuel injection control means is arranged to cause the injection pressure regulating means to increase the fuel injection pressure in increasing the penetration of the fuel spray and to decrease the fuel injection pressure in decreasing the penetration of the fuel spray.

8. The direct-injection spark ignition engine of claim 7, wherein the fuel injection control means is arranged to correctively control the operation of the injection pressure regulating means in accordance with the temperature conditions of the combustion chamber so that the fuel injection pressure becomes larger as the temperature of the combustion chamber is increased even if the fuel injection quantity and the revolving speed of the crank shaft are substantially constant.

9. The direct-injection spark ignition engine of claim 1, wherein the fuel injection nozzle is provided with a variable spray angle mechanism for adjusting the spray cone angle of fuel spray, and the fuel injection control means is arranged to cause the variable spray angle mechanism to decrease the spray cone angle of fuel spray in increasing the penetration of fuel spray and to increase the spray cone angle of fuel spray in decreasing the penetration of fuel spray.

10. The direct-injection spark ignition engine of claim 1, wherein the fuel injection control means is arranged to increase the penetration of fuel spray through the fuel injection nozzle to correspond to rise in the revolving speed of the crank shaft until the revolving speed of the crank shaft reaches a predetermined value and suppress increase of the penetration when the revolving speed of the crank shaft reaches or exceeds the predetermined value, and the engine further comprises:

variable tumble means for making the flow rate of the tumble variable; and tumble control means for operating the variable tumble means to suppress increase in the flow rate of the tumble which corresponds to increase in the revolving speed of the crank shaft when the revolving speed of the crank shaft reaches or exceeds the predetermined value.

11. The direct-injection spark ignition engine of claim 10, wherein the variable tumble means comprises an intake airflow control valve for changing the flowing conditions of the intake air flowing into the combustion chamber.

12. The direct-injection spark ignition engine of claim 10, wherein the variable tumble means is a variable valve timing mechanism for changing the valve timing of at least one of intake and exhaust valves.

13. The direct-injection spark ignition engine of claim 10, wherein the tumble control means correctively controls the operation of the variable tumble means in accordance with the temperature conditions of the combustion chamber so that the flow rate of the tumble is lower as the temperature of the combustion chamber is higher even if the fuel injection quantity and the revolving speed of the crank shaft is substantially constant.

14. A direct-injection spark ignition engine in which a spark plug is disposed in a cylinder at a ceiling of a combustion chamber opposed to a crown surface of a piston, a fuel injection nozzle is disposed in the combustion chamber to inject a fuel from a peripheral portion of the combustion chamber, and the fuel injected from the fuel injection nozzle is stratified around an electrode of the spark plug during stratified-charge combustion operation, wherein the spark plug is disposed so that the electrode thereof protrudes from the ceiling of the combustion chamber in a direction parallel to the center line of the cylinder and the distance e between the ceiling of the combustion chamber and the electrode thereof has a value satisfying the relationship of $e \geq 0.4d$ where d is the distance on the center line of the cylinder between the ceiling of the combustion chamber and the crown surface of the piston when the cylinder is at the top dead center during the compression stroke thereof, the fuel injection nozzle is disposed so that the spray cone angle of fuel spray therefrom has a value within the range of approximately 20° to 60° and the center line of fuel spray therefrom has a tilt angle within the range of approximately 25° to 40° with respect to an assumed plane orthogonal to the center line of the cylinder, and the engine comprises:

tumble generating means capable of generating a tumble which flows between the electrode of the spark plug and the crown surface of the piston toward the fuel injection nozzle during a compression stroke of the cylinder; and fuel injection control means for controlling penetration of fuel spray through the fuel injection nozzle in accordance with the flow rate of the tumble and causing the fuel injection nozzle to inject fuel against the tumble.

15. The direct-injection spark ignition engine of claim 14, characterized by further comprising:

variable tumble means for making the flow rate of the tumble variable; and tumble control means for operating the variable tumble means so that a tumble ratio during the compression stroke of the cylinder falls within the range of approximately 1.1 to 2.3.

16. The direct-injection spark ignition engine of claim 14, wherein the engine further comprises injection pressure regulating means for regulating the fuel injection pressure of the fuel injection nozzle, and the fuel injection control means controls the operation of the injection pressure regulating means so that the fuel injection pressure falls within the range of approximately 3 MPa to 13 MPa.

17. A direct-injection spark ignition engine in which a spark plug is disposed in a cylinder at a ceiling of a combustion chamber opposed to a crown surface of a piston, a fuel injection nozzle is disposed in the combustion chamber to inject a fuel from a peripheral portion of the combustion chamber, and the fuel injected from the fuel injection nozzle is stratified around an electrode of the spark plug during stratified-charge combustion operation, said engine comprising:

tumble generating means capable of generating a tumble which flows between the electrode of the spark plug and the crown surface of the piston toward the fuel injection nozzle during a compression stroke of the cylinder; and fuel injection control means for causing the fuel injection nozzle to inject the fuel in correspondence with an ignition timing for the cylinder so that fuel spray from the fuel injection nozzle goes against the tumble and stays in the vicinity of the electrode of the spark plug in the form of a flammable mixture at the time of ignition of the spark plug;

wherein the electrode of the spark plug protrudes from the ceiling of the combustion chamber in a direction parallel to the center line of the cylinder, and the distance e between the ceiling of the combustion chamber and the electrode of the spark plug is set at a value satisfying the relationship of $e \geq 0.4d$ where d is the distance on the center line of the cylinder between the ceiling of the combustion chamber and the crown surface of the piston when the cylinder is at the top dead center during the compression stroke thereof.

18. The direct-injection spark ignition engine of claim 17, wherein the distance e between the ceiling of the combustion chamber and the electrode of the spark plug is set at a value satisfying the relationship of $e \geq 0.2d$ where d is the distance on the center line of the cylinder between the ceiling of the combustion chamber and the crown surface of the piston when the cylinder is at a 55° crank angle before the top dead center during the compression stroke thereof.

19. The direct-injection spark ignition engine of claim 17, wherein the electrode of the spark plug is disposed closer to the ceiling of the combustion chamber than to the crown surface of the piston, when viewed along the center line of a geometrical area of fuel spray from the fuel injection nozzle during the compression stroke of the cylinder, with respect to the center line of fuel spray.

20. A direct-injection spark ignition engine in which a spark plug is disposed in a cylinder at a ceiling of a combustion chamber opposed to a crown surface of a piston, a fuel injection nozzle is disposed in the combustion chamber to inject a fuel from a peripheral portion of the combustion chamber, and the fuel injected from the fuel injection nozzle is stratified around an electrode of the spark plug during stratified-charge combustion operation, said engine comprising:

tumble generating means capable of generating a tumble which flows between the electrode of the spark plug and the crown surface of the piston toward the fuel injection nozzle during a compression stroke of the cylinder; and fuel injection control means for causing the fuel injection nozzle to inject the fuel in correspondence with an ignition timing for the cylinder so that fuel spray from the fuel injection nozzle goes against the tumble and stays in the vicinity of the electrode of the spark plug in the form of a flammable mixture at the time of ignition of the spark plug wherein the crown surface of the piston is formed with a cavity longer in a direction in which the center line of fuel spray extends when viewed along the center line of the cylinder with, the deepest portion of the cavity is positioned in correspondence with the center line of the cylinder and the cavity has such a form that maximizes the distance thereof along the center line of the cylinder from the ceiling of the combustion chamber at the position corresponding to the center line of the cylinder.

21. A direct-injection spark ignition engine in which a spark plug is disposed in a cylinder at a ceiling of a combustion chamber opposed to a crown surface of a piston, a fuel injection nozzle is disposed in the combustion chamber to inject a fuel from a peripheral portion of the combustion chamber, and the fuel injected from the fuel injection nozzle is stratified around an electrode of the spark plug during stratified-charge combustion operation, said engine comprising:

tumble generating means capable of generating a tumble which flows between the electrode of the spark plug and the crown surface of the piston toward the fuel injection nozzle during a compression stroke of the cylinder; and fuel injection control means for causing the fuel injection nozzle to inject the fuel in correspondence with an ignition timing for the cylinder so that fuel spray from the fuel injection nozzle goes against the tumble and stays in the vicinity of the electrode of the spark plug in the form of a flammable mixture at the time of ignition of the spark plug wherein the crown surface of the piston is formed with a cavity longer in a direction in which the center line of fuel spray extends when viewed along the center line of the cylinder with the deepest portion of the cavity is positioned closer to an intake side than the position corresponding to the center line of the cylinder.

22. A direct-injection spark ignition engine in which a spark plug is disposed in a cylinder at a ceiling of a combustion chamber opposed to a crown surface of a piston, a fuel injection nozzle is disposed in the combustion chamber to inject a fuel from a peripheral portion of the combustion chamber, and the fuel injected from the fuel injection nozzle is stratified around an electrode of the spark plug during stratified-charge combustion operation, said engine comprising:

tumble generating means capable of generating a tumble which flows between the electrode of the spark plug and the crown surface of the piston toward the fuel injection nozzle during a compression stroke of the cylinder; and fuel injection control means for causing the fuel injection nozzle to inject the fuel in correspondence with an ignition timing for the cylinder so that fuel spray from the fuel injection nozzle goes against the tumble and stays in the vicinity of the electrode of the spark plug in the form of a flammable mixture at the time of ignition of the spark plug;

the crown surface of the piston is formed with a cavity that accommodates the electrode of the spark plug when viewed along the center line of the cylinder, and squish area sections each for generating a squish flowing toward the inside of the cavity in cooperation with the opposed ceiling of the combustion chamber are formed in an outer portion of the crown surface of the piston, located outside of the cavity, at least both lateral locations thereof from the electrode of the spark plug with respect to the center line of the fuel spray when viewed along the center line of the cylinder.

23. The direct-injection spark ignition engine of claim 22, wherein the opening width of the cavity in the lateral direction when viewed along the center line of the cylinder is maximized in the vicinity of the electrode of the spark plug.

24. The direct-injection spark ignition engine of claim 23, wherein the opening width of the cavity in the lateral direction in the vicinity of the electrode of the spark plug when viewed along the center line of the cylinder is set to include a geometrical area of fuel spray from the fuel injection nozzle during the compression stroke of the cylinder.

25. The direct-injection spark ignition engine of claim 23, wherein the ceiling of the combustion chamber is formed with a pair of intake ports, and the opening width of the cavity in the lateral direction in the vicinity of the electrode of the spark plug when viewed along the center line of the cylinder is equal to or more than the center distance between the pair of intake ports.

26. The direct-injection spark ignition engine of claim 22, wherein the squish area sections are provided in the outer portion of the crown surface of the piston to continue from both the lateral locations thereof, which interpose the electrode of the spark plug therebetween, toward the exhaust side.

27. A direct-injection spark ignition engine in which a spark plug is disposed in a cylinder at a ceiling of a combustion chamber opposed to a crown surface of a piston, a fuel injection nozzle is disposed in the combustion chamber to inject a fuel from a peripheral portion of the combustion chamber, and the fuel injected from the fuel injection nozzle is stratified around an electrode of the spark plug during stratified-charge combustion operation, said engine comprising:

tumble generating means capable of generating a tumble which flows between the electrode of the spark plug and the crown surface of the piston toward the fuel injection nozzle during a compression stroke of the cylinder; and fuel injection control means for causing the fuel injection nozzle to inject the fuel in correspondence with an ignition timing for the cylinder so that fuel spray from the fuel injection nozzle goes against the tumble and stays in the vicinity of the electrode of the spark plug in the form of a flammable mixture at the time of ignition of the spark plug;

wherein the crown surface of the piston is formed with a squish area section for generating squishes in cooperation with the ceiling of the combustion chamber so that a layer of the flammable mixture residing in the vicinity of the electrode of the spark plug takes on a diametrically diminished form on the side closer to the ceiling of the combustion chamber when viewed along the center line of the fuel spray.

28. The direct-injection spark ignition engine of claim 27, wherein the crown surface of the piston is formed with a cavity so as to accommodate the electrode of the spark plug and the layer of flammable mixture residing in the vicinity of the electrode of the spark plug when viewed along the center line of the cylinder, and the squishes act to suppress diffusion of the layer of flammable mixture so that the profile of the layer of flammable mixture is spaced apart from the side walls of the cavity and has a larger distance from each of the side walls as it approaches the ceiling of the combustion chamber.

29. A direct-injection spark ignition engine in which a spark plug is disposed in a cylinder at a ceiling of a combustion chamber opposed to a crown surface of a piston, a fuel injection nozzle is disposed in the combustion chamber to inject a fuel from a peripheral portion of the combustion chamber, and the fuel injected from the fuel injection nozzle is stratified around an electrode of the spark plug during stratified-charge combustion operation, said engine comprising:

tumble generating means capable of generating a tumble which flows between the electrode of the spark plug and the crown surface of the piston toward the fuel injection nozzle during a compression stroke of the cylinder; and fuel injection control means for causing the fuel injection nozzle to inject the fuel in correspondence with an ignition timing for the cylinder so that fuel spray from the fuel injection nozzle goes against the tumble and stays in the vicinity of the electrode of the spark plug in the form of a flammable mixture at the time of ignition of the spark plug;

wherein the electrode of the spark plug is disposed at the midpoint between a first partial flow of the tumble flowing along the crown surface of the piston and a second partial flow of the tumble flowing along the ceiling of the combustion chamber at a certain point after the start timing of fuel injection during the compression stroke of the cylinder and before the ignition timing for the cylinder.

* * * * *